United States Patent
Luban

(10) Patent No.: US 12,503,499 B2
(45) Date of Patent: Dec. 23, 2025

(54) MODIFIED HIV-1 PROVIRAL VECTORS WITH ENHANCED DENDRITIC CELL TRANSDUCTION EFFICIENCIES COMPRISING THE JRFL ENVELOPE

(71) Applicant: UNIVERSITY OF MASSACHUSETTS, Boston, MA (US)

(72) Inventor: Jeremy Luban, Newton, MA (US)

(73) Assignee: UNIVERSITY OF MASSACHUSETTS, Westborough, MA (US)

( * ) Notice: Subject to any disclaimer, the term of this patent is extended or adjusted under 35 U.S.C. 154(b) by 416 days.

(21) Appl. No.: 17/470,463

(22) Filed: Sep. 9, 2021

(65) Prior Publication Data

US 2022/0106385 A1    Apr. 7, 2022

Related U.S. Application Data

(62) Division of application No. 16/073,472, filed as application No. PCT/US2017/021426 on Mar. 8, 2017, now Pat. No. 11,142,566.

(60) Provisional application No. 62/305,891, filed on Mar. 9, 2016.

(51) Int. Cl.
| | | |
|---|---|---|
| *C07K 16/10* | (2006.01) | |
| *A61K 39/12* | (2006.01) | |
| *A61K 39/21* | (2006.01) | |
| *C07K 16/12* | (2006.01) | |
| *C12N 15/86* | (2006.01) | |
| *A61K 31/7088* | (2006.01) | |
| *A61K 39/02* | (2006.01) | |

(52) U.S. Cl.
CPC .......... *C07K 16/1063* (2013.01); *A61K 39/12* (2013.01); *A61K 39/21* (2013.01); *C07K 16/1045* (2013.01); *C07K 16/1207* (2013.01); *C12N 15/86* (2013.01); *A61K 31/7088* (2013.01); *A61K 39/0225* (2013.01); *C07K 2317/14* (2013.01); *C07K 2317/76* (2013.01); *C12N 2740/10044* (2013.01); *C12N 2740/16021* (2013.01); *C12N 2740/16023* (2013.01); *C12N 2740/16034* (2013.01); *C12N 2740/16043* (2013.01); *C12N 2740/16044* (2013.01); *C12N 2740/16122* (2013.01); *C12N 2740/16134* (2013.01); *C12N 2740/16322* (2013.01)

(58) Field of Classification Search
CPC ...... C07K 16/1063; C12N 2740/16021; C12N 2740/16034
See application file for complete search history.

(56) References Cited

U.S. PATENT DOCUMENTS

| | | | |
|---|---|---|---|
| 5,512,421 A | 4/1996 | Burns et al. | |
| 5,739,018 A | 4/1998 | Miyanohara et al. | |
| 5,814,500 A | 9/1998 | Dietz | |
| 5,885,806 A | 3/1999 | Dropulic et al. | |
| 8,071,284 B2 * | 12/2011 | Gupta .................... | C12Q 1/703 435/7.1 |
| 11,142,566 B2 | 10/2021 | Luban | |
| 2011/0263460 A1 | 10/2011 | Quinones-Mateu et al. | |
| 2014/0329312 A1 | 11/2014 | North et al. | |

FOREIGN PATENT DOCUMENTS

| | | |
|---|---|---|
| CN | 1489630 A | 4/2004 |
| CN | 105263506 A | 1/2016 |
| EP | 3426353 A1 | 1/2019 |
| WO | WO 2001/047955 A2 | 7/2001 |
| WO | WO 2004/037699 A2 | 5/2004 |
| WO | WO 2017/156170 A1 | 9/2017 |

OTHER PUBLICATIONS

Von Schwedler, U. K., et al., May 2003, Functional Surfaces of the Human Immunodeficiency Virus Type 1 Capsid Protein, J. Virol. 77(9):5439-5450.*

Melamed, D., et al., Sep. 2004, The Conserved Carboxy Terminus of teh Capsid Domain of Human Immunodeficiency Virus Type 1 Gag Protein is Important for Virion Assembly and Release, J. Virol. 78(18):9675-9688.*

Adachi, et al., Production of Acquired Immunodeficiency Syndrome-Associated Retrovirus in Human and Nonhuman Cells Transfected With an Infectious Molecular Clone, Journal of Virology, vol. 59, No. 2, pp. 284-291, 1986.

Akkina, Ramesh, Humanized Mice for Studying Human Immune Responses and Generating Human Monoclonal Antibodies, Microbial. Spectrum, vol. 2, No. 2, AID-0003-2012, pp. 1-12, 2014.

Andre, et al., Increased Immune Response Elicited by DNA Vaccination With a Synthetic Gp120 Sequence With Optimized Codon Usage, Journal of Virology, vol. 72, No. 2, pp. 1497-1503, 1998.

Baker, et al., Structures of bovine and human papillomaviruses. Analysis by cryoelectron microscopy and three-dimensional image reconstruction, Biophysical Journal, vol. 60, No. 6, pp. 1445-1456, 1991.

Brainard, et al., Induction of Robust Cellular and Humoral Virus-Specific Adaptive Immune Responses in Human Immunodeficiency Virus-Infected Humanized BLT Mice, Journal of Virology, vol. 83, No. 14, pp. 7305-7321, Jul. 1, 2009.

Crooks, et al., Vaccine-Elicited Tier 2 HIV-1 Neutralizing Antibodies Bind to Quaternary Epitopes Involving Glycan-Deficient Patches Proximal to the CD~ Binding Site, PLoS Pathogens, vol. 11, No. 5, pp. 1-34, May 29, 2015.

(Continued)

Primary Examiner — Jeffrey S Parkin
(74) Attorney, Agent, or Firm — LATHROP GPM LLP; James H. Velema, Esq.; Judith L. Stone-Hulslander, Esq.

(57) ABSTRACT

The present invention provides highly efficient methods, and compositions related thereto, for generating high titer human antibodies or antibody fragments thereof in a mammalian subject. The methods comprise administering a virus or virus-like particle to a mammal comprising heterologous immune cells and isolating a population of immunoglobulin-producing cells from the mammal, thereby producing the antibodies or antibody fragments thereof.

13 Claims, 20 Drawing Sheets

Specification includes a Sequence Listing.

(56) References Cited

OTHER PUBLICATIONS

Database Genseq, HIV-1 B Envelope Polypeptide Encoding cDNA, Retrieved from EBI accession No. BBC45288, Apr. 10, 2014.
EMBL Database, HIV-1 Isolate JRCSF clone from USA Envelope Glycoprotein (env) Gene, Partial CDS, Retrieved from EBI Accession No. EM STD: AY669726, Aug. 2004.
Extended European Search Report for European Application No. 17764030.7, mailed Apr. 3, 2020.
Fikrig, et al., Protection of Mice Against the Lyme Disease Agent by Immunizing with Recombinant OspA, Science, vol. 250, No. 4980, pp. 553-556, Oct. 1, 1990.
Genbank, HIV-1 Isolate JRCSF From USA Envelope Glycoprotein (Env) Gene, Complete CDS, "Accession No. AY426125.1, Retrieved from: https://www.ncbi.nlm.nih.gov/nuccore/AY426125", Jun. 1, 2004.
Gish, et al., Identification of Protein Coding Regions by Database Similarity Search, Nature Genetics, vol. 3, No. 3, pp. 266, 1993.
Gorman, et al., Reshaping a Therapeutic CD4 Antibody, Proceedings of the National Academy of Sciences, vol. 88, No. 10, pp. 4181-4185, 1991.
Granelli-Piperno, Dendritic Cells, Infected With Vesicular Stomatitis Virus-Pseudotyped HIV-1, Present Viral Antigens to CD4+ and CD8+ T Cells From HIV-1-Infected Individuals, the Journal of Immunology, vol. 165, No. 11, pp. 6620-6626, 2000.
Hagensee, et al., Three-Dimensional Structure of Vaccinia Virus-Produced Human Papillomavirus Type 1 Capsids, Journal of Virology, vol. 68, No. 7, pp. 4503-4505, 1994.
Hodgson, John, Making Monoclonals in Microbes, Biotechnology, vol. 9, pp. 421-425, 1991.
International Search Report and Written Opinion for PCT Patent Application No. PCT/US2017/21426, mailed Jul. 7, 2017.
Jones, et al., Replacing the Complementarity-Determining Regions in a Human Antibody with Those From a Mouse, Nature, vol. 321, No. 6069, pp. 522-525, May 29, 1986.
Karlin, et al., Applications and Statistics for Multiple High-Scoring Segments in Molecular Sequences, Proceedings of the National Academy of Sciences of the USA, vol. 90, pp. 5873-5877, Jun. 1, 1993.
Karlin, et al., Methods for Assessing the Statistical Significance of Molecular Sequence Features by Using General Scoring Schemes, Proceedings of the National Academy of science of the USA, vol. 87, No. 6, pp. 2264-2268, Mar. 1, 1990.
Koyanagi, et al., Dual Infection of the Central Nervous System by AIDS Viruses With Distinct Cellular Tropisms, Science, vol. 236, No. 4803, pp. 819-822, 1987.
Kramer, et al., The Human Antibody Repertoire Specific for Rabies Virus Glycoprotein as Selected From Immune Libraries, European Journal of Immunology, vol. 35, No. 7, pp. 2131-2145, 2005.
Lan, et al., Reconstitution of a Functional Human Immune System in Immunodeficient Mice Through Combined Human Fetal Thymus/Liver and CD34+ Cell Transplantation, Blood, vol. 108, No. 2, pp. 487-492, 2006.
Liu, et al., Chimeric Mouse-Human IgG1 Antibody That Can Mediate Lysis of Cancer Cells, Proceedings of the National Academy of Sciences, vol. 84, No. 10, pp. 3439-3443, 1987.
Marsden, et al., Humanized Mouse Models for Human Immunodeficiency Virus Infection, Annual Review of Virology, vol. 4, pp. 393-412, Sep. 1, 2017.
Melkus, et al., Humanized mice mount specific adaptive and innate immune responses to EBV and TSST-1, Nature medicine, vol. 12, No. 11, pp. 1316-1322, 2006.
Neagu, et al., Potent Inhibition of HIV-1 by TRIM5-Cyclophilin Fusion Proteins Engineered From Human Components, the Journal of Clinical Investigation, vol. 119, No. 10, pp. 3035-3047, 2009.
Peters, et al., Biological Analysis of Human Immunodeficiency Virus Type 1 R5 Envelopes Amplified from Brain and Lymph Node Tissues of AIDS Patients with Neuropathology Reveals Two Distinct Tropism Phenotypes and Identifies Envelopes in the Brain That Confer an Enhanced, Journal of Virology, vol. 78, No. 13, pp. 6915-6926, 2004.
Queen, C., et al., A humanized antibody that binds to the interleukin 2 receptor, Proceeding of National Academy of Science, USA. vol. 86, No. 24, pp. 10029-10033, Dec. 1, 1989.
Reiser, et al., Development of Multigene and Regulated Lentivirus Vectors, Journal of virology, vol. 74, No. 22, pp. 10589-10599, 2000.
Sato, et al., Dynamics of Memory and Naive CD8+ T Lymphocytes in Humanized NOD/SCID/IL-2Rγnull Mice Infected with CCR5-tropic HIV-1, Vaccine, vol. 28, pp. B32-B37, 2010.
Shultz, et al., Generation of Functional Human T-Cell Subsets With HLA-Restricted Immune Responses in HLA Class I Expressing Nod/Scid/Il2rγnull Humanized Mice, Proceedings of the National Academy of Sciences, vol. 107, No. 29, pp. 13022-13027, 2010.
Shultz, et al., Human Lymphoid and Myeloid Cell Development in NOD/LtSz-scid IL2Rγnull Mice Engrafted With Mobilized Human Hemopoietic Stem Cells, the Journal of Immunology, vol. 174, No. 10, pp. 6477-6489, 2005.
Shultz, et al., Humanized Mice from Immune System Investigation: Progress, Promise, and Challenges, Nature Reviews Immunology, vol. 12, No. 11, pp. 786-798, Nov. 1, 2012.
Tonomura, et al., Antigen-Specific Human T-Cell Responses and T Cell-Dependent Production of Human Antibodies in a Humanized Mouse Model, Blood, vol. 111, No. 8, pp. 4293-4296, 2008.
Verhoeyen, et al., Reshaping Human Antibodies: Grafting an Antilysozyme Activity, Science, vol. 239, No. 4847, pp. 1534-1536, Mar. 25, 1988.
U.S. Appl. No. 16/073,472 2019/0062409 U.S. Pat. No. 11,142,566, filed Jul. 27, 2018 Feb. 28, 2019 Oct. 12, 2021, Jeremy Luban.
U.S. Appl. No. 17/470,463 2022/0106385, filed Sep. 9, 2021 Apr. 7, 2022, Jeremy Luban.

* cited by examiner

Fig. 18

MODIFIED HIV-1 PROVIRAL VECTORS WITH ENHANCED DENDRITIC CELL TRANSDUCTION EFFICIENCIES COMPRISING THE JRFL ENVELOPE

RELATED APPLICATIONS

This application is a divisional of U.S. patent application Ser. No. 16/073,472, filed Jul. 27, 2018, now U.S. Pat. No. 11,142,566, which is a 35 U.S.C. § 371 filing of International Patent Application No. PCT/US2017/021426, filed Mar. 8, 2017, which claims the benefit of priority to U.S. Provisional Patent Application No. 62/305,891, filed Mar. 9, 2016. The entire contents of these applications are incorporated herein by reference for all purposes.

STATEMENT REGARDING FEDERALLY FUNDED RESEARCH

This invention was made with government support under grant no. DA034990 awarded by the National Institutes of Health. The government has certain rights in this invention.

INTRODUCTION

Antibodies are an important class of therapeutic agents. However, when used in vivo, certain antibodies, such antibodies of non-human origin, may cause undesired immunogenicity. One approach for reducing the immunogenicity of rodent antibodies involves the production of chimeric antibodies, in which mouse variable regions (Fv) are fused with human constant regions. However, mice injected with hybrids of human variable regions and mouse constant regions develop a strong anti-antibody response directed against the human variable region, suggesting that the retention of the entire rodent Fv region in such chimeric antibodies may still result in unwanted immunogenicity in patients.

Grafting of rodent complementarity determining region (CDR) loops of variable domains onto human frameworks (i.e., humanization) has been used to further minimize rodent sequences. However, CDR loop exchanges still do not uniformly result in an antibody with the same binding properties as the antibody of origin. While the use of CDR grafting and framework residue preservation in a number of humanized antibody constructs has been reported, it is difficult to predict if a particular sequence will result in the antibody with the desired binding, and sometimes biological, properties.

Accordingly, there is a pressing need for an efficient means of generating fully human antibodies for use in the treatment of human disorders, such as inflammatory, autoimmune, proliferative, and infectious disorders. Such antibodies will preferably exhibit low immunogenicity in human subjects, allowing for repeated administration without adverse immune responses. The present invention provides a solution that addresses the problems of conventionally engineered antibodies, and in particular, provides a high titer pool of fully human, neutralizing antibodies against HIV-1 or against any heterologous protein of interest.

SUMMARY

The present invention provides highly efficient methods, and compositions related thereto, for generating high titer human antibodies or antibody fragments thereof in a mammalian subject. In an embodiment, the methods comprise the steps of: a) administering a virus or virus-like particle comprising the nucleotide sequence set forth in SEQ ID NO:15 to a mammal comprising heterologous immune cells; and b) isolating a population of mammalian immunoglobulin-producing cells from the mammal, thereby producing the antibodies or antibody fragments thereof.

In another embodiment, the methods further comprise the steps of: c) reverse transcribing VH and VL mRNA of the cell population into a pooled population of VH and VL cDNA sequences; d) cloning the pooled population of DNA fragments into expression vectors; and e) expressing the cloned DNA fragments, thereby producing the antibodies or fragments thereof.

In another embodiment, the methods further comprise the steps of: c) fusing the immunoglobulin-producing cells with myeloma cells to form parental hybridoma cells; and d) culturing the hybridoma cells, thereby producing the antibodies or antibody fragments thereof.

In yet another embodiment, the methods further comprise the steps of: c) fusing the immunoglobulin-producing cells with myeloma cells to form a population of parental hybridoma cells; d) culturing the population of hybridoma cells; e) reverse transcribing VH and VL mRNA of the cell population into a pooled population of VH and VL cDNA sequences; f) cloning the pooled population of DNA fragments into expression vectors and amplifying the cloned expression vectors; h) selecting a subpopulation of expression vectors which encodes antibodies or antibody fragments directed against a virus or virus-like particle encoded protein; i) and amplifying the subpopulation selected, thereby producing the antibodies or antibody fragments thereof.

In an embodiment of the invention, the heterologous immune cells are human immune cells. In an embodiment, the mammal is a non-human mammal. In an embodiment, the mammal is a rodent. In an embodiment, the rodent is a mouse. In an embodiment, mouse is a transgenic mouse. In a certain embodiment, the transgenic mouse lacks mature lymphocytes and natural killer (NK) cells. In a particular embodiment, the transgenic mouse is a NOD-scid IL2R$\gamma^{null}$ mouse strain.

In an embodiment of the invention, the transgenic mouse comprises engrafted human tissue, the tissue comprising one or more tissues selected from the group consisting of human fetal thymus tissue, human fetal liver tissue, and human CD34$^+$ fetal liver cells. In a certain embodiment, the human fetal thymus tissue and/or human fetal liver tissue is engrafted under the mouse kidney capsule. In a particular embodiment, the human CD34$^+$ fetal liver cells are engrafted systemically.

In an embodiment, the invention provides human antibodies or antibody fragments thereof. In another embodiment, the human antibodies are anti-HIV-1 antibodies. In yet another embodiment, the human antibodies are anti-HIV-1 neutralizing antibodies.

In an embodiment of the invention, the virus or virus-like particle further comprises a nucleotide sequence encoding a heterologous protein. In another embodiment, the heterologous protein is the outer surface protein A (OspA) of the spirochete *Borrelia burgdorferi*. In yet another embodiment, the human antibodies are anti-OspA antibodies.

In an embodiment, the invention provides an isolated nucleic acid comprising a nucleotide sequence at least about 60%, 65%, 70%, 75%, 80%, 85%, 90%, 95%, 96%, 97%, 98%, 99% identity to SEQ ID NO:1, wherein the isolated nucleic acid comprises at least one nucleotide sequence selected from the group consisting of SEQ ID NOS:2, 3, and 4. In another embodiment, the isolated nucleic acid comprises a nucleotide sequence selected from the group consisting of SEQ ID NOS:5, 6, 7, 8, 9, 10, and 11.

In an embodiment, the invention provides a vector comprising an isolated nucleic acid any of the nucleic acid sequences recited herein, wherein the vector optionally comprises a deletion of a viral envelope gene.

In an embodiment of the invention, the vector encodes a provirus comprising a gene encoding a protein that alters at least one viral function, wherein the at least one viral function is selected from the group consisting of target cell binding, target cell fusion, provirus integration, provirus reverse transcription activity, provirus translation activity, and virion assembly. In an embodiment, the target cell is a DC and the at least one viral function is provirus integration. In an embodiment, the provirus integrates into the DC genome at a frequency of at least about 1.34%. In an embodiment, the target cell is a DC, and wherein the at least one viral function is provirus reverse transcription activity. In an embodiment, the provirus reverse transcription activity is between $1 \times 10^3$ and $8 \times 10^3$ HIV-1 genome copies per cell, as measured by polymerase chain reaction. In an embodiment, the provirus reverse transcription activity is between $10^5$ and $10^6$ HIV-1 genome copies per ml, as measured by polymerase chain reaction.

In an embodiment of the invention, the provirus encodes a protein that alters at least one target cell function. In a particular embodiment, the target cell is selected from the group consisting of a dendritic cell (DC), a helper T (Th) cell, and a cytotoxic T (TC) cell. In a certain embodiment, the target cell is a DC and the at least one target cell function is DC activation.

In an embodiment, the invention provides an isolated host cell comprising any of the vectors recited herein. In an embodiment, the host cell is a prokaryotic or a eukaryotic cell. In an embodiment, the eukaryotic cell is a mammalian cell. In an embodiment, the mammalian cell is a HEK cell.

In an embodiment, the invention provides a method of producing a recombinant virus or virus-like particle, the method comprising culturing an isolated host cell in culture medium such that a recombinant virus or virus-like particle is produced. In an embodiment, the virus or virus-like particle is a replication incompetent virus or virus-like particle.

In an embodiment, the invention provides a method of altering an immune response in a mammal, the method comprising administering a recombinant virus or virus-like particle to a DC such that an immune response is altered. In an embodiment, the recombinant virus or virus-like particle is administered to the DC in vivo. In an embodiment, the recombinant virus or virus-like particle is administered to the DC ex vivo. In an embodiment, the immune response is selected from the group consisting of DC activation, Th activation, TC activation, B cell maturation, B cell activation, and antibody production.

In an embodiment, the invention provides a composition comprising a virally transduced DC, wherein the DC is transduced with a recombinant virus or virus-like particle. In an embodiment, the composition is a pharmaceutical composition. In an embodiment, the pharmaceutical composition is a vaccine. In an embodiment, the invention provides a method of treating a disease or disorder in a mammal, the method comprising administering a composition recited herein to the mammal, thereby treating the disease or disorder In an embodiment, the invention provides a method of treating a disease or disorder in a mammal, the method comprising administering a virus or virus-like particle comprising the nucleotide sequence set forth in SEQ ID NO: 15 to the mammal, thereby treating the disease or disorder.

In an embodiment, the invention provides a hybridoma produced according to any method recited herein. In another embodiment, the invention provides a monoclonal antibody isolated from a hybridoma. In an embodiment, the monoclonal antibody is a human antibody. In another embodiment, the invention provides a library of antibodies or antibody fragments thereof produced according to any method recited herein.

BRIEF DESCRIPTION OF THE FIGURES

FIG. 18 depicts a PAGE gel showing that NSG-BLT transgenic mice generated human IgG and IgA antibodies against OspA upon challenge with the engineered viruses.

DETAILED DESCRIPTION

Figure 1A:
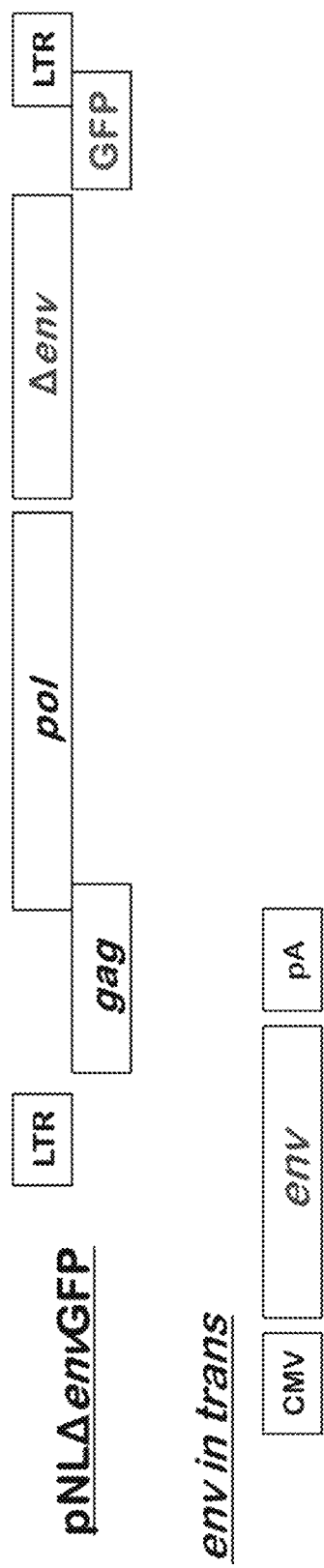
FIG. 1A depicts a schematic of the two-plasmid lentiviral system for generating pseudotyped lentivirus.

Antibodies are an important class of therapeutic agents. However, when used in vivo, certain antibodies may cause undesired immunogenicity. As most monoclonal antibodies are derived from rodents, repeated use in humans results in the generation of an immune response against the therapeutic antibody, e.g., human against mouse antibodies or HAMA. Such an immune response results in a loss of therapeutic efficacy at a minimum and a potentially fatal anaphylactic response at a maximum. One approach for reducing the immunogenicity of rodent antibodies involves the production of chimeric antibodies, in which mouse variable regions (Fv) are fused with human constant regions (see Liu et al., Proc. Natl. Acad. Sci., 1987; 84:3439-3443). However, mice injected with hybrids of human variable regions and mouse constant regions develop a strong anti-antibody response directed against the human variable region, suggesting that the retention of the entire rodent Fv region in such chimeric antibodies may still result in unwanted immunogenicity in patients.

Additionally, grafting of rodent complementarity determining region (CDR) loops of variable domains onto human frameworks (i.e., humanization) has been used to further minimize rodent sequences (see Jones et al., Nature, 1986; 321:522-535; Verhoeyen et al., Science, 1988; 239:1534-1536). However, CDR loop exchanges still do not uniformly result in an antibody with the same binding properties as the antibody of origin. Changes in framework residues (FR), residues involved in CDR loop support, in humanized antibodies also are often required to preserve antigen binding affinity (see Kabat et al., J. Immunol., 1991; 147:1709-1719). While the use of CDR grafting and framework residue preservation in a number of humanized antibody constructs has been reported, it is difficult to predict if a particular sequence will result in the antibody with the desired binding, and sometimes biological, properties (see Queen et al., Proc. Natl. Acad. Sci., 1989; 86:10029-10033); Gorman et al., Proc. Natl. Acad. Sci., 1991; 88:4181-4185; and Hodgson, J., Biotechnology, 1991; 9:421-425).

Accordingly, there is a pressing need for an efficient means of generating fully human antibodies for use in the treatment of human disorders, such as inflammatory, autoimmune, proliferative, and infectious disorders. Such antibodies will preferably exhibit low immunogenicity in human subjects, allowing for repeated administration without adverse immune responses. The present invention provides a solution that addresses the problems of conventionally engineered antibodies, and in particular, provides a high titer pool of fully human, neutralizing antibodies against HIV-1, as well as other heterologous proteins.

1. HIV-1

The acronym "HIV" or terms "AIDS virus" or "human Immunodeficiency virus" are used herein to refer to these HIV viruses, and HIV-related and -associated viruses, generically. As used herein, the terms "virus-like particle" or "VLP" refer to a nonreplicating, viral shell, preferably derived entirely or partially from virus proteins. VLPs are generally composed of one or more viral proteins, such as, but not limited to those proteins referred to as capsid, coat, shell, surface and/or envelope proteins, or particle-forming polypeptides derived from these proteins. VLPs can form spontaneously upon recombinant expression of the protein in an appropriate expression system. Methods for producing particular VLPs are known in the art and discussed more fully below. The presence of VLPs following recombinant expression of viral proteins can be detected using conventional techniques known in the art, such as by electron microscopy, biophysical characterization, and the like (see Baker et al., Biophys. J., 1991; 60:1445-1456; Hagensee et al., J. Virol., 1994: 68:4503-4505). For example, VLPs can be isolated by density gradient centrifugation and/or identified by characteristic density banding (e.g., Examples). Alternatively, cryoelectron microscopy can be performed on vitrified aqueous samples of the VLP preparation in question, and images recorded under appropriate exposure conditions.

By conventional criteria, anti-HIV-1 immunity is detected in most people who are HIV-1-infected. Yet, they can be secondarily infected with HIV-1, and unless treated with anti-retrovirals, they progress to AIDS. Effective antiviral immunity requires that, in addition to presenting viral peptides, and elaborating accessory molecules that stimulate proliferation, dendritic cells must provide a third signal (e.g., IL-12) to naïve T cells. There are many ways that a dendritic cell can be matured to present antigen, though the outcome of T cell priming may be antigen-specific immunization or antigen-specific tolerance. Generation of the third signal requires that pattern recognition receptors be activated directly within the antigen presenting dendritic cell. HIV-1 encounter with dendritic cells results in efficient antigen presentation. However, because the dendritic cell has multiple blocks to HIV-1 replication, pattern recognition receptors are not activated, and dendritic cell maturation is insufficient to generate the third signal. Hence, the immune response to HIV-1 is not protective and may even be tolerogenic.

Productive infection of dendritic cells by HIV-1 is blocked at two major steps in the replication cycle. The first block occurs at non-productive entry pathways that utilize DC-SIGN or other lectins over the productive CD4/CCR5 entry pathway. This block to productive entry can be overcome by pseudo-typing HIV-1 virions with the vesicular stomatitis virus glycoprotein. VSV G-pseudotyping drives fusion of HIV-1 virions from endosomes into the cytoplasm where productive infection (reverse transcription) can occur.

The second block occurs during reverse transcription. SAMHD1, a myeloid-specific, triphosphohydrolase, maintains low dNTP levels in the dendritic cell cytoplasm, thereby preventing reverse transcription. This block can be overcome by expressing the viral gene Vpx. Vpx promotes SAMHD1 degradation, thereby increasing the levels of dNTPs needed for reverse transcription. Accordingly, Vpx can be provided in cis or in trans to increase HIV-1 transduction efficiency.

The result of VSV G-pseudotyping and Vpx incorporation into HIV-1 virions is that high-efficiency HIV-1 transduction of dendritic cells can be achieved. The present invention provides for methods of administering an HIV-1 virus comprising a pseudotyped envelope to a transgenic mammal comprising heterologous (i.e., human) immune cells, thereby resulting in the generation of a robust and protective anti-HIV-1 immune response. The anti-HIV-1 immune response is characterized by the generation of high-titer human anti-HIV-1 neutralization antibodies.

2. Antibodies

The present invention provides highly efficient methods, and compositions related thereto, for generating high titer human antibodies or antibody fragments thereof in a mammalian subject. The methods comprise administering a virus or virus-like particle to a mammal comprising heterologous immune cells and isolating a population of immunoglobulin-producing cells from the mammal, thereby producing the antibodies or antibody fragments thereof. Of particular significance, the methods provided for by the present invention allow for heterologous proteins to be presented by the recombinant virus. Accordingly, the generation of human antibodies against any antigenic peptide is envisaged and described herein. In particular, it is contemplated that the present invention can be utilized to generate human antibodies against: emerging viruses of any type, for example, Ebola or Chikungunya virus; influenza antigens; antibiotic-resistant bacteria, for example, MRSA and drug-resistant Tuberculosis; tumor-specific antigens; and Rd D antigen, to treat hemolytic disease of the newborn.

The term "antibody" broadly refers to any immunoglobulin (Ig) molecule comprised of four polypeptide chains, two heavy (H) chains and two light (L) chains, or any functional fragment, mutant, variant, or derivative thereof that retains the essential epitope binding features of an Ig molecule. Such mutant, variant, or derivative antibody formats are known in the art, non-limiting embodiments of which are discussed below.

In a full-length antibody, each heavy chain is comprised of a heavy chain variable region (abbreviated herein as HCVR or VH) and a heavy chain constant region. The heavy chain constant region is comprised of three domains, CH1, CH2 and CH3. Each light chain is comprised of a light chain variable region (abbreviated herein as LCVR or VL) and a light chain constant region. The light chain constant region is comprised of one domain, CL. The VH and VL regions can be further subdivided into regions of hypervariability, termed complementarity determining regions (CDR), interspersed with regions that are more conserved, termed framework regions (FR). Each VH and VL is composed of three CDRs and four FRs, arranged from amino-terminus to carboxy-terminus in the following order: FR1, CDR1, FR2, CDR2, FR3, CDR3, FR4. Immunoglobulin molecules can be of any type (e.g., IgG, IgE, IgM, IgD, IgA and IgY), class (e.g., IgG 1, IgG2, IgG 3, IgG4, IgA1 and IgA2) or subclass.

The term "antibody fragment" refers to a portion of an antibody that retains some ability to selectively bind the epitopic determinant. Examples of an antibody fragment include:

(i) Fab, the fragment which contains a monovalent antigen-binding fragment of an antibody molecule can be produced by digestion of whole antibody with the enzyme papain to yield an intact light chain and a portion of one heavy chain;

(ii) Fab', the fragment of an antibody molecule can be obtained by treating whole antibody with pepsin, followed by reduction, to yield an intact light chain and a portion of the heavy chain; two Fab' fragments are obtained per antibody molecule;

(iii) F(ab')2, the fragment of the antibody that can be obtained by treating whole antibody with the enzyme pepsin without subsequent reduction; F(ab')2 is a dimer of two Fab' fragments held together by two disulfide bonds;

(iv) scFv, including a genetically engineered fragment containing the variable region of a heavy and a light chain as a fused single chain molecule.

General methods of making these fragments are known in the art. (See for example, Harlow and Lane, Antibodies: A Laboratory Manual, Cold Spring Harbor Laboratory, New York (1988), which is incorporated herein by reference).

As used herein, the terms "antigen" or "immunogen" are used interchangeably to refer to a substance, typically a protein, which is capable of inducing an immune response in a subject. The term also refers to proteins that are immunologically active in the sense that once administered to a subject (either directly or by administering to the subject a nucleotide sequence or vector that encodes the protein) is able to evoke an immune response of the humoral and/or cellular type directed against that protein.

The terms "protein", "peptide", "polypeptide", and "amino acid sequence" are used interchangeably herein to refer to polymers of amino acid residues of any length. The polymer may be linear or branched, it may comprise modified amino acids or amino acid analogs, and it may be interrupted by chemical moieties other than amino acids. The terms also encompass an amino acid polymer that has been modified naturally or by intervention; for example disulfide bond formation, glycosylation, lipidation, acetylation, phosphorylation, or any other manipulation or modification, such as conjugation with a labeling or bioactive component.

It should be understood that the proteins, including the antibodies and/or antigens of the invention may differ from the exact sequences illustrated and described herein. Thus, the invention contemplates deletions, additions and substitutions to the sequences shown, so long as the sequences function in accordance with the methods of the invention. In this regard, particularly preferred substitutions will generally be conservative in nature, i.e., those substitutions that take place within a family of amino acids. For example, amino acids are generally divided into four families: (1) acidic-aspartate and glutamate; (2) basic-lysine, arginine, histidine; (3) non-polar-alanine, valine, leucine, isoleucine, proline, phenylalanine, methionine, tryptophan; and (4) uncharged polar-glycine, asparagine, glutamine, cystine, serine threonine, tyrosine. Phenylalanine, tryptophan, and tyrosine are sometimes classified as aromatic amino acids. It is reasonably predictable that an isolated replacement of leucine with isoleucine or valine, or vice versa; an aspartate with a glutamate or vice versa; a threonine with a serine or vice versa; or a similar conservative replacement of an amino acid with a structurally related amino acid, will not have a major effect on the biological activity. Proteins having substantially the same amino acid sequence as the sequences illustrated and described but possessing minor amino acid substitutions that do not substantially affect the immunogenicity of the protein are, therefore, within the scope of the invention.

As used herein the terms "nucleotide sequences" and "nucleic acid sequences" refer to deoxyribonucleic acid (DNA) or ribonucleic acid (RNA) sequences, including, without limitation, messenger RNA (mRNA), DNA/RNA hybrids, or synthetic nucleic acids. The nucleic acid can be single-stranded, or partially or completely double-stranded (duplex). Duplex nucleic acids can be homoduplex or heteroduplex.

As used herein the term "transgene" may be used to refer to "recombinant" nucleotide sequences that may be derived from any of the nucleotide sequences encoding the proteins of the present invention. The term "recombinant" means a nucleotide sequence that has been manipulated "by man" and which does not occur in nature, or is linked to another nucleotide sequence or found in a different arrangement in nature. It is understood that manipulated "by man" means manipulated by some artificial means, including by use of machines, codon optimization, restriction enzymes, etc.

For example, in one embodiment the nucleotide sequences may be mutated such that the activity of the encoded proteins in vivo is abrogated. In another embodiment the nucleotide sequences may be codon optimized, for example the codons may be optimized for human use. In certain embodiments the nucleotide sequences of the invention are both mutated to abrogate the normal in vivo function of the encoded proteins, and codon optimized for human use. For example, each of the Gag, Pol, Env, Nef, RT, and Int sequences of the invention may be altered in these ways.

As regards codon optimization, the nucleic acid molecules of the invention have a nucleotide sequence that encodes the antigens of the invention and can be designed to employ codons that are used in the genes of the subject in which the antigen is to be produced. Many viruses, including HIV and other lentiviruses, use a large number of rare codons and, by altering these codons to correspond to codons commonly used in the desired subject, enhanced expression of the antigens can be achieved. In an embodiment, the codons used are "humanized" codons, i.e., the codons are those that appear frequently in highly expressed human genes (Andre et al., J. Virol. 72:1497-1503, 1998) instead of those codons that are frequently used by HIV. Such codon usage provides for efficient expression of the transgenic HIV proteins in human cells. Any suitable method of codon optimization may be used. Such methods, and the selection of such methods, are well known to those of skill in the art. In addition, there are several companies that will optimize codons of sequences. Thus, the nucleotide sequences of the invention can readily be codon optimized.

The invention further encompasses nucleotide sequences encoding functionally and/or antigenically equivalent variants and derivatives of the antigens of the invention and functionally equivalent fragments thereof. These functionally equivalent variants, derivatives, and fragments display the ability to retain antigenic activity. For instance, changes in a DNA sequence that do not change the encoded amino acid sequence, as well as those that result in conservative substitutions of amino acid residues, one or a few amino acid deletions or additions, and substitution of amino acid residues by amino acid analogs are those which will not significantly affect properties of the encoded polypeptide. Conservative amino acid substitutions are glycine/alanine; valine/isoleucine/leucine; asparagine/glutamine; aspartic acid/glutamic acid; serine/threonine/methionine; lysine/arginine; and phenylalanine/tyrosine/tryptophan. In one embodiment, the variants have at least 50%, at least 55%, at least 60%, at least 65%, at least 70%, at least 75%, at least 80%, at least 85%, at least 86%, at least 87%, at least 88%, at least 89%, at least 90%, at least 91%, at least 92%, at least 93%, at least 94%, at least 95%, at least 96%, at least 97%, at least 98% or at least 99% homology or identity to the antigen, epitope, immunogen, peptide or polypeptide of interest.

For the purposes of the present invention, sequence identity or homology is determined by comparing the sequences when aligned so as to maximize overlap and identity while minimizing sequence gaps. In particular, sequence identity may be determined using any of a number of mathematical algorithms. A non-limiting example of a mathematical algorithm used for comparison of two sequences is the algorithm of Karlin & Altschul, Proc. Natl. Acad. Sci. USA, 1990; 87: 2264-2268, modified as in Karlin & Altschul, Proc. Natl. Acad. Sci. USA, 1993; 90: 5873-5877.

Another example of a mathematical algorithm used for comparison of sequences is the algorithm of Myers & Miller, CABIOS, 1988; 4: 11-17. Such an algorithm is incorporated into the ALIGN program (version 2.0) which is part of the GCG sequence alignment software package. When utilizing the ALIGN program for comparing amino acid sequences, a PAM120 weight residue table, a gap length penalty of 12, and a gap penalty of 4 can be used. Yet another useful algorithm for identifying regions of local sequence similarity and alignment is the FASTA algorithm as described in Pearson & Lipman, Proc. Natl. Acad. Sci. USA, 1988; 85: 2444-2448.

Advantageous for use according to the present invention is the WU-BLAST (Washington University BLAST) version 2.0 software. This program is based on WU-BLAST version 1.4, which in turn is based on the public domain NCBI-BLAST version 1.4 (see Altschul & Gish, 1996, Local alignment statistics, Doolittle ed., Methods in Enzymology 266: 460-480; Altschul et al., Journal of Molecular Biology, 1990; 215: 403-410; Gish & States, 1993; Nature Genetics 3: 266-272; Karlin & Altschul, 1993; Proc. Natl. Acad. Sci. USA, 90: 5873-5877; all of which are incorporated by reference herein).

The various recombinant nucleotide sequences and antibodies and/or antigens of the invention are made using standard recombinant DNA and cloning techniques. Such techniques are well known to those of skill in the art. See for example, "Molecular Cloning: A Laboratory Manual", second edition (Sambrook et al. 1989).

2. Vectors

The nucleotide sequences of the present invention may comprise or be inserted into "vectors." The term vector is widely used and understood by those of skill in the art, and as used herein, the term vector is used consistent with its meaning to those of skill in the art. For example, the term vector is commonly used by those skilled in the art to refer to a vehicle that allows or facilitates the transfer of nucleic acid molecules from one environment to another or that allows or facilitates the manipulation of a nucleic acid molecule.

Accordingly, the present invention provides viral vectors and their use in generating recombinant virus or virus-like particles. In an embodiment of the invention, any vector that allows expression of the antibodies and/or antigens of the present invention may be used in accordance with the present invention. In certain embodiments, the antigens and/or antibodies of the present invention may be used in vitro (such as using cell-free expression systems) and/or in cultured cells grown in vitro in order to produce the encoded HIV-antigens and/or antibodies which may then be used for various applications such as in the production of proteinaceous vaccines. For such applications, any vector that allows expression of the antigens and/or antibodies in vitro and/or in cultured cells may be used.

For applications where it is desired that the antibodies and/or antigens be expressed in vivo, for example when the transgenes of the invention are used in the generation of vaccines, such as dendritic cell-based or DNA-containing vaccines, any vector that allows for the expression of the antibodies and/or antigens of the present invention and is safe for use in vivo may be used. In certain embodiments the vectors used are safe for use in humans, mammals and/or laboratory animals.

For the antibodies and/or antigens of the present invention to be expressed, the protein coding sequence should be "operably linked" to regulatory or nucleic acid control sequences that direct transcription and translation of the protein. As used herein, a coding sequence and a nucleic acid control sequence or promoter are said to be "operably linked" when they are covalently linked in such a way as to place the expression or transcription and/or translation of the coding sequence under the influence or control of the nucleic acid control sequence. The "nucleic acid control sequence" can be any nucleic acid element, such as, but not limited to promoters, enhancers, IRES, introns, and other elements described herein that direct the expression of a nucleic acid sequence or coding sequence that is operably linked thereto. The term "promoter" will be used herein to refer to a group of transcriptional control modules that are clustered around the initiation site for RNA polymerase II and that when operationally linked to the protein coding sequences of the invention lead to the expression of the encoded protein. The expression of the transgenes of the present invention can be under the control of a constitutive promoter or of an inducible promoter, which initiates transcription only when exposed to some particular external stimulus, such as, without limitation, antibiotics such as tetracycline, hormones such as ecdysone, or heavy metals. The promoter can also be specific to a particular cell-type, tissue or organ. Many suitable promoters and enhancers are known in the art, and any such suitable promoter or enhancer may be used for expression of the transgenes of the invention. For example, suitable promoters and/or enhancers can be selected from the Eukaryotic Promoter Database (EPDB).

The vectors used in accordance with the present invention should typically be chosen such that they contain a suitable gene regulatory region, such as a promoter or enhancer, such that the antigens and/or antibodies of the invention can be expressed.

For example, when the aim is to express the antibodies and/or antigens of the invention in vitro, or in cultured cells, or in any prokaryotic or eukaryotic system for the purpose of producing the protein(s) encoded by that antibody and/or antigen, then any suitable vector can be used depending on the application. For example, plasmids, viral vectors, bacterial vectors, protozoan vectors, insect vectors, baculovirus expression vectors, yeast vectors, mammalian cell vectors, and the like, can be used. Suitable vectors can be selected by the skilled artisan taking into consideration the characteristics of the vector and the requirements for expressing the antibodies and/or antigens under the identified circumstances.

When the aim is to express the antibodies and/or antigens of the invention in vivo in a subject, for example in order to generate an immune response against an HIV-1 antigen and/or protective immunity against HIV-1, expression vectors that are suitable for expression in that subject, and that are safe for use in vivo, should be chosen. For example, in some embodiments it may be desired to express the antibodies and/or antigens of the invention in a laboratory animal, such as for pre-clinical testing of the HIV-1 immunogenic compositions and vaccines of the invention. In other embodiments, it will be desirable to express the antibodies and/or antigens of the invention in human subjects, such as in clinical trials and for actual clinical use of the immunogenic compositions and vaccine of the invention. Any vectors that are suitable for such uses can be employed, and it is well within the capabilities of the skilled artisan to select a suitable vector. In some embodiments it may be preferred that the vectors used for these in vivo applications are attenuated to prevent replication in the subject. For example, if plasmid vectors are used, preferably they will lack an origin of replication that functions in the subject so as to enhance safety for in vivo use in the subject. If viral vectors are used, preferably they are attenuated or replication-defective in the subject, again, so as to enhance safety for in vivo use in the subject.

In particular embodiments of the present invention viral vectors are used. Viral expression vectors are well known to those skilled in the art and include, for example, vectors derived from viruses such as adenoviruses, adeno-associated viruses (AAV), alphaviruses, herpesviruses, poxviruses, avipox viruses, attenuated poxviruses, vaccinia viruses, modified vaccinia viruses, retroviruses, and lentiviruses.

A particularly preferred lentiviral vector is one derived from HIV, most preferably HIV-1, HIV-2, or chimeric combinations thereof. Of course different serotypes of retroviruses, especially HIV, may be used singly or in any combination to prepare vectors for use in the present invention. In particular embodiments, vectors of the invention contain cis-acting elements that are present in the wild-type virus, but not present in a "basic" lentiviral vector. A "basic" lentiviral vector contains minimally, LTRs and packaging sequences in the 5' leader and gag encoding sequences, but can also optionally contain the RRE element to facilitate nuclear export of vector RNA in a Rev dependent manner. A preferred vector additionally contains nucleotide sequences that enhance the efficiency of transduction into cells.

An example of such a vector is pN2cGFP, a vector that contains the complete sequences of gag and pol. Another example is a vector that contains sequences from about position 4551 to position 5096 in pol (reference positions from the pNL4-3 sequence, Accession number M19921, HIVNL43 9709 bp, kindly provided by C. E. Buckler, NIAID, NIH, Bethesda, Md.). However any cis-acting sequence from the wt-HIV that can improve vector transduction efficiency may be used. Other examples of vectors capable of efficient transduction via the present invention are cr2HIV constructs as described in U.S. Pat. No. 5,885,806.

Additional examples of viral vector constructs that may be used in the present invention are found in U.S. Pat. No. 5,885,806, which is hereby incorporated by reference as if fully set forth. The constructs in U.S. Pat. No. 5,885,806 are merely examples that do not limit the scope of vectors that efficiently transduce cells. Instead, the constructs provide additional guidance to the skilled artisan that a viral vector for use with the present invention may contain minimal sequences from the wild-type virus or contain sequences up to almost the entire genome of wild-type virus, yet exclude an essential nucleic acid sequence required for replication and/or production of disease.

Furthermore, placing sequences from other viral backbones into viral vectors of interest, such as the cytomegalovirus (CMV), is also well known in the art. Regardless of the actual viral vector used, various accessory proteins encoded by, and sequences present in, the viral genetic material may be left in the vector or helper genomes if these proteins or sequences increase transduction efficiency in certain cell types. Numerous routine screens are available to determine whether certain genetic material increases transduction efficiency by incorporating the sequence in either the vector or helper genomes. A certain embodiment of the invention is to not include accessory proteins in either the vector or helper genomes. But this preference does not exclude embodiments of the invention where accessory proteins and other sequences are left in either the vector or a helper genome to increase transduction efficiency.

The viral vectors used in the present invention may also result from "pseudotype" formation, where co-infection of a cell by different viruses produces progeny virions containing the genome of one virus encapsulated within an outer layer containing one or more envelope protein of another virus. This phenomenon has been used to package viral vectors of interest in a "pseudotyped" virion by co-transfecting or co-infecting a packaging cell with both the viral vector of interest and genetic material encoding at least one envelope protein of another virus or a cell surface molecule. See U.S. Pat. No. 5,512,421. Such mixed viruses can be neutralized by anti-sera against the one or more heterologous envelope proteins used. One virus commonly used in pseudotype formation is the vesicular stomatitis virus (VSV), which is a rhabdovirus. The use of pseudotyping broadens the host cell range of the virus by including elements of the viral entry mechanism of the heterologous virus used.

Pseudotyping of viral vectors and VSV for use in the present invention results in viral particles containing the viral vector nucleic acid encapsulated in a nucleocapsid which is surrounded by a membrane containing the VSV G protein. The nucleocapsid preferably contains proteins normally associated with the viral vector. The surrounding VSV G protein containing membrane forms part of the viral particle upon its egress from the cell used to package the viral vector. Examples of packaging cells are described in U.S. Pat. No. 5,739,018. In a certain embodiment of the invention, the viral particle is derived from HIV and pseudotyped with VSV G protein. Pseudotyped viral particles containing the VSV G protein can infect a diverse array of cell types with higher efficiency than amphotropic viral vectors. The range of host cells include both mammalian and non-mammalian species, such as humans, rodents, fish, amphibians and insects. In certain embodiments of the present invention, HIV-1 viral particles are pseudotyped with either JRCSF or JRFL proteins which provide distinct cellular tropisms (see Koyanagi et al., 1987, Science; 236: 819-822). In particular embodiments, the viral particles are pseudotyped with the JRFL protein which allows the virions to bind to and transduce dendritic cells.

Viral vectors for use in the transduction methods of the invention can also comprise and express one or more nucleic acid sequences under the control of a promoter present in the virus or under the control of a heterologous promoter introduced into the vector. The promoters may further contain insulatory elements, such as erythroid DNAse hypersensitive sites, so as to flank the operon for tightly controlled gene expression. Preferred promoters include the HIV-LTR, CMV promoter, PGK, U1, EBER transcriptional units from Epstein Barr Virus, tRNA, U6 and U7. While Pol II promoters are preferred, Pol III promoters may also be used. Tissue specific promoters are also embodied by the present invention. For example, the beta globin Locus Control Region enhancer and the alpha and beta globin promoters can provide tissue specific expression in erythrocytes and erythroid cells. Another embodiment is to use cis-acting sequences that are associated with the promoters. For example, The U1 gene may be used to enhance antisense gene expression where non-promoter sequences are used to target the antisense or ribozymes molecule to a target spliced RNA as set out in U.S. Pat. No. 5,814,500, which is hereby incorporated by reference.

Of course any cis-acting nucleotide sequences from a virus may be incorporated into the viral vectors of the invention. In particular, cis-acting sequences found in retroviral genomes are preferred. For example, cis-acting nucleotide sequence derived from the gag, pol, env, vif, vpr, vpu, tat or rev genes may be incorporated into the viral vectors of the invention to further increase transduction efficiency. Preferably, a cis-acting sequence does not encode an expressed polypeptide; is not expressed as a polypeptide or part thereof due to genetic alteration, such as deletion of a translational start site; encodes only a portion or fragment of a larger polypeptide; or is a mutant sequence containing one or more substitutions, additions, or deletions from the native sequence. An example of a cis-acting sequence is the cPPT (central polypurine tract) sequence identified within the HIV pol gene.

Said one or more nucleotide sequence in the viral vectors of the invention may be found in the virus from which the vector is derived or be a "heterologous" sequence. The sequence is preferably a full-length or partial sequence that is or encodes a gene product of interest. Such sequences and gene products are preferably biologically active agents capable of producing a biological effect in a cell. Examples of such agents include proteins, ribonucleic acids, enzymes, transporters or other biologically active molecules. In a particular embodiment of the present invention, a heterologous sequence is the outer surface protein A (OspA) of the spirochete *Borrelia burgdorferi*.

The nucleotide sequences and vectors of the invention can be delivered to cells, for example, if the aim is to express the HIV-1 antigens in cells in order to produce and isolate the expressed proteins, such as from cells grown in culture. For expressing the antibodies and/or antigens in cells any suitable transfection, transformation, or gene delivery methods can be used. Such methods are well known by those skilled in the art, and one of skill in the art would readily be able to select a suitable method depending on the nature of the nucleotide sequences, vectors, and cell types used. For example, transfection, transformation, microinjection, infection, electroporation, lipofection, or liposome-mediated delivery could be used. Expression of the antibodies and/or antigens can be carried out in any suitable type of host cells, such as bacterial cells, yeast, insect cells, mammalian cells, and mammalian hybridoma cells. The antibodies and/or antigens of the invention can also be expressed using including in vitro transcription/translation systems. All of such methods are well known by those skilled in the art, and one of skill in the art would readily be able to select a suitable method depending on the nature of the nucleotide sequences, vectors, and cell types used.

Following expression, the antibodies and/or antigens of the invention can be isolated and/or purified or concentrated using any suitable technique known in the art. For example, anion or cation exchange chromatography, phosphocellulose chromatography, hydrophobic interaction chromatography, affinity chromatography, immuno-affinity chromatography, hydroxyapatite chromatography, lectin chromatography, molecular sieve chromatography, isoelectric focusing, gel electrophoresis, or any other suitable method or combination of methods can be used.

In particular embodiments, the nucleotide sequences, antibodies and/or antigens of the invention are administered in vivo, for example where the aim is to produce an immunogenic response in a subject. A "subject" in the context of the present invention may be any animal. For example, in some embodiments it may be desired to express the transgenes of the invention in a laboratory animal, such as for pre-clinical testing of the HIV-1 immunogenic compositions and vaccines of the invention. In other embodiments, it will be desirable to express the antibodies and/or antigens of the invention in human subjects, such as in clinical trials and for actual clinical use of the immunogenic compositions and vaccine of the invention. In certain embodiments the subject is a human, for example a human that is infected with, or is at risk of infection with, HIV-1.

For such in vivo applications, the nucleotide sequences, antibodies and/or antigens of the invention are preferably administered as a component of an immunogenic composition comprising the nucleotide sequences and/or antigens of the invention in admixture with a pharmaceutically acceptable carrier. The immunogenic compositions of the invention are useful to stimulate an immune response against HIV-1 and may be used as one or more components of a prophylactic or therapeutic vaccine against HIV-1 for the prevention, amelioration or treatment of AIDS. The nucleic acids and vectors of the invention are particularly useful for providing genetic vaccines, i.e. vaccines for delivering the nucleic acids encoding the antibodies and/or antigens of the invention to a subject, such as a human, such that the antibodies and/or antigens are then expressed in the subject to elicit an immune response.

3. Transduction

The present invention also provides highly efficient methods, and compositions related thereto, for the stable transduction of target cells with viral vectors and viral particles. Of course any cell can be used in the practice of the invention. Preferably, the cell to be transduced is a eukaryotic cell. More preferably, the cell is a primary cell. Cell lines, however, may also be transduced with the methods of the invention and, in many cases, more easily transduced. In one embodiment of the invention, the cell to be transduced is a primary lymphocyte (such as a T lymphocyte) or a macrophage (such as a monocytic macrophage), or is a precursor to either of these cells, such as a hematopoietic stem cell. Other embodiments of the invention provide for transduction of cells of the hematopoietic system, or, more generally, cells formed by hematopoiesis as well as the stem cells from which they form. Such cells include granulocytes and lymphocytes formed by hematopoiesis as well as the progenitor pluripotent, lymphoid, and myeloid stem cells.

An embodiment of the present invention provides for the transduction of cells that aid in the functioning of immune system, such as antigen presenting dendritic cells. In a particular embodiment, the invention provides for the transduction of dendritic cells with an HIV-1 pseudotyped with an envelope that preferentially binds and fuses with dendritic cell membrane. In certain embodiments, the dendritic cells are virally transduced in vivo, whereas in other embodiments the dendritic cells are transduced ex vivo.

Incubation of the cells with the virus or virus-like particle may be for different lengths of time, depending on the conditions and materials used. Factors that influence the incubation time include the cell, vector and MOI (multiplicity of infection) used, the molecule(s) and amounts used to bind the cell surface, whether and how said molecule(s) are immobilized or solubilized, and the level of transduction efficiency desired.

A cell to be transduced can be present as a single entity, or can be part of a population of cells. Such a "population of cells" can comprise, for instance, a cell culture (either mixed or pure), a tissue (e.g., epithelial, stromal or other tissue), an organ (e.g., heart, lung, liver, gallbladder, urinary bladder, eye, and other organs), an organ system (e.g., circulatory system, respiratory system, gastrointestinal system, urinary system, nervous system, integumentary system or other organ system), a blastocyst, an embryonic stem cell a cell from a fetus (e.g. for the treatment of a genetic disorder/disease or for creating transgenic animals), diseased tissues such as a tumor or the site of an infection, or an organism (e.g., a bird, mammal, marine organism, fish, plant or the like). Preferably, the organs/tissues/cells being targeted are of the circulatory system (including for example, but not limited to heart, blood vessels, and blood), respiratory system (e.g., nose, pharynx, larynx, trachea, bronchi, bronchioles, lungs, and the like), gastrointestinal system (including for example mouth and oral tissues, pharynx, esophagus, stomach, intestines, salivary glands, pancreas, liver, gallbladder, and the like), mammary system (such as breast epithelial cells and supporting cells in the tissue), urinary system (such as kidneys, ureters, urinary bladder, urethra, and the like), nervous system (including, but not limited to, brain and spinal cord, and special sense organs, such as the eye) and integumentary system (e.g., skin).

4. Therapeutics

The present invention also includes the use of the transduced cells in other applications, including the production of useful gene products and proteins by expression of a nucleic acid present in the vector, or the therapy of living subjects afflicted or at risk of being afflicted with a disease. In an embodiment of the invention, the transduced cell is a dendritic cell. In another embodiment, the transduced dendritic cell comprises a dendritic cell vaccine.

The dendritic cell vaccine may be prepared from dendritic cells by any method without particular limitation. For example, the dendritic cells are mixed with an agent (such as physiological saline or a Ringer solution) that is commonly formulated in a vaccine preparation. In the method of producing a dendritic cell vaccine of the present invention, a sufficient amount of monocytes or dendritic cells for producing a dendritic cell vaccine can be prepared in a short period of time, and a dendritic cell vaccine can be timely prepared without requiring a store of monocytes or dendritic cells. Therefore, monocytes or dendritic cells optionally produced can be used without subjecting to cryopreservation for producing a dendritic cell vaccine. Consequently, damage of cells and a reduction in antigen-presenting ability of the dendritic cells by freezing can be avoided.

When provided prophylactically, the dendritic cell vaccine of the invention are ideally administered to a subject in advance of HIV infection, or evidence of HIV infection, or in advance of any symptom due to AIDS, especially in high-risk subjects. The prophylactic administration of the compositions can serve to provide protective immunity of a subject against HIV-1 infection or to prevent or attenuate the progression of AIDS in a subject already infected with HIV-1. When provided therapeutically, the compositions can serve to ameliorate and treat AIDS symptoms and are advantageously used as soon after infection as possible, preferably before appearance of any symptoms of AIDS but may also be used at (or after) the onset of the disease symptoms.

The compositions can be administered using any suitable delivery method including, but not limited to, intramuscular, intravenous, and intradermal. Such techniques are well known to those of skill in the art.

Immunization schedules (or regimens) are well known for animals (including humans) and can be readily determined for the particular subject and immunogenic composition. Hence, the immunogens can be administered one or more times to the subject. Preferably, there is a set time interval between separate administrations of the immunogenic composition. While this interval varies for every subject, typically it ranges from 10 days to several weeks, and is often 2, 4, 6 or 8 weeks. For humans, the interval is typically from 2 to 6 weeks. The immunization regimes typically have from 1 to 6 administrations of the immunogenic composition, but may have as few as one or two or four. The methods of inducing an immune response can also include administration of an adjuvant with the immunogens. In some instances, annual, biannual or other long interval (5-10 years) booster immunization can supplement the initial immunization protocol.

The present methods also include a variety of prime-boost regimens. In these methods, one or more priming immunizations are followed by one or more boosting immunizations. The actual immunogenic composition can be the same or different for each immunization and the type of immunogenic composition (e.g., containing protein or expression vector), the route, and formulation of the immunogens can also be varied. For example, if an expression vector is used for the priming and boosting steps, it can either be of the same or different type (e.g., DNA or bacterial or viral expression vector). One useful prime-boost regimen provides for two priming immunizations, four weeks apart, followed by two boosting immunizations at 4 and 8 weeks after the last priming immunization. It should also be readily apparent to one of skill in the art that there are several permutations and combinations that are encompassed using the DNA, bacterial and viral expression vectors of the invention to provide priming and boosting regimens.

The compositions of the invention can be administered alone, or can be co-administered, or sequentially administered, with other HIV immunogens and/or HIV immunogenic compositions, e.g., with "other" immunological, antigenic or vaccine or therapeutic compositions thereby providing multivalent or "cocktail" or combination compositions of the invention and methods of employing them. Again, the ingredients and manner (sequential or co-administration) of administration, as well as dosages can be determined taking into consideration such factors as the age, sex, weight, species and condition of the particular subject, and the route of administration.

When used in combination, the other HIV immunogens can be administered at the same time or at different times as part of an overall immunization regime, e.g., as part of a prime-boost regimen or other immunization protocol. In an advantageous embodiment, the other HIV immunogen is env, preferably the HIV env trimer.

Many other HIV immunogens are known in the art, one such certain immunogen is HIVA (described in WO 01/47955), which can be administered as a protein, on a plasmid (e.g., pTHr.HIVA) or in a viral vector (e.g., MVA-.HIVA). Another such HIV immunogen is RENTA (described in PCT/US2004/037699), which can also be administered as a protein, on a plasmid (e.g., pTHr.RENTA) or in a viral vector (e.g., MVA.RENTA).

For example, one method of inducing an immune response against HIV in a human subject comprises administering at least one priming dose of an HIV immunogen and at least one boosting dose of an HIV immunogen, wherein the immunogen in each dose can be the same or different, provided that at least one of the immunogens is an antibody, antigen or antibody-antigen complex of the present invention, a nucleic acid encoding an antibody, antigen or antibody-antigen complex of the invention or an expression vector, preferably an adenovirus vector, encoding an antibody, antigen or antibody-antigen complex of the invention, and wherein the immunogens are administered in an amount or expressed at a level sufficient to induce an HIV-specific immune response in the subject. The HIV-specific immune response can include an HIV-specific T-cell immune response or an HIV-specific B-cell immune response. Such immunizations can be done at intervals, preferably of at least 2-6 or more weeks.

It is to be understood and expected that variations in the principles of invention as described above may be made by one skilled in the art and it is intended that such modifications, changes, and substitutions are to be included within the scope of the present invention.

The invention will now be further described by way of the following non-limiting examples.

EXAMPLES

Example 1. Generation of HIV-1 Lentiviral Vectors and Infective Proviruses

Genetically divergent HIV-1 variants with distinct cellular tropisms have been isolated from individual patients. From one such patient identified as J.R., related but unique HIV-1 viruses were sequestered from frontal lobe brain tissue and cerebrospinal fluid. Accordingly, the viruses were identified as JR-FL (frontal lobe) and JR-CSF (cerebrospinal fluid), and while both viruses were capable of replicating in peripheral blood lymphocytes, only the JR-FL virus was able to replicate in monocytes or macrophages (see Koyanagi et al., 1987, Science; 236:819-822). Subsequent cloning and expression studies determined that the JR-FL and JR-CSF viruses contain unique env genes which confer their previously observed cellular tropisms (see Peters et al., 2004, J. Virol.; 78:6915-6926).

Figure 1B:
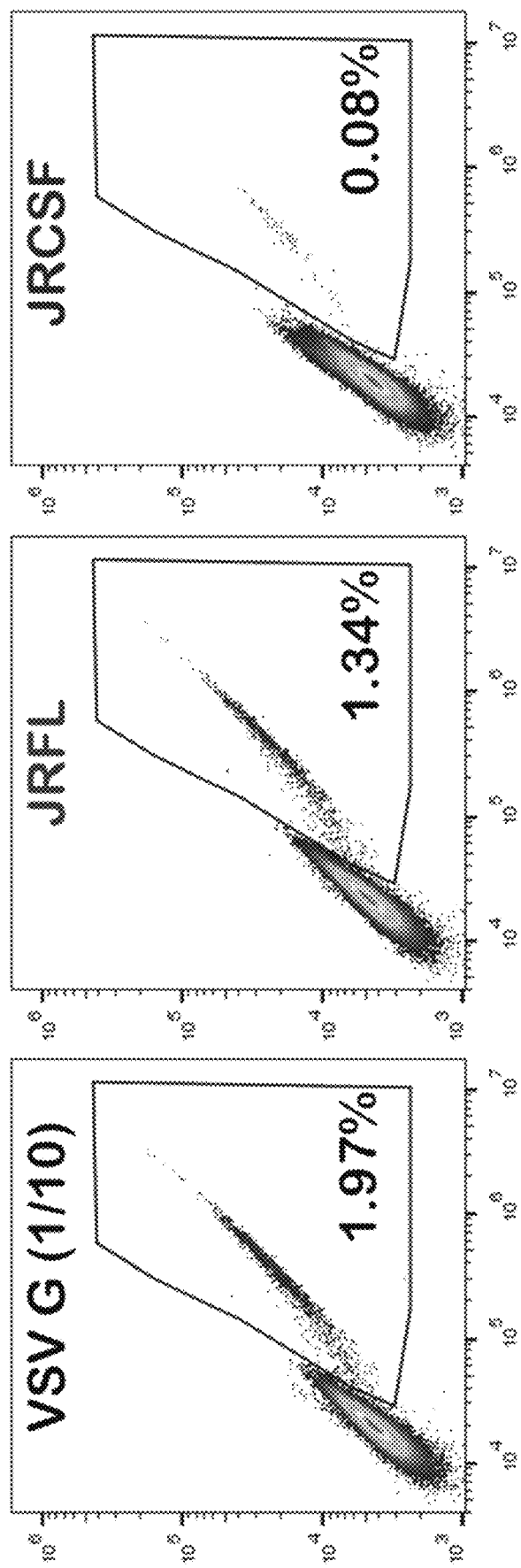
FIG. 1B depicts a FACS plot showing the transduction efficiency of VSV-G, JRFL, and JRCSF pseudotyped HIV-1 viruses.
Figure 1C:
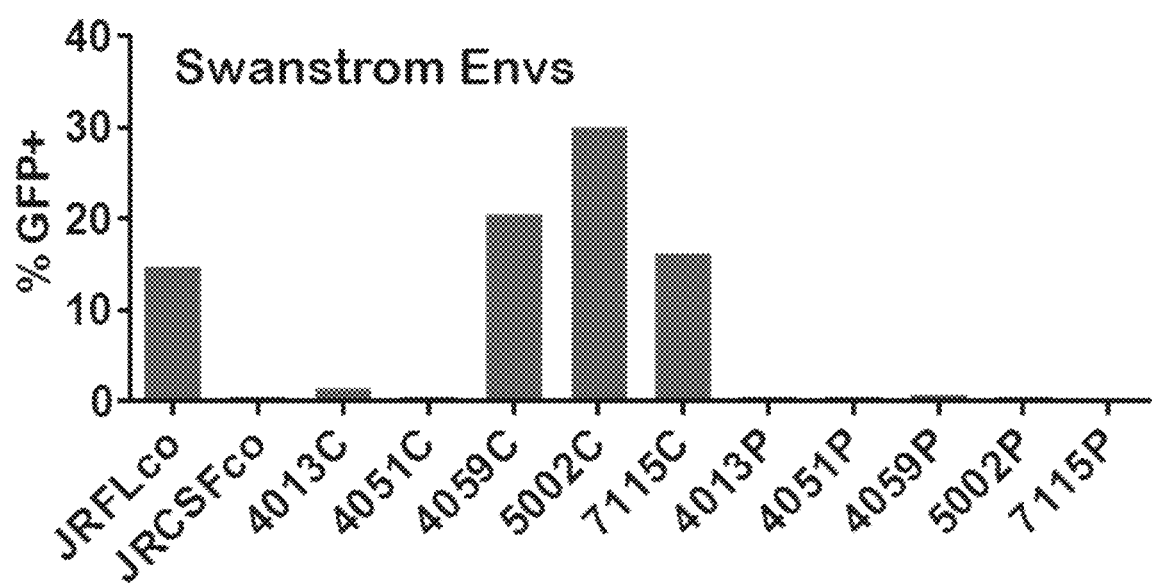
FIG. 1C depicts the transduction efficiency of HIV-1 pseudotyped with the indicated Env proteins.
Figure 2:
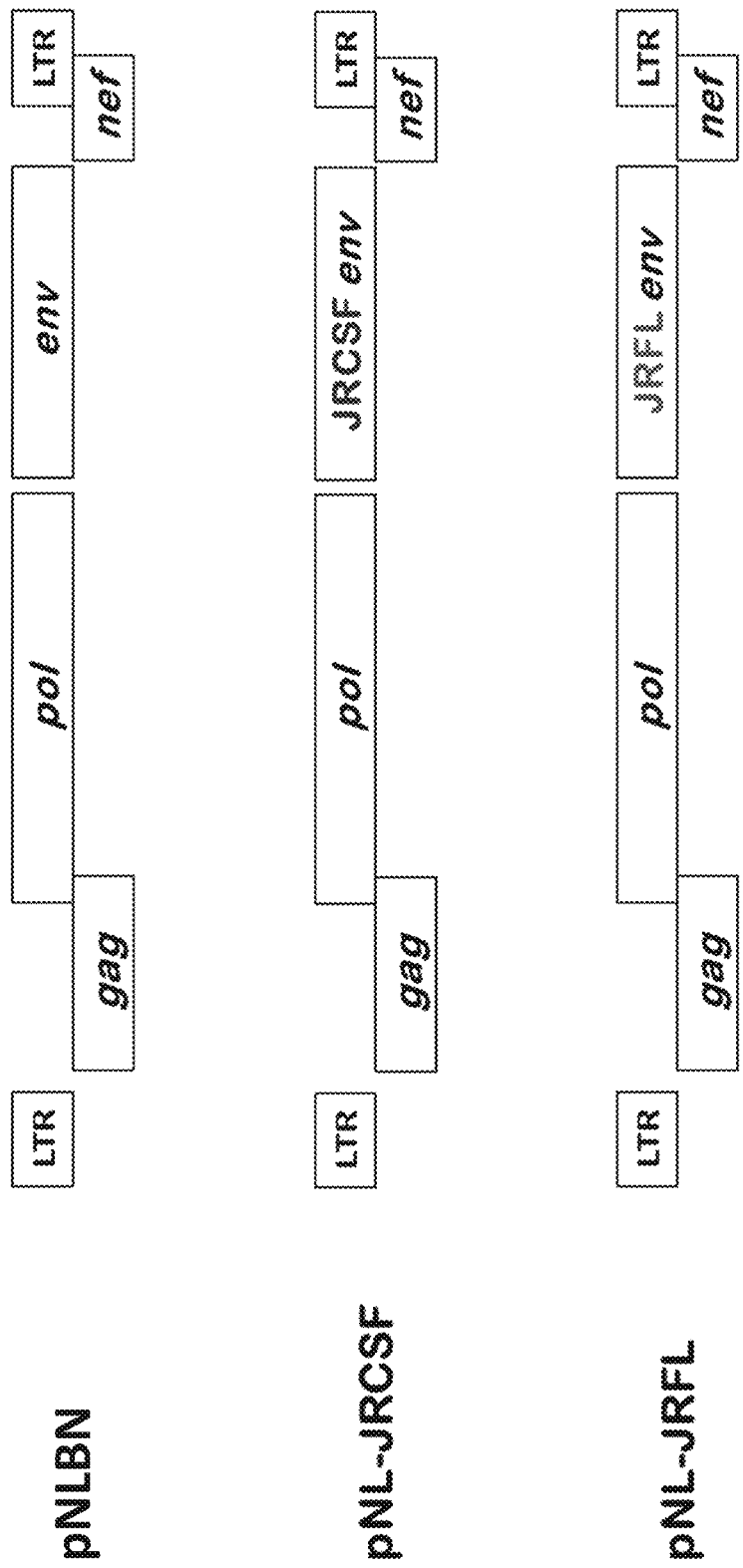
FIG. 2 depicts a schematic of the one-plasmid lentiviral system for generating pseudotyped lentivirus.

Since DCs infected with vesicular stomatitis virus-pseudotyped HIV-1 present viral antigens to $CD4^+$ and $CD8^+$ T-cells better than DCs infected with wild-type HIV-1 (see Granelli-Pipemo et al., 2000, J. Immunol.; 165:6620-6626, which is incorporated by reference herein in its entirety), virus entry is considered an initial limiting factor in DC transduction and activation. Accordingly, the JRFL and JRCSF env genes were screened for their ability to support HIV-1 DC transduction. The pNL plasmids described herein are based upon the pNL4-3 lentiviral vector described by Akio Adachi et al., but with BstEII and NotI restrictions sites engineered 5' and 3', respectively, to the env gene (see Adachi et al., 1986, J. Virol.; 59:284-291, which is incorporated by reference herein in its entirety). For this study, HEK-293 cells were transfected using standard calcium phosphate transfection protocols with the pNLΔenvGFP lentiviral plasmid (SEQ ID NO:12). The pNLΔenvGFP is based upon the pNL plasmid with the env gene deleted and a heterologous green fluorescent protein (GFP) gene inserted. A second plasmid containing a VSV-G (SEQ ID NO:13), JRFL (SEQ ID NO:15), or a JRCSF (SEQ ID NO:14) env gene was provided to the HEK-293 cells in trans. FIG. 1A depicts a schematic of the two-plasmid lentiviral system described herein. Infective HIV-1 virus was collected and minimally processed prior to DC infection. Infected cells were analyzed by flow-activated cell sorting (FACS). As shown in FIG. 1B, the VSV-G and JRFL pseudotyped viruses were able to transduce DCs (1.97% and 1.34%, respectively), whereas the JRCSF pseudotyped virus was ineffective at transducing DCs (0.08%). FIG. 1C shows a screen of different HIV-1 Envelope proteins (cloned from the immunologically privileged, central nervous system of AIDS patients) for the ability to pseudotype HIV-1 and transduce DCs. Clones 4059C (SEQ ID NO:17), 5002C (SEQ ID NO:18), and 7115C (SEQ ID NO:19), for example, all have significantly more DC transducing activity than does JRFL, even though JRFL is codon optimized and these other Envelopes were not. In ongoing experiments, these Envelopes are being engineered into our provirus clones to be tested for the ability to elicit antibody responses. Accordingly, the JR-FL env provides a ready and effective means for transducing DCs. For subsequent in vitro and in vivo studies, HIV-1 plasmids were engineered to contain the JRFL and JRCSF env genes in cis. FIG. 2 depicts a schematic of the pNLBN (SEQ ID NO:5), pNL-JRCSF (SEQ ID NO:6), and pNL-JRFL (SEQ ID NO:7), and plasmids described herein.

Example 2. Generation of Monocyte-Derived DCs (MDDCs)

Figure 3:
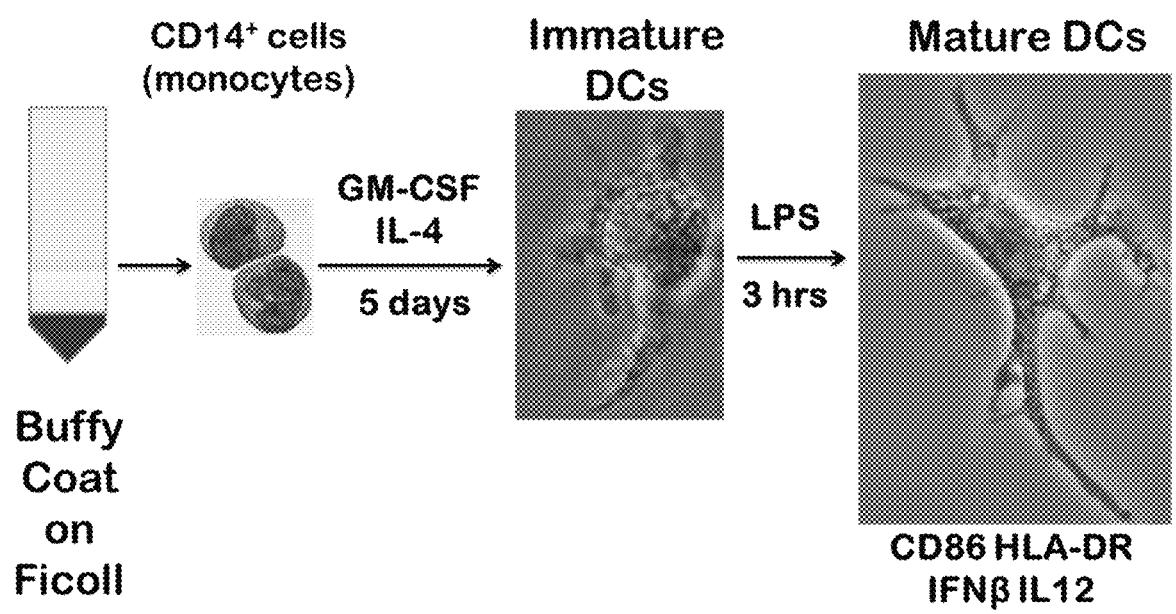
FIG. 3 depicts a schematic of the MDDC differentiation scheme.

MDDCs were differentiated from peripheral blood monocytes (PBMCs) for the purpose of studying DC transduction and viral gene knockdown (1(13). Briefly, $CD14^+$ monocytes were isolated from buffy coats on Ficoll and incubated with GM-CSF and IL-4 to generate immature MDDCs. MDDC maturation was induced by the addition of LPS. FIG. 3 depicts a schematic of the MDDC differentiation scheme. MDDCs can be transduced with the HIV-1 viruses described herein at any stage of the differentiation process.

Example 3. In Vitro Challenge of MDDCs and $CD4^+$ T-Cells with HIV-1

Figure 4:
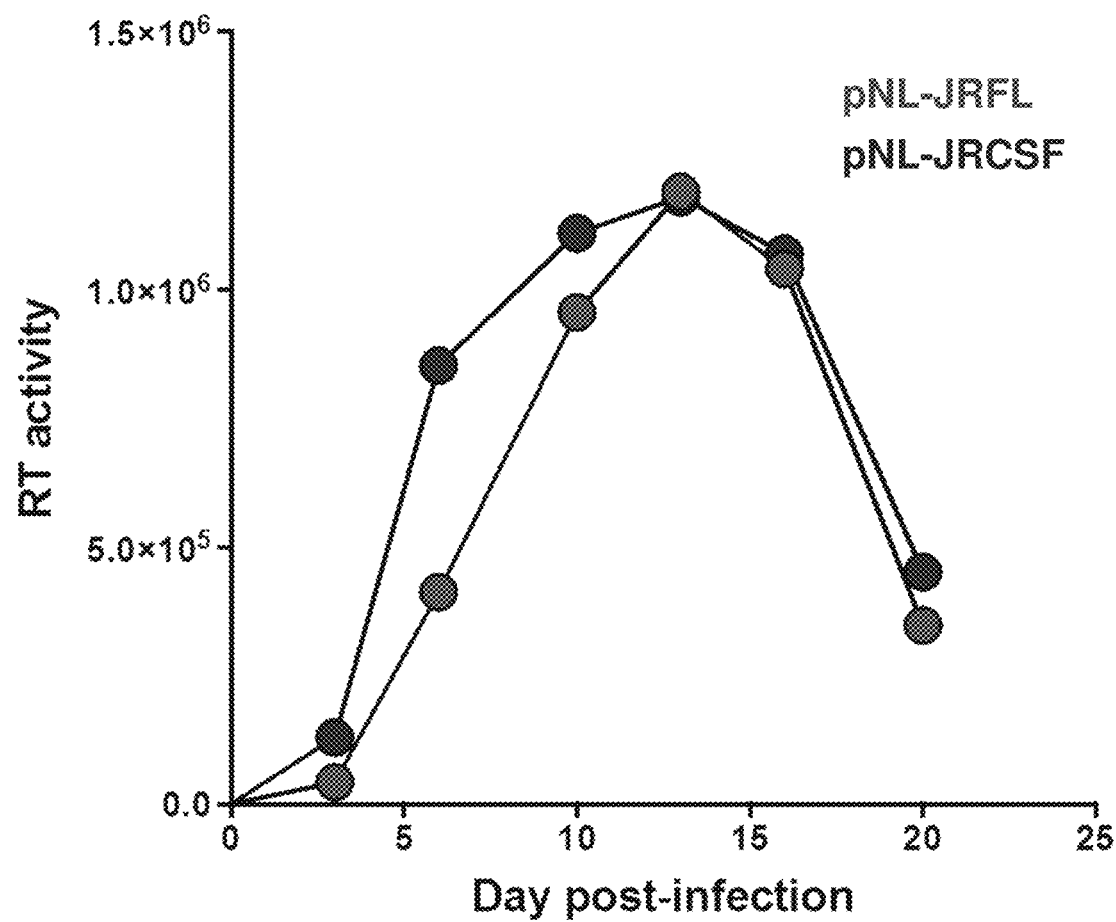
FIG. 4 depicts a graph showing the results of an in vitro challenge of primary CD4$^+$ T-cells with HIV-1 viruses generated with pNL-JRFL and pNL-JRCSF lentiviral plasmids.
Figure 5:
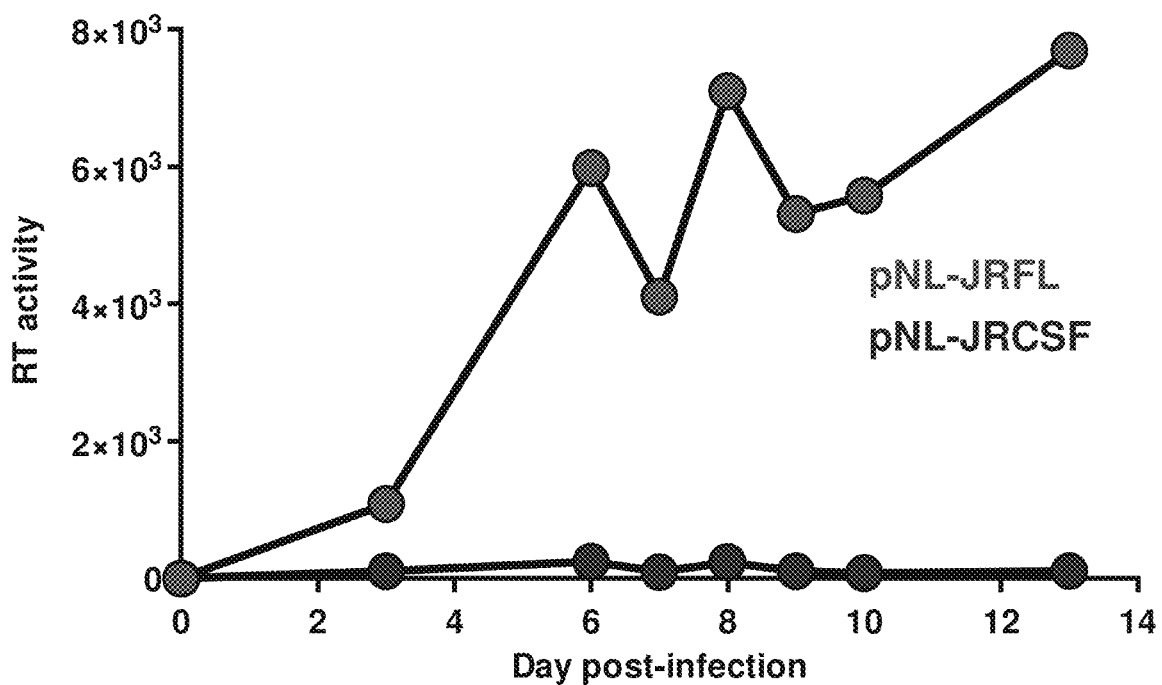
FIG. 5 depicts a graph showing the results of an in vitro challenge of primary MDDCs with HIV-1 viruses generated with pNL-JRFL and pNL-JRCSF lentiviral plasmids.

MDDCs were differentiated from PBMCs as described herein. Naïve primary $CD4^+$ T-cells were prepared by negative selection with magnetic beads (see Neagu et al., 2009, J. Clin. Invest.; 119:3035-3047, which is incorporated by reference herein in its entirety). MDDCs and $CD4^+$ T-cells were challenged in vitro with proviruses generated with the pNL-JRFL and pNL-JRCSF plasmids described herein. As shown in FIG. 4, in vitro challenge of primary $CD4^+$ T-cells with isogenic HIV-1 viruses that differ only in the composition of their respective envelope coat proteins demonstrated that pNLBN-JRCSF virus replicated at least as well as pNLBN-JRFL virus in T-cells. However, as shown in FIG. 5, in vitro challenge of MDDCs revealed that only the pNLBN-JRFL virus was capable of transducing MDDCs. These results were confirmed by FACS (p24 or GFP) and PCR (viral cDNA), and by testing the infectivity of the virion particles released from the DC cultures.

Example 4. NSG-BLT Transgenic Mice

Figure 6:
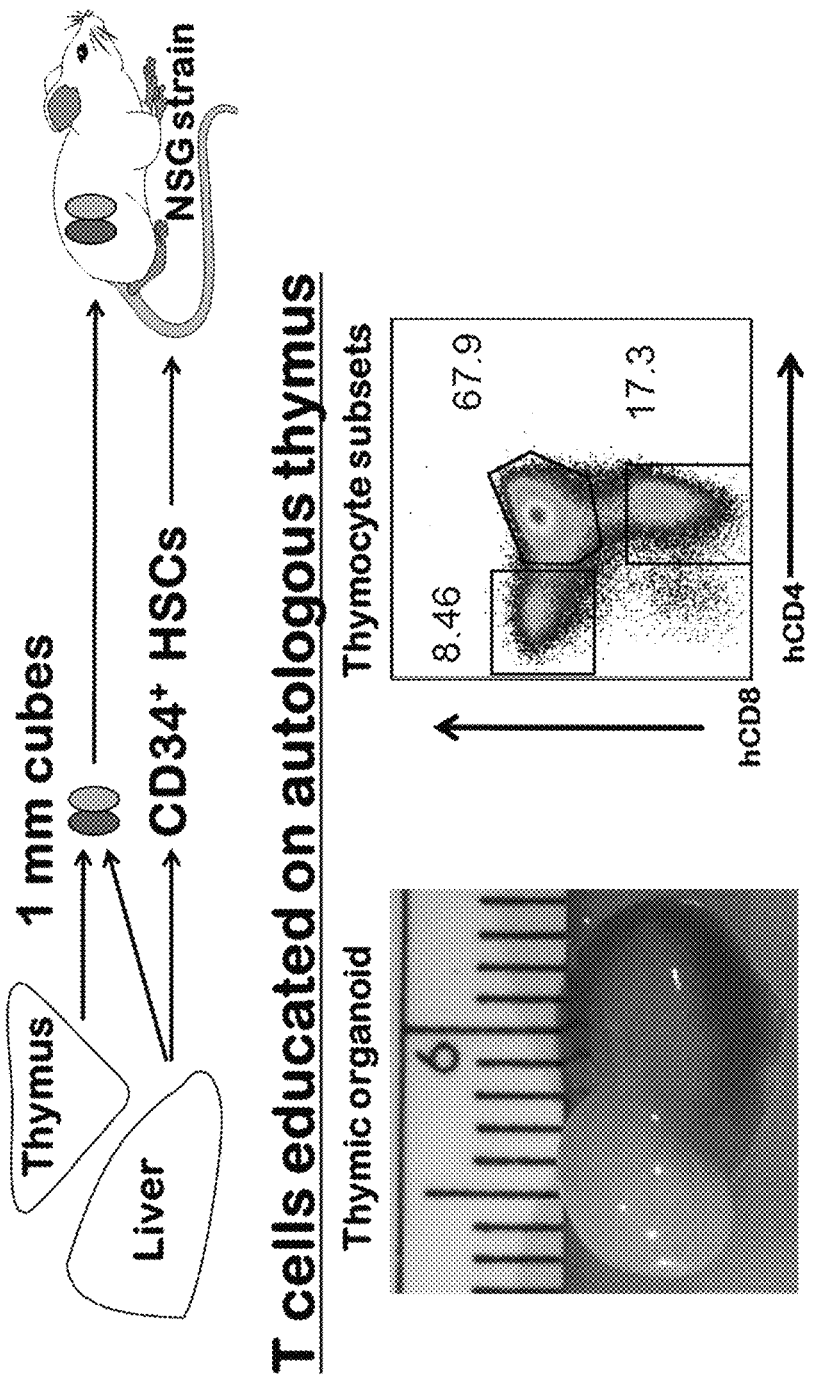
FIG. 6 depicts a schematic representation of the NSG-BLT mouse model.

The parental mouse strain, NOD-scid IL2Rg$^{null}$ (NSG), was developed by Leonard Schultz (see Shultz et al., 2005, J. Immunol.; 174:6477-6489, which is incorporated by reference herein in its entirety) and is now the world-wide standard strain for generating humanized mice. For the HLA-A2 mouse model, the transgenes HLA-A2 and huIL-7 (to enhance T cell responses), huBLyS/BAFF (to enhance human B cell responses), and huCSF-1 (to enhance APC development and function) were introduced into the NSG background (see Shultz et al., 2010, PNAS; 107:13022-13027; and Jaiswal et al., 2009, PLoS ONE; 4:e7251, which are each incorporated by reference herein in their entirety). The BLT model is generated by surgically implanting human fetal thymus and liver tissue under the kidney capsule followed by systemic injection of $CD34^+$ fetal liver cells (Tonomura et al., 2008, Blood; 111:4293-4296; Lan et al., 2006, Blood; 108:487-492; and Melkus et al., 2006, Nat. Med.; 12:1316-1322, which are each incorporated by reference herein in their entirety). Development of the xenograft is monitored by 10-color FACS of the peripheral blood for human lymphocyte subsets and other human hematopoietic lineages. The NSG-BLT model permits antigen-specific $CD4^+$ and $CD8^+$ T cell responses specific for HIV-1, as well as for other pathogens. FIG. 6 depicts a schematic representation of the NSG-BLT mouse model.

Example 5. In Vivo Challenge of NSG-BLT Transgenic Mice with HIV-1

Figure 7A:
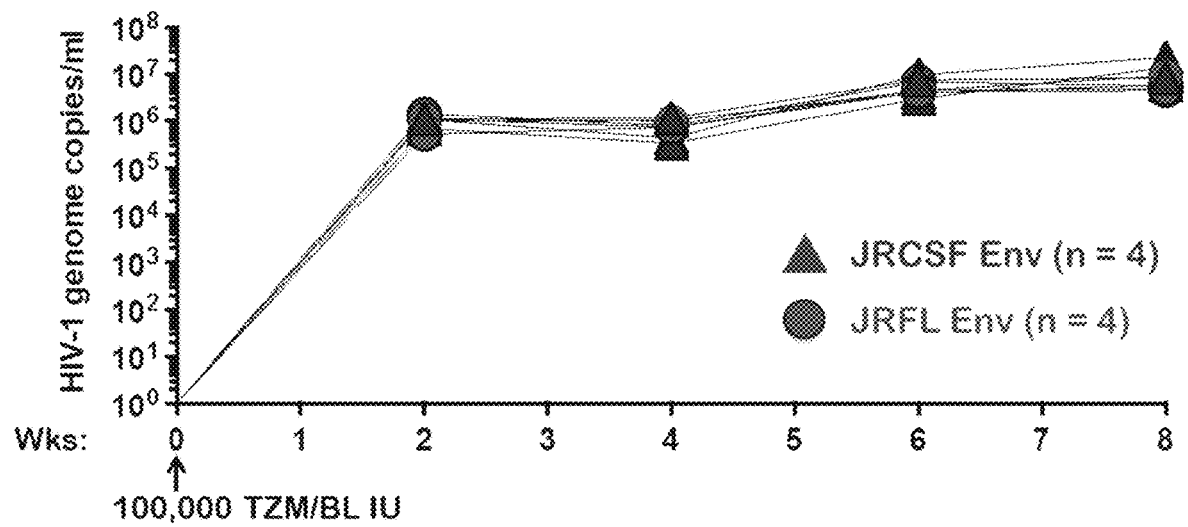
FIG. 7A depicts a graph showing the results of an in vivo challenge of NSG-BLT with HIV-1 viruses generated with pNL-JRFL and pNL-JRCSF lentiviral plasmids.
Figure 7B:
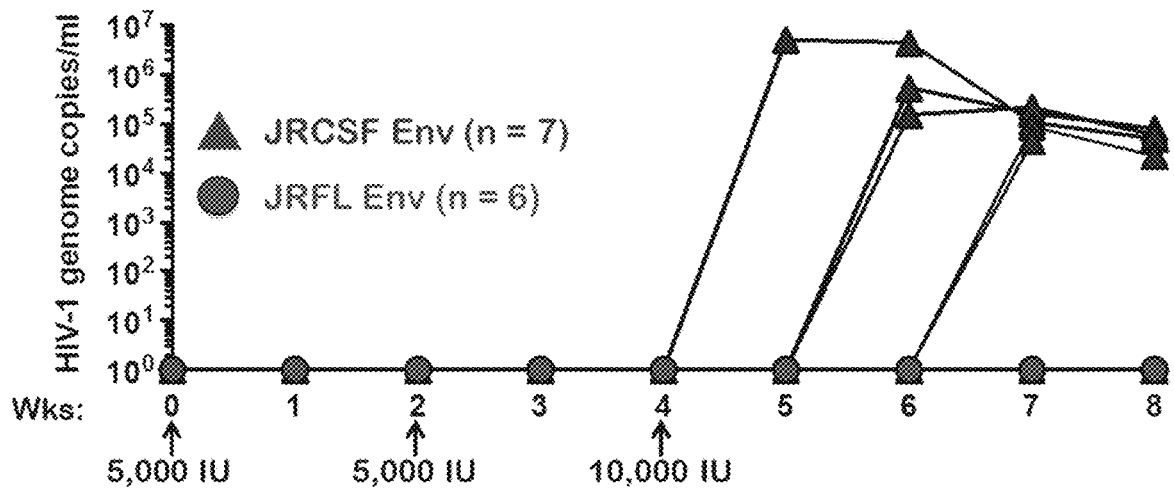
FIG. 7B depicts a graph showing the results of an in vivo challenge of NSG-BLT with isogenic HIV-1 viruses generated with pNL-JRFL and pNL-JRCSF lentiviral plasmids.
Figure 8:
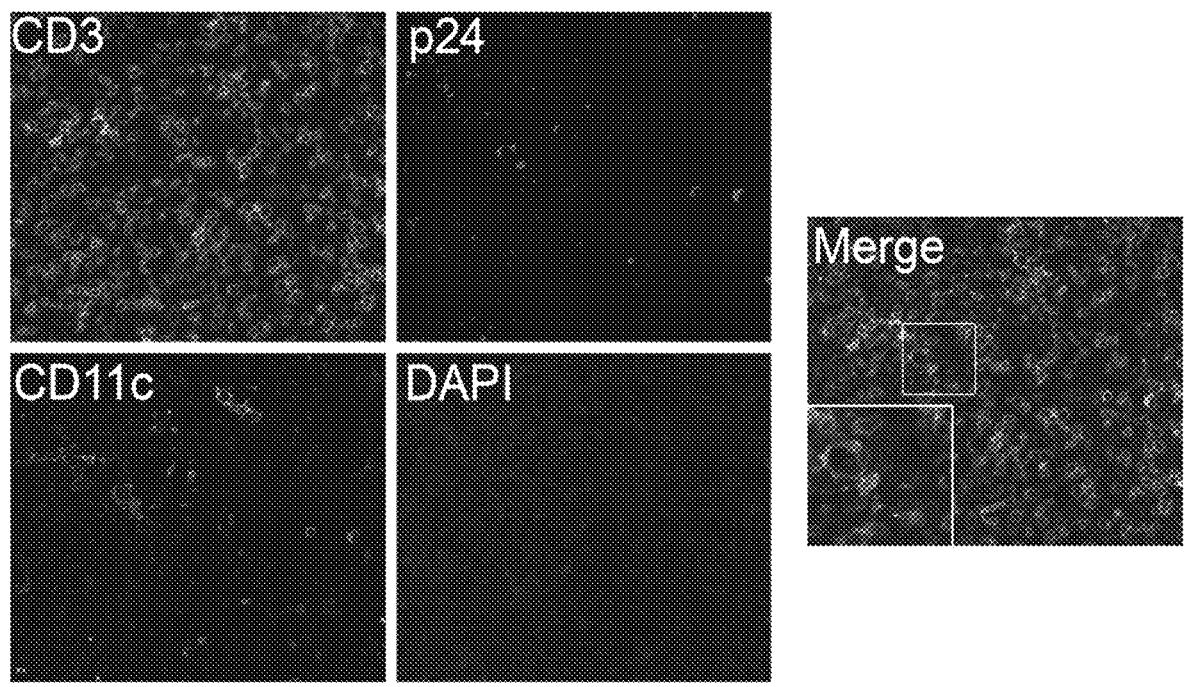
FIG. 8 depicts a fluorescent micrograph indicating the presence of HIV-1 infected DCs in virally-challenged NSG-BLT mice.
Figure 9:
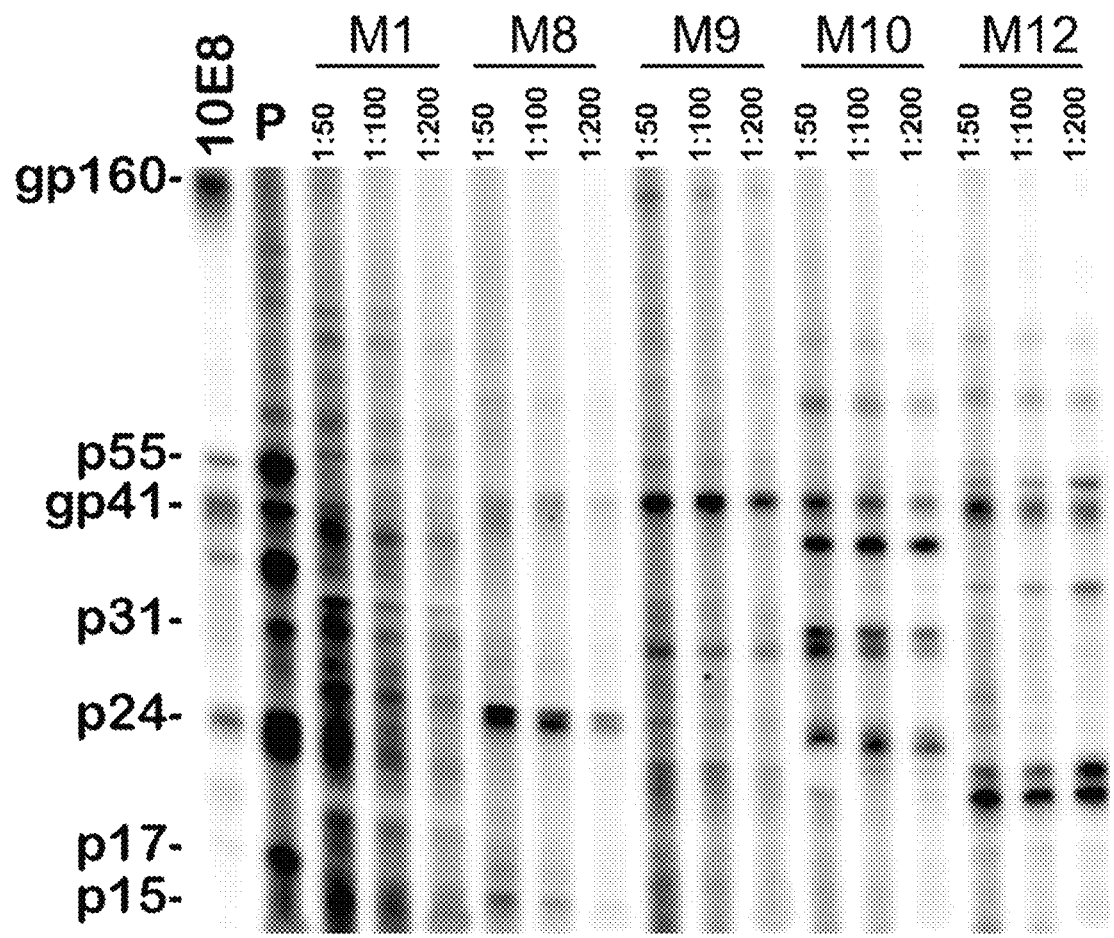
FIG. 9 depicts a Western blot demonstrating that several NSG-BLT mice infected with a JRFL pseudotyped recombinant HIV-1 virus generated human anti-HIV-1 IgG responses.

Though NSG-BLT mice generate antigen-specific antibody responses, they have poor class switching, and to date, anti-HIV-1 IgG responses have not been reported in these animals. Two separate cohorts of NSG-BLT mice (n=12 and 15) were challenged with two different stocks of recombinant virus on the pNL4-3 background; the first stock was pseudotyped with the JRFL env and the other with the JRCSF env. As shown in FIG. 7A, when mice were infected with 100,000 infective units (IU) at week 0, both cohorts demonstrated sustained infection at 2-8 weeks post-infection. All mice had viral loads between $10^5$ and $10^6$ HIV-1 genome copies per ml of mouse serum using as determined by RT-PCR. However, as shown in FIG. 7B, when challenged with lower doses of virus at weeks 0, 2, and 4, only the cohort infected with the JRCSF pseudotyped HIV-1 virus demonstrated sustained infection at weeks 4-8, while the cohort infected with the JRFL pseudotyped HIV-1 virus remained free of infection through week 8. As shown in FIG. 8, $CD3^+$, $CD11C^+$, $p24^+$ DCs were observed in mouse tissues, indicating that DCs had been transduced by the HIV-1 viruses. Many of the mice generated human anti-HIV-1 IgG responses, as confirmed by Western blot and shown in FIG. 9. As shown in Table 1 below, the cohort challenged with the JRFL pseudotyped HIV-1 virus generated a more robust anti-HIV-1 IgG response than the cohort infected with the JRCSF pseudotyped HIV-1 virus, and all of the JRFL cohort developed HIV-1 neutralizing antibodies compared to only one mouse in the JRCSF cohort. Similar results were observed regardless of whether the mice were challenged with virus by intraperitoneal, intrarectal, or intravaginal modes of administration.

TABLE 1

Antibody response of NSG-BLT mice challenged with HIV-1

| | JRFL | JRCSF |
|---|---|---|
| % mice with human anti-HIV-1 IgG | >90% | 38% |
| HIV-1 neutralizing Abs | 6/6 | 1/5 |

Example 6. Generation of Autologous Fetal Liver-Derived Dendritic Cells (FLDCs)

Figure 10:
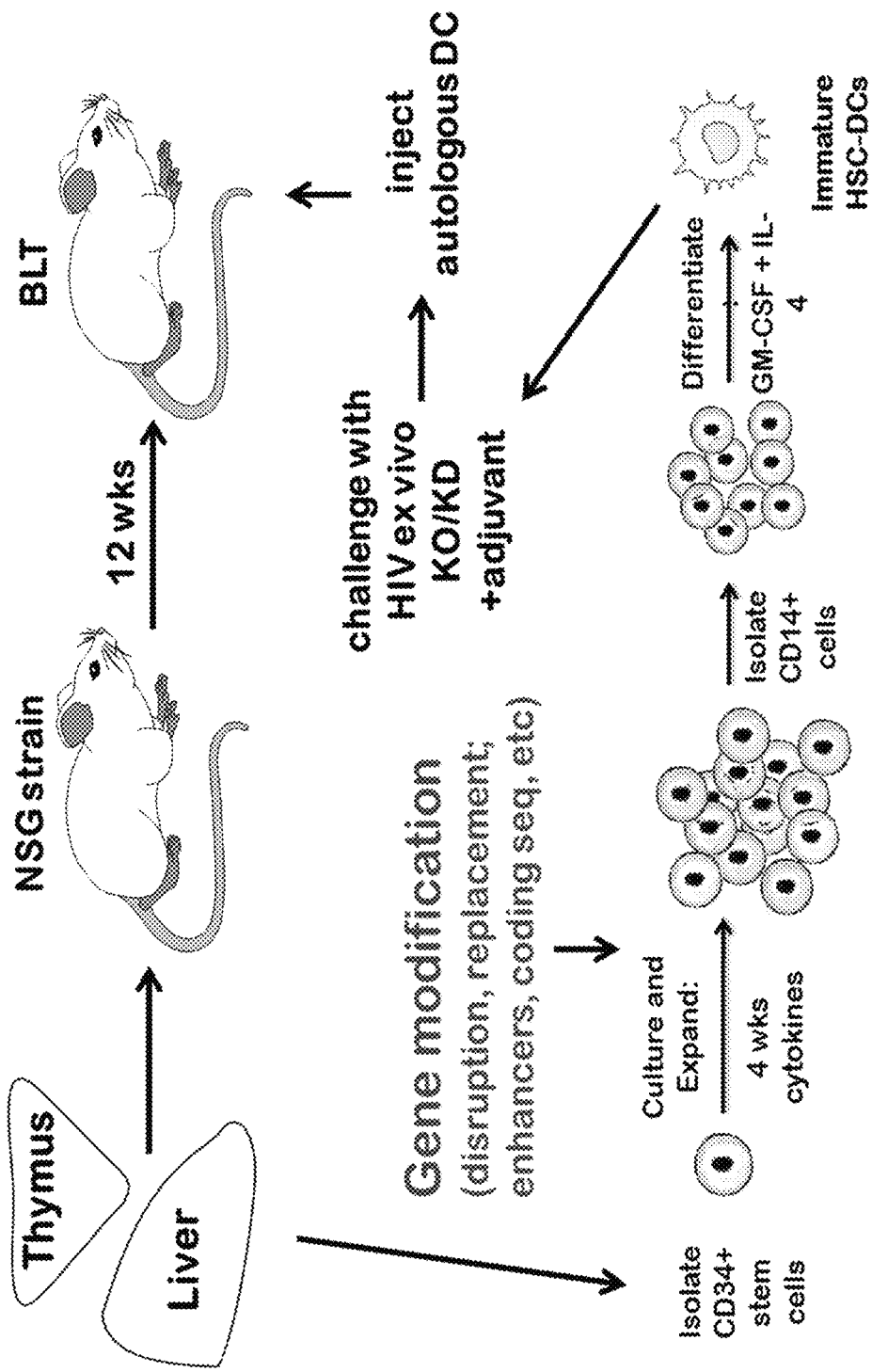
FIG. 10 depicts a schematic of the process for generating fetal liver derived dendritic cells (FLDCs).
Figure 11:
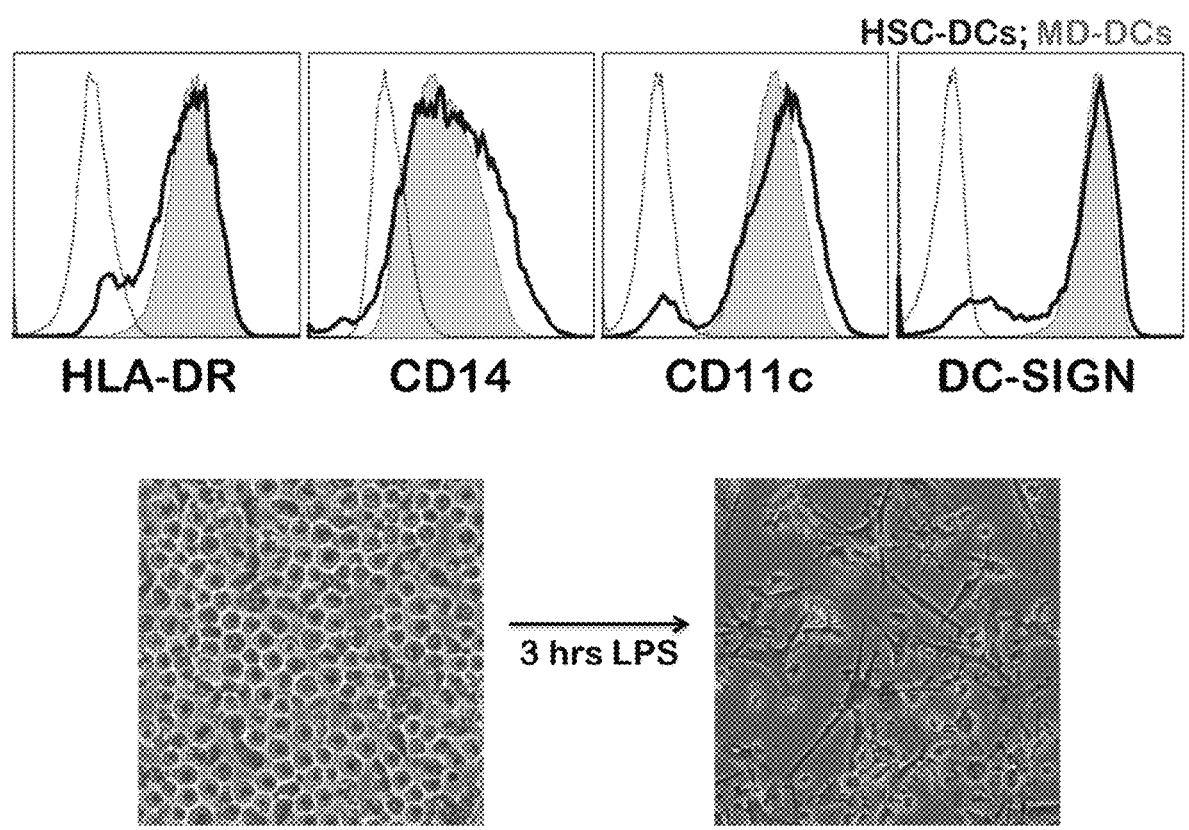
FIG. 11 depicts a micrographic image of FLDCs and a FACS histogram of FDLC markers.

In order to modify autologous DCs ex vivo for functional testing in humanized mice, DCs were generated from the same $CD34^+$ fetal liver cells that were used to reconstitute the BLT mice. To generate fetal liver derived DCs (FLDCs), mononuclear cells were harvested from a Ficoll-Hypaque gradient. $CD34^+$ cells were then enriched by two rounds of positive selection with Miltenyi beads, typically yielding cells that were >98% $CD34^+$. $CD34^+$ cells were plated in Nunc low cell binding plates ($10^5$ cells/plate) in supplemented RPMI (RPMI, 5% human $AB^+$ serum supplemented with GM-CSF and SCF). After 25 days, the cell number reached $10^9$ cells/plate, at which point the cells were re-plated in media containing GM-CSF and IL-4. FIG. 10 depicts a schematic of the process for generating FLDCs. As shown in FIG. 11, the population was indistinguishable from DCs generated from peripheral blood monocytes, as assessed by microscopy and flow cytometry (CD11C, CD14, CD11c, DC-SIGN) after one week of culture in the presence of GM-CSF and IL-4.

Example 7. The Role of Vpx in Lentiviral Replication

Figure 12:
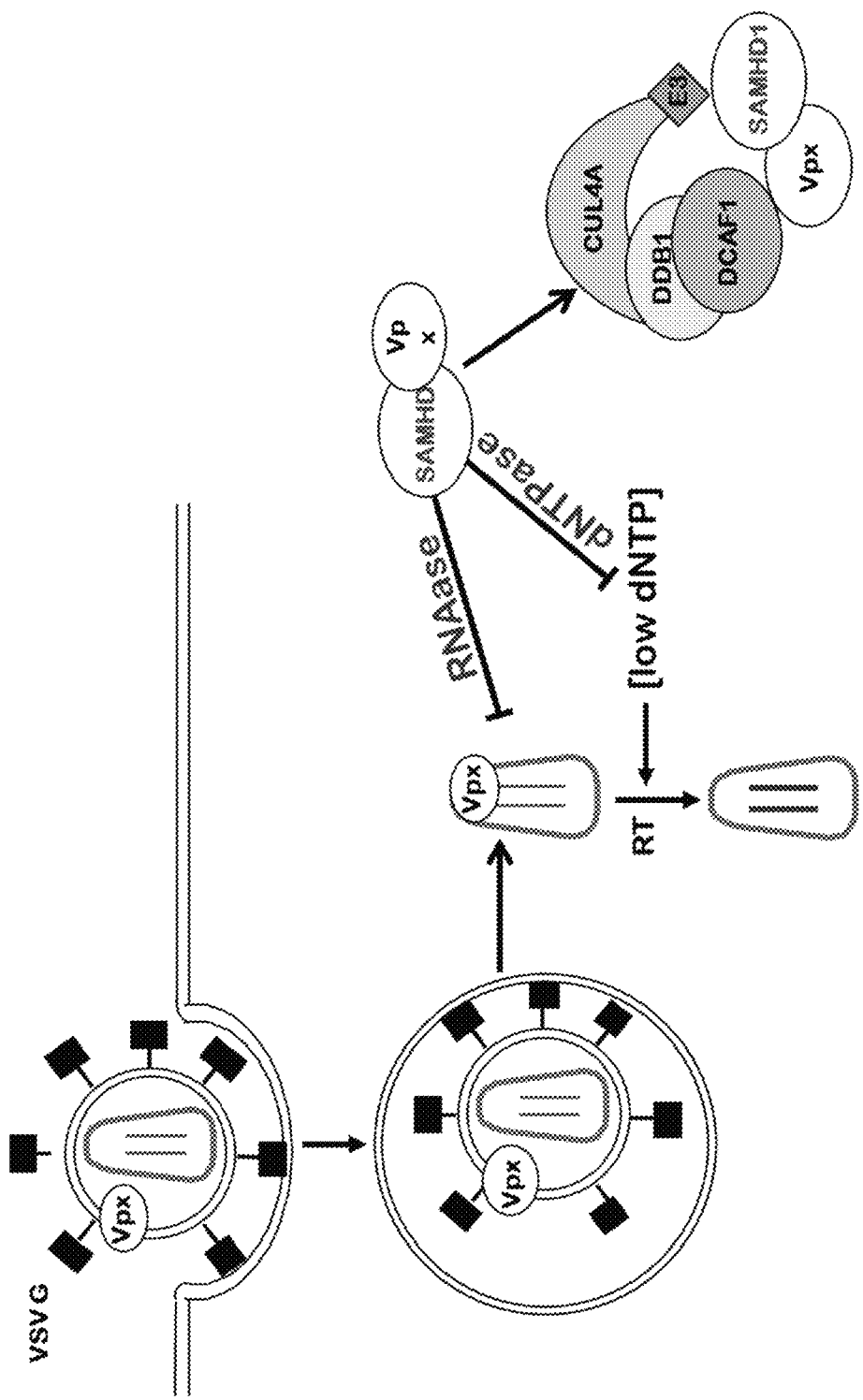
FIG. 12 depicts a schematic of the roles of SAMHD and Vpx in HIV-2 replication.

SAMHD1 is a triphosphohydrolase that blocks reverse transcription in DCs and other non-dividing cells by depleting dNTPs needed for HIV-1 reverse transcription. In addition, SAMHD1 has exonuclease activity that may contribute to the block in HIV-1 cDNA accumulation in DCs Viruses from the HIV-2/SIV$_{SM}$/SIV$_{MAC}$ lineage encode a protein called Vpx that binds SAMHD1 and recruits it to the DCAF1/DDB1/RBX1/CUL4A complex for ubiquitination and degradation. In contrast to infection with HIV-1, infection with HIV-2 rarely causes AIDS. Thus, by promoting replication within DCs, Vpx may increase the innate immune sensing of HIV-2, and thereby render more effective the acquired immunity targeting this virus. FIG. 12 depicts a schematic of the roles of SAMHD and Vpx in HIV-2 replication.

Figure 13:
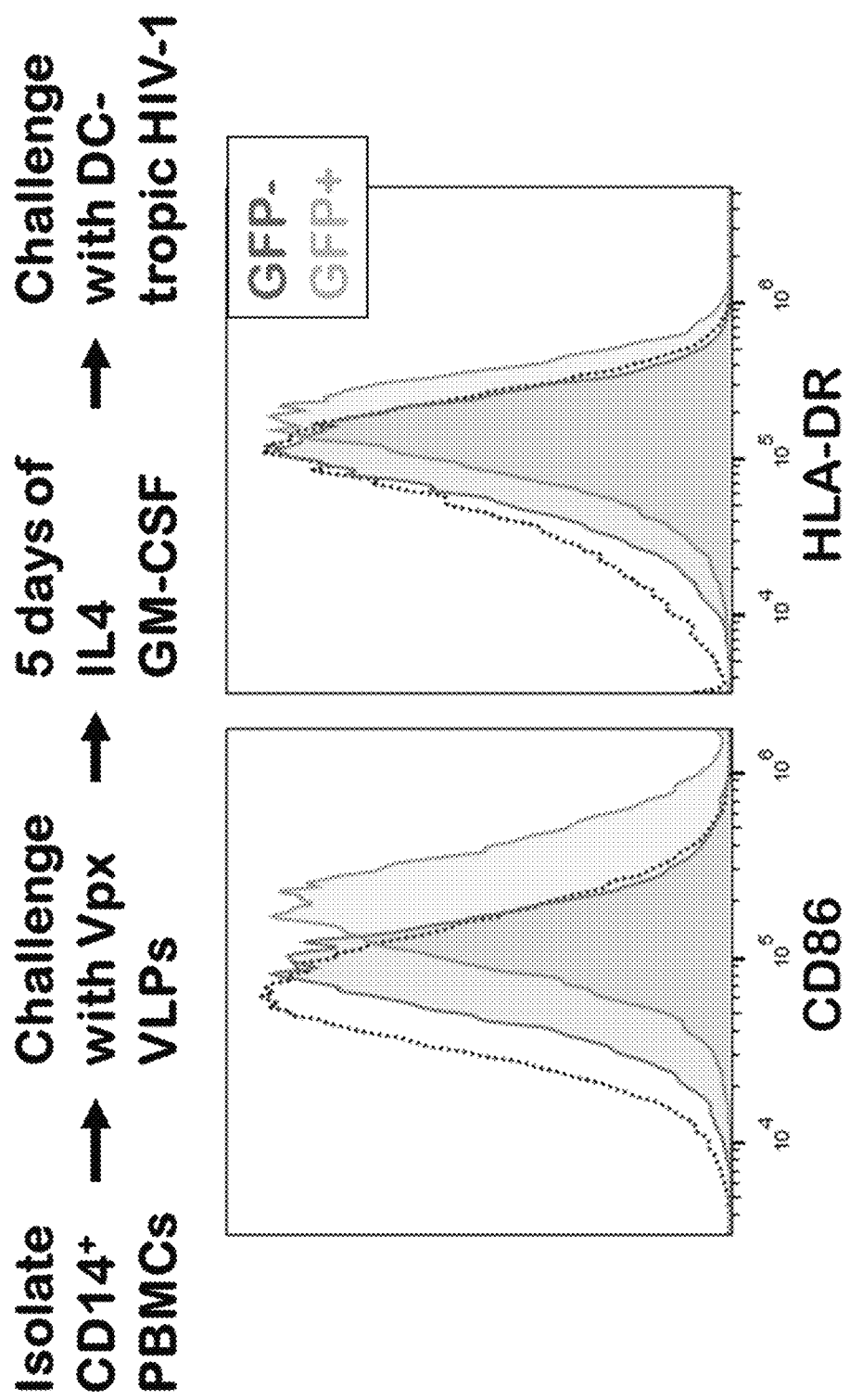
FIG. 13 depicts a FACS histogram showing that the Vpx provided in trans promotes the transduction of DCs by HIV-1.
Figure 14:
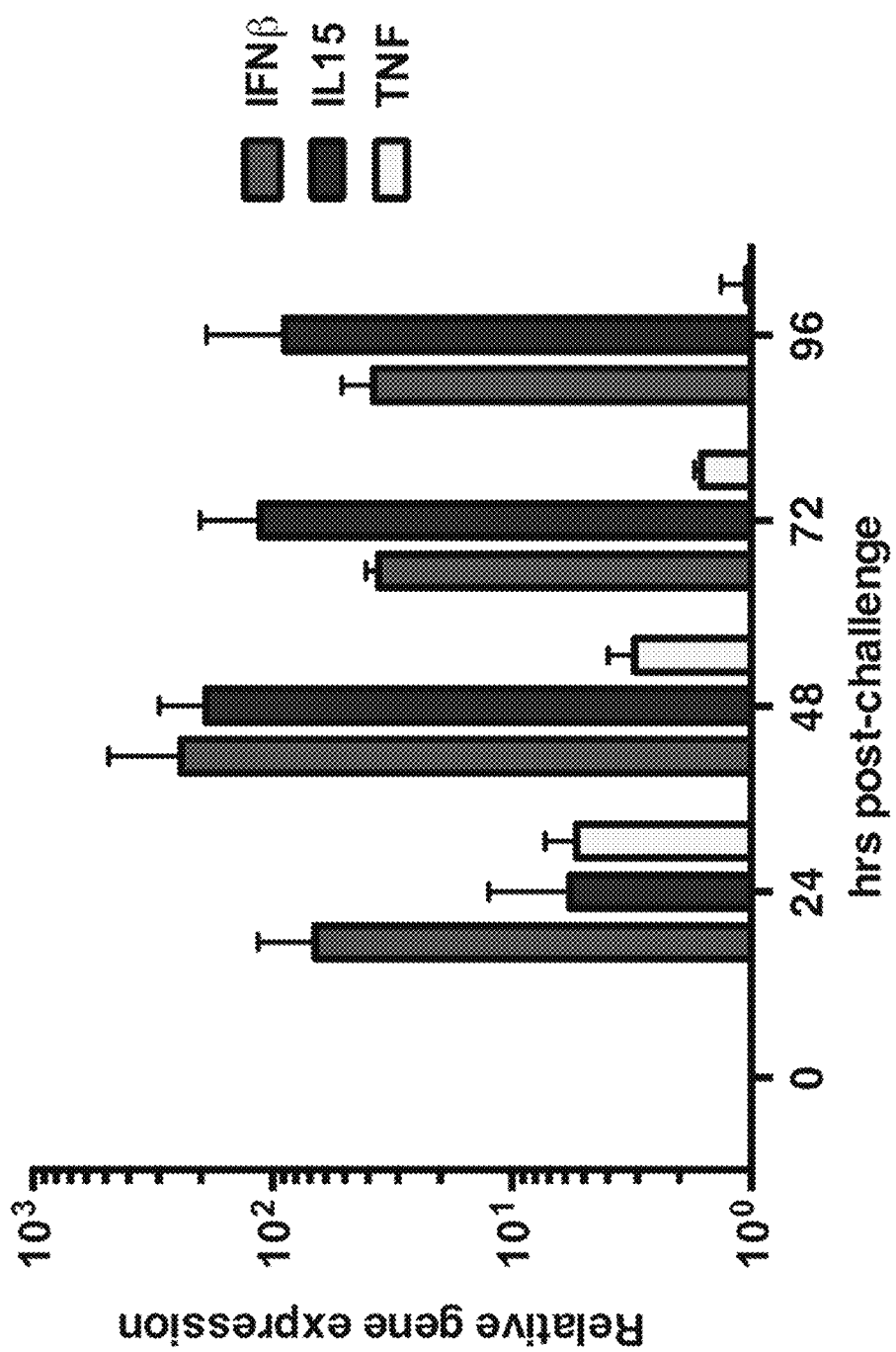
FIG. 14 depicts a bar graph showing that several cytokines indicative of an activated DC appeared up-regulated in DCs transduced by HIV-1 and Vpx.
Figure 15:
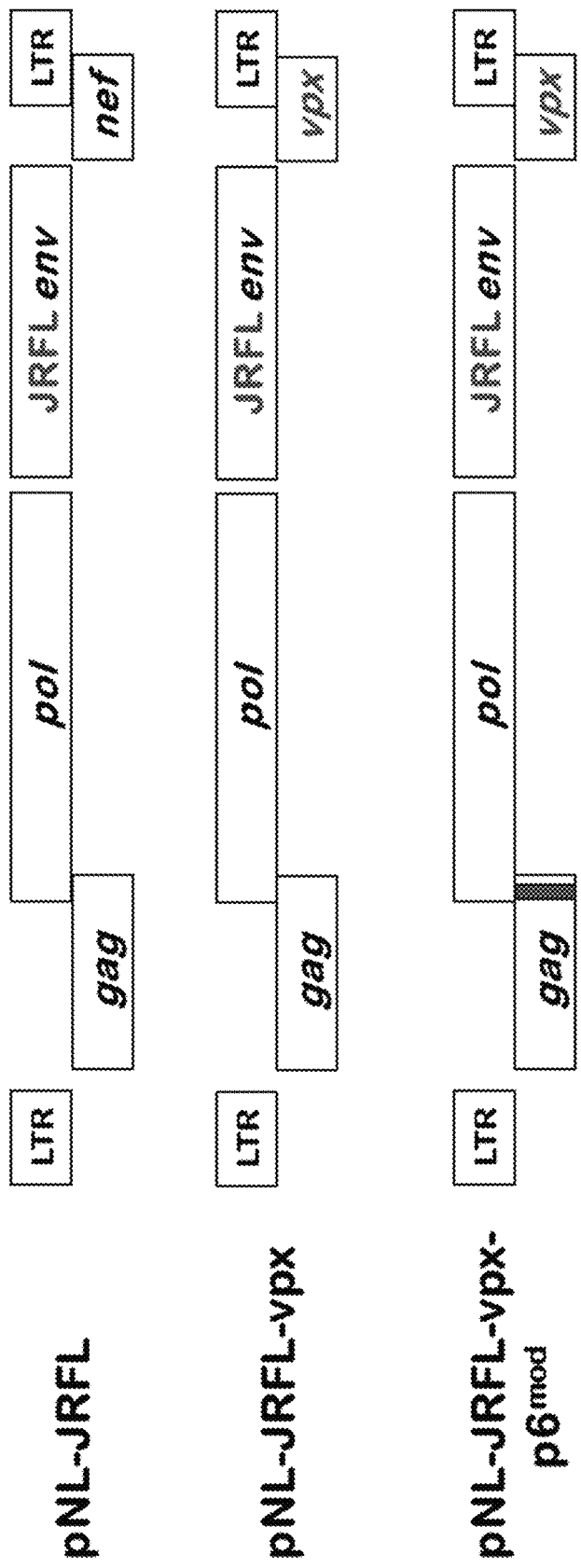
FIG. 15 depicts a schematic of the one-plasmid lentiviral system for generating pseudotyped lentivirus containing Vpx or Vpx and a modified p6.
Figure 16:
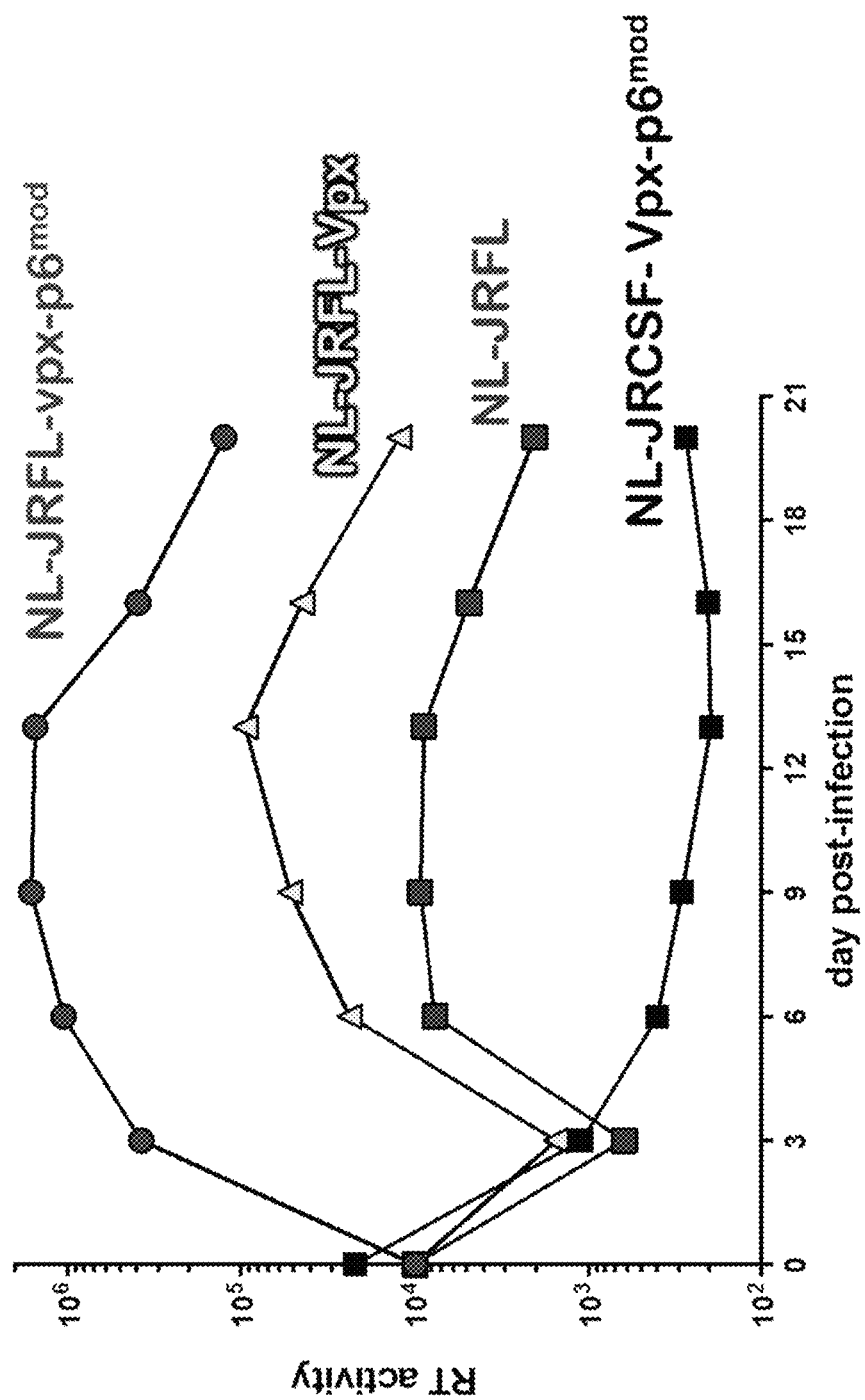
FIG. 16 depicts a line graph showing that the addition of Vpx and the Vpx+p6 modification increased HIV-1 virus transcription over a 21 day period.

HIV-1 does not encode Vpx. However, Vpx provided in trans promotes the transduction of DCs by HIV-1 (see FIG. 13). Furthermore, several cytokines indicative of an activated DC appeared up-regulated in DCs transduced by HIV-1 and Vpx (see FIG. 14). Accordingly, several HIV-1 proviral plasmids were engineered to further study the effect of Vpx on DC transduction when Vpx is provided in cis (see FIG. 15). One plasmid was contained Vpx substituted for nef (SEQ ID NO:8). Another plasmid contained the Vpx substitution and a p6 modification of the gag gene which better incorporates Vpx into the HIV-1 virion (SEQ ID NO:9). As shown in FIG. 16, the addition of Vpx and the Vpx+p6 modification increased virus transcription over a 21 day period.

Example 8. Eliciting Human IgG Against Heterologous Proteins

Figure 17:
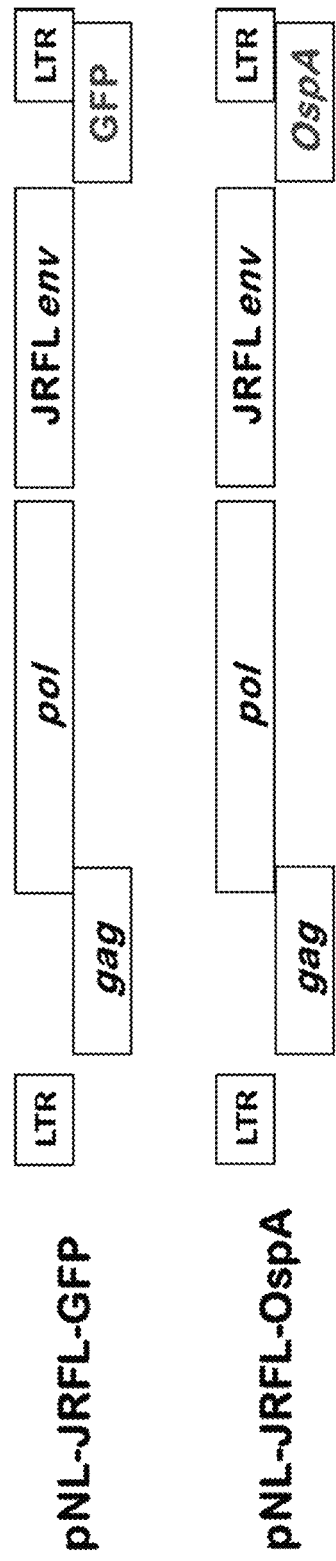
FIG. 17 depicts a schematic of the one-plasmid lentiviral system for generating pseudotyped lentivirus containing a heterologous protein.
Figure 18:
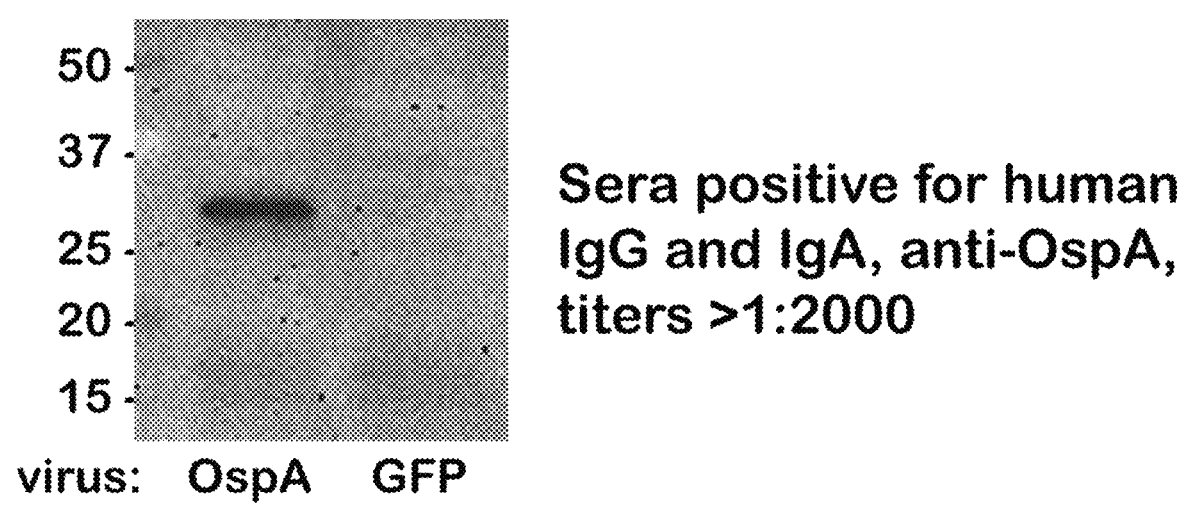

To determine whether the technology disclosed herein could be used to generate human IgG antibodies against heterologous proteins from viruses or diseases other than HIV-1, the nef gene was replaced from the pNLBN-JRFL proviral plasmid with either GFP (SEQ ID NO:10) or OspA (SEQ ID NO:11) from the Lyme disease spirochete (see FIG. 17). HIV-1 viruses were generated as described herein and NSG-BLT transgenic mice were challenged with the viruses. As shown in FIG. 18, NSG-BLT transgenic mice generated human IgG and IgA antibodies against OspA upon challenge with the engineered viruses. Accordingly, the instant technology provides a needed platform for generating human antibodies against a variety of disease antigens.

I claim:

1. An isolated nucleotide sequence having at least about 95% identity over the entire length of its coding sequence compared to the coding sequence of SEQ ID NO: 7, 8, or 9, wherein an amino acid sequence encoded by the coding sequence of the isolated nucleotide sequence is identical to an amino acid sequence encoded by the coding sequence of SEQ ID NO: 7, 8, or 9, respectively.

2. The isolated nucleotide sequence of claim 1, having at least about 96% identity over the entire length of its coding sequence to the coding sequence of SEQ ID NO:7.

3. The isolated nucleotide sequence of claim 1, having at least about 97% identity over the entire length of its coding sequence to the coding sequence of SEQ ID NO:7.

4. The isolated nucleotide sequence of claim 1, having at least about 98% identity over the entire length of its coding sequence, having a nucleotide sequence of SEQ ID NO:7.

5. The isolated nucleotide sequence of claim 1, having at least about 99% identity over the entire length of its coding sequence to the coding sequence of SEQ ID NO:7.

6. The isolated nucleotide sequence of claim 1, having at least about 96% identity over the entire length of its coding sequence to the coding sequence of SEQ ID NO: 8.

7. The isolated nucleotide sequence of claim 1, having at least about 97% identity over the entire length of the sequence of its coding sequence to the coding sequence of SEQ ID NO: 8.

8. The isolated nucleotide sequence of claim 1, having at least about 98% identity over the entire length of the sequence of its coding sequence to the coding sequence of SEQ ID NO: 8.

9. The isolated nucleotide sequence of claim 1, having at least about 99% identity over the entire length of the sequence of its coding sequence to the coding sequence of SEQ ID NO: 8.

10. The isolated nucleotide sequence of claim 1, having at least about 96% identity over the entire length of the sequence of its coding sequence to the coding sequence of SEQ ID NO:9.

11. The isolated nucleotide sequence of claim 1, having at least about 97% identity over the entire length of the sequence of its coding sequence to the coding sequence of SEQ ID NO:9.

12. The isolated nucleotide sequence of claim 1, having at least about 98% identity over the entire length of the sequence of its coding sequence to the coding sequence of SEQ ID NO:9.

13. The isolated nucleotide sequence of claim 1, having at least about 99% identity over the entire length of the sequence of its coding sequence to the coding sequence of SEQ ID NO:9.

\* \* \* \* \*

SEQUENCE LISTING

```
<160> NUMBER OF SEQ ID NOS: 19

<210> SEQ ID NO 1
<211> LENGTH: 14825
<212> TYPE: DNA
<213> ORGANISM: Human immunodeficiency virus type 1

<400> SEQUENCE: 1
tggaagggct aatttggtcc caaaaagac aagagatcct tgatctgtgg atctaccaca      60
cacaaggcta cttccctgat tggcagaact acacaccagg gccagggatc agatatccac     120
tgacctttgg atggtgcttc aagttagtac cagttgaacc agagcaagta gaagaggcca     180
atgaaggaga gaacaacagc ttgttacacc ctatgagcca gcatgggatg gaggacccgg     240
agggagaagt attagtgtgg aagtttgaca gcctcctagc atttcgtcac atggcccgag     300
agctgcatcc ggagtactac aaagactgct gacatcgagc tttctacaag ggactttccg     360
ctggggactt tccagggagg tgtggcctgg gcgggactgg ggagtggcga gccctcagat     420
gctacatata agcagctgct ttttgcctgt actgggtctc tctggttaga ccagatctga     480
gcctgggagc tctctggcta actagggaac ccactgctta agcctcaata agcttgcct      540 tgagtgctca aagtagtgtg tgcccgtctg ttgtgtgact ctggtaacta gagatccctc     600 agacccttt agtcagtgtg gaaaatctct agcagtggcg cccgaacagg gacttgaaag     660
cgaaagtaaa gccagaggag atctctcgac gcaggactcg gcttgctgaa gcgcgcacgg     720
caagaggcga ggggcggcga ctggtgagta cgccaaaaat tttgactagc ggaggctaga     780
aggagagaga tgggtgcgag agcgtcggta ttaagcgggg gagaattaga taatgggaa      840 aaaattcggt taaggccagg gggaaagaaa caatataaac taaaacatat agtatgggca     900
agcagggagc tagaacgatt cgcagttaat cctggccttt tagagacatc agaaggctgt     960
agacaaatac tgggacagct acaaccatcc cttcagacag gatcagaaga acttagatca    1020
ttatataata caatagcagt cctctattgt gtgcatcaaa ggatagatgt aaaagacacc    1080
```

```
aaggaagcct tagataagat agaggaagag caaaacaaaa gtaagaaaaa ggcacagcaa    1140
gcagcagctg acacaggaaa caacagccag gtcagccaaa attaccctat agtgcagaac    1200
ctccaggggc aaatggtaca tcaggccata tcacctagaa ctttaaatgc atgggtaaaa    1260
gtagtagaag agaaggcttt cagcccagaa gtaatacccc tgttttcagc attatcagaa    1320
ggagccaccc cacaagattt aaataccatg ctaaacacag tggggggaca tcaagcagcc    1380
atgcaaatgt taaagagac catcaatgag gaagctgcag aatgggatag attgcatcca    1440
gtgcatgcag ggcctattgc accaggccag atgagagaac caaggggaag tgacatagca    1500
ggaactacta gtacccttca ggaacaaata ggatggatga cacataatcc acctatccca    1560
gtaggagaaa tctataaaag atggataatc ctgggattaa ataaaatagt aagaatgtat    1620
agccctacca gcattctgga cataagacaa ggaccaaagg aacccttag agactatgta    1680 gaccgattct ataaaactct aagagccgag caagcttcac aagaggtaaa aaattggatg    1740
acagaaacct tgttggtcca aaatgcgaac ccagattgta agactatttt aaaagcattg    1800
ggaccaggag cgacactaga agaaatgatg acagcatgtc agggagtggg gggacccggc    1860
cataaagcaa gagttttggc tgaagcaatg agccaagtaa caaatccagc taccataatg    1920
atacagaaag gcaattttag gaaccaaaga aagactgtta agtgtttcaa ttgtggcaaa    1980
gaagggcaca tagccaaaaa ttgcagggcc cctaggaaaa agggctgttg gaaatgtgga    2040
aaggaaggac accaaatgaa agattgtact gagagacagg ctaattttt agggaagatc    2100 tggccttccc acaagggaag gccagggaat tttcttcaga gcagaccaga gccaacagcc    2160
ccaccagaag agagcttcag gtttggggaa gagacaacaa ctccctctca gaagcaggag    2220
ccgatagaca aggaactgta tcctttagct tccctcagat cactctttgg cagcgacccc    2280
tcgtcacaat aaagataggg gggcaattaa aggaagctct attagataca ggagcagatg    2340
atacagtatt agaagaaatg aatttgccag gaagatggaa accaaaaatg ataggggaa    2400 ttggaggttt tatcaaagta agacagtatg atcagatact catagaaatc tgcggacata    2460
aagctatagg tacagtatta gtaggaccta cacctgtcaa cataattgga agaaatctgt    2520
tgactcagat tggctgcact ttaaattttc ccattagtcc tattgagact gtaccagtaa    2580
aattaaagcc aggaatggat ggcccaaaag ttaaacaatg gccattgaca gaagaaaaaa    2640
taaaagcatt agtagaaatt tgtacagaaa tggaaaagga aggaaaaatt tcaaaaattg    2700
ggcctgaaaa tccatacaat actccagtat ttgccataaa gaaaaagac agtactaaat    2760 ggagaaaatt agtagatttc agagaactta ataagagaac tcaagatttc tgggaagttc    2820
aattaggaat accacatcct gcagggttaa acagaaaaa atcagtaaca gtactggatg    2880
tgggcgatgc atattttca gttcccttag ataaagactt caggaagtat actgcattta    2940
ccatacctag tataaacaat gagacaccag ggattagata tcagtacaat gtgcttccac    3000
agggatggaa aggatcacca gcaatattcc agtgtagcat gacaaaaatc ttagagcctt    3060
ttagaaaaca aaatccagac atagtcatct atcaatacat ggatgatttg tatgtaggat    3120
ctgacttaga aatagggcag catagaacaa aaatagagga actgagacaa catctgttga    3180 ggtgggggatt taccacacca gacaaaaaac atcagaaaga acctccattc ctttggatgg    3240
gttatgaact ccatcctgat aaatggacag tacagcctat agtgctgcca gaaaaggaca    3300
gctggactgt caatgacata cagaaattag tgggaaaatt gaattgggca agtcagattt    3360
atgcagggat taaagtaagg caattatgta aacttcttag gggaaccaaa gcactaacag    3420
```

```
aagtagtacc actaacagaa gaagcagagc tagaactggc agaaaacagg gagattctaa    3480
aagaaccggt acatggagtg tattatgacc catcaaaaga cttaatagca gaaatacaga    3540
agcaggggca aggccaatgg acatatcaaa tttatcaaga gccatttaaa aatctgaaaa    3600
caggaaagta tgcaagaatg aagggtgccc acactaatga tgtgaaacaa ttaacagagg    3660
cagtacaaaa aatagccaca gaaagcatag taatatgggg aaagactcct aaatttaaat    3720
tacccataca aaaggaaaca tgggaagcat ggtggacaga gtattggcaa gccacctgga    3780
ttcctgagtg ggagtttgtc aatacccctc ccttagtgaa gttatggtac cagttagaga    3840
aagaacccat aataggagca gaaacttcct atgtagatgg ggcagccaat agggaaacta    3900
aattaggaaa agcaggatat gtaactgaca gaggaagaca aaaagttgtc cccctaacgg    3960
acacaacaaa tcagaagact gagttacaag caattcatct agctttgcag gattcgggat    4020
tagaagtaaa catagtgaca gactcacaat atgcattggg aatcattcaa gcacaaccag    4080
ataagagtga atcagagtta gtcagtcaaa taatagagca gttaataaaa aaggaaaaag    4140
tctacctggc atgggtacca gcacacaaag gaattggagg aaatgaacaa gtagataaat    4200
tggtcagtgc tggaatcagg aaagtactat ttttagatgg aatagataag gcccaagaag    4260
aacatgagaa atatcacagt aattggagag caatggctag tgattttaac ctaccacctg    4320
tagtagcaaa agaaatagta gccagctgtg ataaatgtca gctaaaaggg gaagccatgc    4380
atggacaagt agactgtagc ccaggaatat ggcagctaga ttgtacacat ttagaaggaa    4440
aagttatctt ggtagcagtt catgtagcca gtggatatat agaagcagaa gtaattccag    4500
cagagacagg gcaagaaaca gcatacttcc tcttaaaatt agcaggaaga tggccagtaa    4560
aaacagtaca tacagacaat ggcagcaatt tcaccagtac tacagttaag gccgcctgtt    4620
ggtgggcggg gatcaagcag gaatttggca ttccctacaa tccccaaagt caaggagtaa    4680
tagaatctat gaataaagaa ttaaagaaaa ttataggaca ggtaagagat caggctgaac    4740
atcttaagac agcagtacaa atggcagtat tcatccacaa ttttaaaaga aaaggggggga    4800
ttgggggggta cagtgcaggg gaaagaatag tagacataat agcaacagac atacaaacta    4860
aagaattaca aaaacaaatt acaaaaattc aaaattttcg ggtttattac agggacagca    4920
gagatccagt ttggaaagga ccagcaaagc tcctctggaa aggtgaaggg gcagtagtaa    4980
tacaagataa tagtgacata aaagtagtgc caagaagaaa agcaaagatc atcagggatt    5040
atggaaaaca gatggcaggt gatgattgtg tggcaagtag acaggatgag gattaacaca    5100
tggaaaagat tagtaaaaca ccatatgtat atttcaagga agctaaggga ctggttttat    5160
agacatcact atgaaagtac taatccaaaa ataagttcag aagtacacat cccactaggg    5220
gatgctaaat tagtaataac aacatattgg ggtctgcata caggagaaag agactggcat    5280
ttgggtcagg gagtctccat agaatggagg aaaaagagat atagcacaca agtagaccct    5340
gacctagcag accaactaat tcatctgcac tattttgatt gtttttcaga atctgctata    5400
agaaatacca tattaggacg tatagttagt cctaggtgtg aatatcaagc aggacataac    5460
aaggtaggat ctctacagta cttggcacta gcagcattaa taaaaccaaa acagataaag    5520
ccacctttgc ctagtgttag gaaactgaca gaggacagat ggaacaagcc ccagaagacc    5580
aagggccaca gagggagcca tacaatgaat ggacactaga gcttttagag gaacttaaga    5640
gtgaagctgt tagacatttt cctaggatat ggctccataa cttaggacaa catatctatg    5700
aaacttacgg ggatacttgg gcaggagtgg aagccataat aagaattctg caacaactgc    5760
tgtttatcca tttcagaatt gggtgtcgac atagcagaat aggcgttact cgacagagga    5820
```

```
gagcaagaaa tggagccagt agatcctaga ctagagccct ggaagcatcc aggaagtcag      5880
cctaaaactg cttgtaccaa ttgctattgt aaaaagtgtt gctttcattg ccaagtttgt      5940
ttcatgacaa aagccttagg catctcctat ggcaggaaga agcggagaca gcgacgaaga      6000
gctcatcaga acagtcagac tcatcaagct tctctatcaa agcagtaagt agtacatgta      6060
atgcaaccta taatagtagc aatagtagca ttagtagtag caataataat agcaatagtt      6120
gtgtggtcca tagtaatcat agaatatagg aaaatattaa gacaaagaaa aatagacagg      6180
ttaattgata gactaataga aagagcagaa gacagtggca atgagagtga aggagaagta      6240
tcagcacttg tggagatggg ggtggaaatg gggcaccatg ctccttggga tattgatgat      6300
ctgtagtgct acagaaaaat tgtgggtcac agtctattat ggggtacctg tgtggaagga      6360
agcaaccacc actctatttt gtgcatcaga tgctaaagca tatgatacag aggtacataa      6420
tgtttgggcc acacatgcct gtgtacccac agaccccaac ccacaagaag tagtattggt      6480
aaatgtgaca gaaaatttta acatgtggaa aatgacatg gtagaacaga tgcatgagga      6540
tataatcagt ttatgggatc aaagcctaaa gccatgtgta aaattaaccc cactctgtgt      6600
tagtttaaag tgcactgatt tgaagaatga tactaatacc aatagtagta gcgggagaat      6660
gataatggag aaaggagaga taaaaaactg ctctttcaat atcagcacaa gcataagaga      6720
taaggtgcag aaagaatatg cattctttta taaacttgat atagtaccaa tagataatac      6780
cagctatagg ttgataagtt gtaacacctc agtcattaca caggcctgtc caaaggtatc      6840
ctttgagcca attcccatac attattgtgc cccggctggt tttgcgattc taaaatgtaa      6900
taataagacg ttcaatggaa caggaccatg tacaaatgtc agcacagtac aatgtacaca      6960
tggaatcagg ccagtagtat caactcaact gctgttaaat ggcagtctag cagaagaaga      7020
tgtagtaatt agatctgcca atttcacaga caatgctaaa accataatag tacagctgaa      7080
cacatctgta gaaattaatt gtacaagacc caacaacaat acaagaaaaa gtatccgtat      7140
ccagagggga ccagggagag catttgttac aataggaaaa ataggaaata tgagacaagc      7200
acattgtaac attagtagag caaaatggaa tgccacttta aaacagatag ctagcaaatt      7260
aagagaacaa tttggaaata taaaacaat aatctttaag caatcctcag gaggggaccc      7320
agaaattgta acgcacagtt ttaattgtgg aggggaattt ttctactgta attcaacaca      7380
actgtttaat agtacttggt ttaatagtac ttggagtact gaagggtcaa ataacactga      7440
aggaagtgac acaatcacac tcccatgcag aataaaacaa tttataaaca tgtggcagga      7500
agtaggaaaa gcaatgtatg cccctcccat cagtggacaa attagatgtt catcaaatat      7560
tactgggctg ctattaacaa gagatggtgg taataacaac aatgggtccg agatcttcag      7620
acctggagga ggcgatatga gggacaattg gagaagtgaa ttatataaat ataaagtagt      7680
aaaaattgaa ccattaggag tagcacccac caaggcaaag agaagagtgg tgcagagaga      7740
aaaaagagca gtgggaatag gagctttgtt ccttgggttc ttgggagcag caggaagcac      7800
tatgggcgca gcgtcaatga cgctgacggt acaggccaga caattattgt ctgatatagt      7860
gcagcagcag aacaatttgc tgagggctat tgaggcgcaa cagcatctgt tgcaactcac      7920
agtctggggc atcaaacagc tccaggcaag aatcctggct gtggaaagat acctaaagga      7980
tcaacagctc ctggggattt ggggttgctc tggaaaactc atttgcacca ctgctgtgcc      8040
ttggaatgct agttggagta ataaatctct ggaacagatt tggaataaca tgacctggat      8100
ggagtgggac agagaaatta acaattacac aagcttaata cactccttaa ttgaagaatc      8160
```

-continued

```
gcaaaaccag caagaaaaga atgaacaaga attattggaa ttagataaat gggcaagttt    8220
gtggaattgg tttaacataa caaattggct gtggtatata aaattattca taatgatagt    8280
aggaggcttg gtaggtttaa gaatagtttt tgctgtactt tctatagtga atagagttag    8340
gcagggatat tcaccattat cgtttcagac ccacctccca atcccgaggg gacccgacag    8400
gcccgaagga atagaagaag aaggtggaga gagagacaga gacagatcca ttcgattagt    8460
gaacggatcc ttagcactta tctgggacga tctgcggagc ctgtgcctct tcagctacca    8520
ccgcttgaga gacttactct tgattgtaac gaggattgtg gaacttctgg gacgcagggg    8580
gtgggaagcc ctcaaatatt ggtggaatct cctacagtat tggagtcagg aactaaagaa    8640
tagtgctgtt aacttgctca atgccacagc catagcagta gctgagggga cagatagggt    8700
tatagaagta ttacaagcag cttatagagc tattcgccac ataccctagaa gaataagaca    8760
gggcttggaa aggattttgc tataagatgg gtggcaagtg gtcaaaaagt agtgtgattg    8820
gatggcctgc tgtaagggaa agaatgagac gagctgagcc agcagcagat ggggtgggag    8880
cagtatctcg agacctagaa aaacatggag caatcacaag tagcaataca gcagctaaca    8940
atgctgcttg tgcctggcta gaagcacaag aggaggaaga ggtgggtttt ccagtcacac    9000
ctcaggtacc tttaagacca atgacttaca aggcagctgt agatcttagc cacttttaa    9060
aagaaaaggg gggactggaa gggctaattc actcccaaag aagacaagat atccttgatc    9120
tgtggatcta ccacacacaa ggctacttcc ctgattggca gaactacaca ccagggccag    9180
gggtcagata tccactgacc tttggatggt gctacaagct agtaccagtt gagccagata    9240
aggtagaaga ggccaataaa ggagagaaca ccagcttgtt acaccctgtg agcctgcatg    9300
gaatggatga ccctgagaga gaagtgttag agtggaggtt tgacagccgc ctagcatttc    9360
atcacgtggc ccgagagctg catccggagt acttcaagaa ctgctgacat cgagcttgct    9420
acaagggact ttccgctggg gactttccag ggaggcgtgg cctgggcggg actggggagt    9480
ggcgagccct cagatgctgc atataagcag ctgcttttg cctgtactgg gtctctctgg    9540
ttagaccaga tctgagcctg ggagctctct ggctaactag ggaacccact gcttaagcct    9600
caataaagct tgccttgagt gcttcaagta gtgtgtgccc gtctgttgtg tgactctggt    9660
aactagagat ccctcagacc cttttagtca gtgtggaaaa tctctagcac ccaggaggta    9720
gaggttgcag tgagccaaga tcgcgccact gcattccagc ctgggcaaga aaacaagact    9780
gtctaaaata ataataataa gttaagggta ttaaatatat ttatacatgg aggtcataaa    9840
aatatatata tttgggctgg gcgcagtggc tcacacctgc gcccggccct ttgggaggcc    9900
gaggcaggtg gatcacctga gtttgggagt tccagaccag cctgaccaac atggagaaac    9960
cccttctctg tgtatttta gtagatttta ttttatgtgt atttttattca caggtatttc   10020
tggaaaactg aaactgtttt tcctctactc tgataccaca agaatcatca gcacagagga   10080
agacttctgt gatcaaatgt ggtgggagag ggaggtttc accagcacat gagcagtcag   10140
ttctgccgca gactcggcgg gtgtccttcg gttcagttcc aacaccgcct gcctggagag   10200
aggtcagacc acagggtgag ggctcagtcc ccaagacata acacccaag acataaacac    10260
ccaacaggtc caccccgcct gctgcccagg cagagccgat tcaccaagac gggaattagg   10320
atagagaaag agtaagtcac acagagccgg ctgtgcggga aacggagtt ctattatgac    10380
tcaaatcagt ctccccaagc attcggggat cagagttttt aaggataact tagtgtgtag   10440
ggggccagtg agttggagat gaaagcgtag ggagtcgaag gtgtcctttt gcgccgagtc   10500
agttcctggg tggggggccac aagatcggat gagccagttt atcaatccgg gggtgccagc  10560
```

```
tgatccatgg agtgcagggt ctgcaaaata tctcaagcac tgattgatct taggttttac    10620
aatagtgatg ttaccccagg aacaatttgg ggaaggtcag aatcttgtag cctgtagctg    10680
catgactcct aaaccataat ttcttttttg tttttttttt tttatttttg agacagggtc    10740
tcactctgtc acctaggctg gagtgcagtg gtgcaatcac agctcactgc agcctcaacg    10800
tcgtaagctc aagcgatcct cccacctcag cctgcctggt agctgagact acaagcgacg    10860
ccccagttaa tttttgtatt tttggtagag gcagcgtttt gccgtgtggc cctggctggt    10920
ctcgaactcc tgggctcaag tgatccagcc tcagcctccc aaagtgctgg gacaaccggg    10980
gccagtcact gcacctggcc ctaaaccata atttctaatc ttttggctaa tttgttagtc    11040
ctacaaaggc agtctagtcc ccaggcaaaa agggggtttg tttcgggaaa gggctgttac    11100
tgtctttgtt tcaaactata aactaagttc ctcctaaact tagttcggcc tacacccagg    11160
aatgaacaag gagagcttgg aggttagaag cacgatggaa ttggttaggt cagatctctt    11220
tcactgtctg agttataatt ttgcaatggt ggttcaaaga ctgcccgctt ctgacaccag    11280
tcgctgcatt aatgaatcgg ccaacgcgcg gggagaggcg gtttgcgtat gggcgctct    11340 tccgcttcct cgctcactga ctcgctgcgc tcggtcgttc ggctgcggcg agcggtatca    11400
gctcactcaa aggcggtaat acggttatcc acagaatcag gggataacgc aggaaagaac    11460
atgtgagcaa aaggccagca aaaggccagg aaccgtaaaa aggccgcgtt gctggcgttt    11520
ttccataggc tccgccccc tgacgagcat cacaaaaatc gacgctcaag tcagaggtgg    11580
cgaaacccga caggactata aagataccag gcgtttcccc ctggaagctc cctcgtgcgc    11640
tctcctgttc cgaccctgcc gcttaccgga tacctgtccg cctttctccc ttcgggaagc    11700
gtggcgcttt ctcatagctc acgctgtagg tatctcagtt cggtgtaggt cgttcgctcc    11760
aagctgggct gtgtgcacga accccccgtt cagcccgacc gctgcgcctt atccggtaac    11820
tatcgtcttg agtccaaccc ggtaagacac gacttatcgc cactggcagc agccactggt    11880
aacaggatta gcagagcgag gtatgtaggc ggtgctacag agttcttgaa gtggtggcct    11940
aactacggct acactagaag aacagtattt ggtatctgcg ctctgctgaa gccagttacc    12000
ttcggaaaaa gagttggtag ctcttgatcc ggcaaacaaa ccaccgctgg tagcggtggt    12060
ttttttgttt gcaagcagca gattacgcgc agaaaaaaag gatctcaaga agatcctttg    12120
atcttttcta cggggtctga cgctcagtgg aacgaaaact cacgttaagg gattttggtc    12180
atgagattat caaaaaggat cttcacctag atccttttaa attaaaaatg aagttttaaa    12240
tcaatctaaa gtatatatga gtaaacttgg tctgacagtt accaatgctt aatcagtgag    12300
gcacctatct cagcgatctg tctatttcgt tcatccatag ttgcctgact ccccgtcgtg    12360
tagataacta cgatacggga gggcttacca tctggcccca gtgctgcaat gataccgcga    12420
gacccacgct caccggctcc agatttatca gcaataaacc agccagccgg aagggccgag    12480
cgcagaagtg gtcctgcaac tttatccgcc tccatccagt ctattaattg ttgccgggaa    12540
gctagagtaa gtagttcgcc agttaatagt ttgcgcaacg ttgttgccat tgctacaggc    12600
atcgtggtgt cacgctcgtc gtttggtatg gcttcattca gctccggttc ccaacgatca    12660
aggcgagtta catgatcccc catgttgtgc aaaaaagcgg ttagctcctt cggtcctccg    12720
atcgttgtca gaagtaagtt ggccgcagtg ttatcactca tggttatggc agcactgcat    12780
aattctctta ctgtcatgcc atccgtaaga tgcttttctg tgactggtga gtactcaacc    12840
aagtcattct gagaatagtg tatgcggcga ccgagttgct cttgcccggc gtcaatacgg    12900
```

```
gataataccg cgccacatag cagaaccttta aaagtgctca tcattggaaa acgttcttcg      12960
gggcgaaaac tctcaaggat cttaccgctg ttgagatcca gttcgatgta acccactcgt      13020
gcacccaact gatcttcagc atcttttact ttcaccagcg tttctgggtg agcaaaaaca      13080
ggaaggcaaa atgccgcaaa aagggaata agggcgacac ggaaatgttg aatactcata      13140
ctcttccttt ttcaatatta ttgaagcatt tatcagggtt attgtctcat gagcggatac      13200
atatttgaat gtatttagaa aaataaacaa ataggggttc cgcgcacatt tccccgaaaa      13260
gtgccacctg acgtctaaga aaccattatt atcatgacat taacctataa aaataggcgt      13320
atcacgaggc cctttcgtct cgcgcgtttc ggtgatgacg gtgaaaacct ctgacacatg      13380
cagctcccgg agacggtcac agcttgtctg taagcggatg ccgggagcag acaagcccgt      13440
cagggcgcgt cagcgggtgt tggcgggtgt cggggctggc ttaactatgc ggcatcagag      13500
cagattgtac tgagagtgca ccatatgcgg tgtgaaatac cgcacagatg cgtaaggaga      13560
aaataccgca tcaggcgcca ttcgccattc aggctgcgca actgttggga agggcgatcg      13620
gtgcgggcct cttcgctatt acgccagggg aggcagagat tgcagtaagc tgagatcgca      13680
gcactgcact ccagcctggg cgacagagta agactctgtc tcaaaaataa aataaataaa      13740
tcaatcagat attccaatct tttcctttat ttatttattt attttctatt ttggaaacac      13800
agtccttcct tattccagaa ttacacatat attctatttt tctttatatg ctccagtttt      13860
ttttagacct tcacctgaaa tgtgtgtata caaaatctag gccagtccag cagagcctaa      13920
aggtaaaaaa taaataata aaaataaat aaaatctagc tcactccttc acatcaaaat      13980
ggagatacag ctgttagcat taaataccaa ataacccatc ttgtcctcaa taattttaag      14040
cgcctctctc caccacatct aactcctgtc aaaggcatgt gccccttccg ggcgctctgc      14100
tgtgctgcca accaactggc atgtggactc tgcagggtcc ctaactgcca agccccacag      14160
tgtgccctga ggctgccct tccttctagc ggctgccccc actcggcttt gctttcccta      14220
gtttcagtta cttgcgttca gccaaggtct gaaactaggt gcgcacagag cggtaagact      14280
gcgagagaaa gagaccagct ttacaggggg tttatcacag tgcaccctga cagtcgtcag      14340
cctcacaggg ggtttatcac attgcaccct gacagtcgtc agcctcacag ggggtttatc      14400
acagtgcacc cttacaatca ttccatttga ttcacaattt ttttagtctc tactgtgcct      14460
aacttgtaag ttaaatttga tcagaggtgt gttcccagag gggaaaacag tatatacagg      14520
gttcagtact atcgcatttc aggcctccac ctgggtcttg gaatgtgtcc cccgagggt      14580 gatgactacc tcagttggat ctccacaggt cacagtgaca caagataacc aagacacctc      14640
ccaaggctac cacaatgggc cgccctccac gtgcacatgg ccggaggaac tgccatgtcg      14700
gaggtgcaag cacacctgcg catcagagtc cttggtgtgg agggagggac cagcgcagct      14760
tccagccatc cacctgatga acagaaccta gggaaagccc cagttctact tacaccagga      14820
aaggc                                                                 14825

<210> SEQ ID NO 2
<211> LENGTH: 8
<212> TYPE: DNA
<213> ORGANISM: Human immunodeficiency virus type 1

<400> SEQUENCE: 2 cggccgcg                                                                  8

<210> SEQ ID NO 3
<211> LENGTH: 13
```

```
<212> TYPE: DNA
<213> ORGANISM: Human immunodeficiency virus type 1

<400> SEQUENCE: 3
tcaagaactg cct                                                         13

<210> SEQ ID NO 4
<211> LENGTH: 39
<212> TYPE: DNA
<213> ORGANISM: Human immunodeficiency virus type 1

<400> SEQUENCE: 4
gcagccatga cccagtcacg tagcgatagc ggagtgtac                             39

<210> SEQ ID NO 5
<211> LENGTH: 14887
<212> TYPE: DNA
<213> ORGANISM: Human immunodeficiency virus type 1

<400> SEQUENCE: 5
tggaagggct aatttggtcc caaaaaagac aagagatcct tgatctgtgg atctaccaca      60
cacaaggcta cttccctgat tggcagaact acacaccagg gccagggatc agatatccac     120
tgacctttgg atggtgcttc aagttagtac cagttgaacc agagcaagta gaagaggcca     180
aataaggaga gaagaacagc ttgttacacc ctatgagcca gcatgggatg gaggacccgg     240
agggagaagt attagtgtgg aagtttgaca gcctcctagc atttcgtcac atggcccgag     300
agctgcatcc ggagtactac aaagactgct gacatcgagc tttctacaag gactttccg      360 ctggggactt ccagggagg tgtggcctgg gcgggactgg ggagtggcga gccctcagat      420
gctacatata agcagctgct ttttgcctgt actgggtctc tctggttaga ccagatctga     480
gcctgggagc tctctggcta actagggaac ccactgctta agcctcaata agcttgcct      540 tgagtgctca agtagtgtg tgcccgtctg ttgtgtgact ctggtaacta gagatccctc      600 agacccttttt agtcagtgtg gaaaatctct agcagtggcg cccgaacagg gacttgaaag     660
cgaaagtaaa gccagaggag atctctcgac gcaggactcg gcttgctgaa gcgcgcacgg     720
caagaggcga ggggcggcga ctggtgagta cgccaaaaat tttgactagc ggaggctaga     780
aggagagaga tgggtgcgag agcgtcggta ttaagcgggg gagaattaga taaatgggaa     840
aaaattcggt taaggccagg gggaagaaa caatataaac taaaacatat agtatgggca     900
agcagggagc tagaacgatt cgcagttaat cctggccttt tagagacatc agaaggctgt     960
agacaaatac tgggacagct acaaccatcc cttcagacag gatcagaaga acttagatca    1020
ttatataata caatagcagt cctctattgt gtgcatcaaa ggatagatgt aaaagacacc    1080
aaggaagcct tagataagat agaggaagag caaaacaaaa gtaagaaaaa ggcacagcaa    1140
gcagcagctg acacaggaaa caacagccag gtcagccaaa attaccctat agtgcagaac    1200
ctccaggggc aaatggtaca tcaggccata tcacctagaa ctttaaatgc atgggtaaaa    1260
gtagtagaag agaaggcttt cagcccagaa gtaatacccca tgttttcagc attatcagaa    1320
ggagccaccc cacaagattt aaataccatg ctaaacacag tggggggaca tcaagcagcc    1380
atgcaaatgt taaagagac catcaatgag gaagctgcag aatgggatag attgcatcca    1440
gtgcatgcag ggcctattgc accaggccag atgagagaac caaggggaag tgacatagca    1500
ggaactacta gtacccttca ggaacaaata ggatggatga cacataatcc acctatccca    1560
gtaggagaaa tctataaaag atggataatc ctgggattaa ataaaatagt aagaatgtat    1620
```

```
agccctacca gcattctgga cataagacaa ggaccaaagg aaccctttag agactatgta      1680
gaccgattct ataaaactct aagagccgag caagcttcac aagaggtaaa aaattggatg      1740
acagaaacct tgttggtcca aaatgcgaac ccagattgta agactatttt aaaagcattg      1800
ggaccaggag cgacactaga agaaatgatg acagcatgtc agggagtggg gggacccggc      1860
cataaagcaa gagttttggc tgaagcaatg agccaagtaa caaatccagc taccataatg      1920
atacagaaag gcaattttag gaaccaaaga aagactgtta agtgtttcaa ttgtggcaaa      1980
gaagggcaca tagccaaaaa ttgcagggcc cctaggaaaa agggctgttg gaaatgtgga      2040
aaggaaggac accaaatgaa agattgtact gagagacagg ctaatttttt agggaagatc      2100
tggccttccc acaagggaag gccagggaat tttcttcaga gcagaccaga gccaacagcc      2160
ccaccgaaag agagcttcag gtttggggaa gagacaacaa ctccctctca gaagcaggag      2220
ccgatagaca aggaactgta tcctttagct tccctcagat cactctttgg cagcgacccc      2280
tcgtcacaat aaagatagggg gggcaattaa aggaagctct attagataca ggagcagatg      2340
atacagtatt agaagaaatg aatttgccag gaagatggaa accaaaaatg ataggggaa      2400 ttggaggttt tatcaaagta ggacagtatg atcagatact catagaaatc tgcggacata      2460
aagctatagg tacagtatta gtaggaccta cacctgtcaa cataattgga agaaatctgt      2520
tgactcagat tggctgcact ttaaattttc ccattagtcc tattgagact gtaccagtaa      2580
aattaaagcc aggaatggat ggcccaaaag ttaaacaatg gccattgaca gaagaaaaaa      2640
taaaagcatt agtagaaatt tgtacagaaa tggaaaagga aggaaaaatt tcaaaaattg      2700
ggcctgaaaa tccatacaat actccagtat ttgccataaa gaaaaagac agtactaaat      2760 ggagaaaatt agtagatttc agagaactta ataagagaac tcaagatttc tgggaagttc      2820
aattaggaat accacatcct gcagggttaa aacagaaaaa atcagtaaca gtactggatg      2880
tgggcgatgc atattttca gttcccttag ataaagactt caggaagtat actgcattta      2940
ccatacctag tataaacaat gagacaccag ggattagata tcagtacaat gtgcttccac      3000
agggatggaa aggatcacca gcaatattcc agtgtagcat gacaaaaatc ttagagcctt      3060
ttagaaaaca aaatccagac atagtcatct atcaatacat ggatgatttg tatgtaggat      3120
ctgacttaga aatagggcag catagaacaa aaatagagga actgagacaa catctgttga      3180 ggtgggga t taccacacca gacaaaaaac atcagaaaga acctccattc ctttggatgg      3240
gttatgaact ccatcctgat aaatggacag tacagcctat agtgctgcca gaaaaggaca      3300
gctggactgt caatgacata cagaaattag tgggaaaatt gaattgggca agtcagattt      3360
atgcagggat taaagtaagg caattatgta aacttcttag gggaaccaaa gcactaacag      3420
aagtagtacc actaacagaa gaagcagagc tagaactggc agaaaacagg gagattctaa      3480
aagaaccggt acatggagtg tattatgacc catcaaaaga cttaatagca gaaatacaga      3540
agcaggggca aggccaatgg acatatcaaa tttatcaaga gccattaaa atctgaaaa      3600 caggaaaata tgcaagaatg aagggtgccc acactaatga tgtgaaacaa ttaacagagg      3660
cagtacaaaa aatagccaca gaaagcatag taatatgggg aaagactcct aaatttaaat      3720
tacccataca aaaggaaaca tgggaagcat ggtggacaga gtattggcaa gccacctgga      3780
ttcctgagtg ggagtttgtc aatacccctc ccttagtgaa gttatggtac cagttagaga      3840
aagaacccat aataggagca gaacttttct atgtagatgg ggcagccaat agggaaacta      3900
aattaggaaa agcaggatat gtaactgaca gaggaagaca aaaagttgtc cccctaacgg      3960
acacaacaaa tcagaagact gagttacaag caattcatct agctttgcag gattcgggat      4020
```

```
tagaagtaaa catagtgaca gactcacaat atgcattggg aatcattcaa gcacaaccag   4080
ataagagtga atcagagtta gtcagtcaaa taatagagca gttaataaaa aaggaaaaag   4140
tctacctggc atgggtacca gcacacaaag gaattggagg aaatgaacaa gtagatgggt   4200
tggtcagtgc tggaatcagg aaagtactat ttttagatgg aatagataag gcccaagaag   4260
aacatgagaa atatcacagt aattggagag caatggctag tgattttaac ctaccacctg   4320
tagtagcaaa agaaatagta gccagctgtg ataaatgtca gctaaaaggg gaagccatgc   4380
atggacaagt agactgtagc ccaggaatat ggcagctaga ttgtacacat ttagaaggaa   4440
aagttatctt ggtagcagtt catgtagcca gtggatatat agaagcagaa gtaattccag   4500
cagagacagg gcaagaaaca gcatacttcc tcttaaaatt agcaggaaga tggccagtaa   4560
aaacagtaca tacagacaat ggcagcaatt tcaccagtac tacagttaag gccgcctgtt   4620
ggtgggcggg gatcaagcag gaatttggca ttccctacaa tccccaaagt caaggagtaa   4680
tagaatctat gaataaagaa ttaaagaaaa ttataggaca ggtaagagat caggctgaac   4740
atcttaagac agcagtacaa atggcagtat tcatccacaa ttttaaaaga aaggggggga   4800
ttggggggta cagtgcaggg gaaagaatag tagacataat agcaacagac atacaaacta   4860
aagaattaca aaaacaaatt acaaaaattc aaaattttcg ggtttattac agggacagca   4920
gagatccagt ttggaaagga ccagcaaagc tcctctggaa aggtgaaggg gcagtagtaa   4980
tacaagataa tagtgacata aaagtagtgc caagaagaaa agcaaagatc atcagggatt   5040
atggaaaaca gatggcaggt gatgattgtg tggcaagtag acaggatgag gattaacaca   5100
tggaaaagat tagtaaaaca ccatatgtat atttcaagga aagctaagga ctggttttat   5160
agacatcact atgaaagtac taatccaaaa ataagttcag aagtacacat cccactaggg   5220
gatgctaaat tagtaataac aacatattgg ggtctgcata caggagaaag agactggcat   5280
ttgggtcagg gagtctccat agaatggagg aaaaagagat atagcacaca agtagaccct   5340
gacctagcag accaactaat tcatctgcac tattttgatt gttttttcaga atctgctata   5400 agaaatacca tattaggacg tatagttagt cctaggtgtg aatatcaagc aggacataac   5460
aaggtaggat ctctacagta cttggcacta gcagcattaa taaaaccaaa acagataaag   5520
ccacctttgc ctagtgttag gaaactgaca gaggacagat ggaacaagcc ccagaagacc   5580
aagggccaca gagggagcca tacaatgaat ggacactaga gcttttagag gaacttaaga   5640
gtgaagctgt tagacatttt cctaggatat ggctccataa cttaggacaa catatctatg   5700
aaacttacgg ggatacttgg gcaggagtgg aagccataat aagaattctg caacaactgc   5760
tgtttatcca tttcagaatt gggtgtcgac atagcagaat aggcgttact cgacagagga   5820
gagcaagaaa tggagccagt agatcctaga ctagagccct ggaagcatcc aggaagtcag   5880
cctaaaactg cttgtaccaa ttgctattgt aaaaagtgtt gctttcattg ccaagtttgt   5940
ttcatgacaa aagccttagg catctcctat ggcaggaaga agcggagaca gcgacgaaga   6000
gctcatcaga acagtcagac tcatcaagct tctctatcaa gcagtaagt agtacatgta    6060 atgcaaccta ataatagtagc aatagtagca ttagtagtag caataataat agcaatagtt   6120
gtgtggtcca tagtaatcat agaatatagg aaaatattaa gacaaagaaa aatagacagg   6180
ttaattgata gactaataga aagagcagaa gacagtggca atgagagtga aggagaagta   6240
tcagcacttg tggagatggg ggtggaaatg gggcaccatg ctccttggga tattgatgat   6300
ctgtagtgct acagaaaaat tgtgggtcac cgtctattat ggggtacctg tgtggaagga   6360
```

```
agcaaccacc actctatttt gtgcatcaga tgctaaagca tatgatacag aggtacataa      6420
tgtttgggcc acacatgcct gtgtacccac agaccccaac ccacaagaag tagtattggt      6480
aaatgtgaca gaaaatttta acatgtggaa aaatgacatg gtagaacaga tgcatgagga      6540
tataatcagt ttatgggatc aaagcctaaa gccatgtgta aaattaaccc cactctgtgt      6600
tagtttaaag tgcactgatt tgaagaatga tactaatacc aatagtagta gcgggagaat      6660
gataatggag aaaggagaga taaaaaactg ctctttcaat atcagcacaa gcataagaga      6720
taaggtgcag aaagaatatg cattctttta taaacttgat atagtaccaa tagataatac      6780
cagctatagg ttgataagtt gtaacacctc agtcattaca caggcctgtc aaaggtatc       6840 ctttgagcca attcccatac attattgtgc cccggctggt tttgcgattc taaaatgtaa      6900
taataagacg ttcaatggaa caggaccatg tacaaatgtc agcacagtac aatgtacaca      6960
tggaatcagg ccagtagtat caactcaact gctgttaaat ggcagtctag cagaagaaga      7020
tgtagtaatt agatctgcca atttcacaga caatgctaaa accataatag tacagctgaa      7080
cacatctgta gaaattaatt gtacaagacc caacaacaat acaagaaaaa gtatccgtat      7140
ccagagggga ccaggagag catttgttac aataggaaaa ataggaaata tgagacaagc      7200
acattgtaac attagtagag caaaatggaa tgccacttta aaacagatag ctagcaaatt      7260
aagagaacaa tttggaaata taaaaacaat aatctttaag caatcctcag gaggggaccc      7320
agaaattgta acgcacagtt ttaattgtgg aggggaattt ttctactgta attcaacaca      7380 actgttttaat agtacttggt ttaatagtac ttggagtact gaagggtcaa ataacactga      7440
aggaagtgac acaatcacac tcccatgcag aataaaacaa tttataaaca tgtggcagga      7500
agtaggaaaa gcaatgtatg cccctcccat cagtggacaa attagatgtt catcaaatat      7560
tactgggctg ctattaacaa gagatggtgg taataacaac aatgggtccg agatcttcag      7620
acctggagga ggcgatatga gggacaattg gagaagtgaa ttatataaat ataaagtagt      7680
aaaaattgaa ccattaggag tagcacccac caaggcaaag agaagagtgg tgcagagaga      7740
aaaaagagca gtgggaatag gagctttgtt ccttgggttc ttgggagcag caggaagcac      7800
tatgggcgca gcgtcaatga cgctgacggt acaggccaga caattattgt ctgatatagt      7860
gcagcagcag aacaatttgc tgagggctat tgaggcgcaa cagcatctgt tgcaactcac      7920
agtctggggc atcaaacagc tccaggcaag aatcctggct gtggaaagat acctaaagga      7980
tcaacagctc ctggggattt ggggttgctc tggaaaactc atttgcacca ctgctgtgcc      8040
ttggaatgct agttggagta ataaatctct ggaacagatt tggaataaca tgacctggat      8100
ggagtgggac agagaaatta acaattacac aagcttaata cactccttaa ttgaagaatc      8160
gcaaaaccag caagaaaaga tgaacaaga attattggaa ttagataaat gggcaagttt      8220
gtggaattgg tttaacataa caaattggct gtggtatata aaattattca taatgatagt      8280
aggaggcttg gtaggtttaa gaatagtttt tgctgtactt tctatagtga atagagttag      8340
gcagggatat tcaccattat cgtttcagac ccacctccca atcccgaggg gacccgacag      8400
gcccgaagga atagaagaag aaggtggaga gagagacaga gacagatcca ttcgattagt      8460
gaacggatcc ttagcactta tctgggacga tctgcggagc ctgtgcctct tcagctacca      8520
ccgcttgaga gacttactct tgattgtaac gaggattgtg gaacttctgg gacgcagggg      8580
gtgggaagcc ctcaaatatt ggtggaatct cctacagtat tggagtcagg aactaaagaa      8640
tagtgctgtt aacttgctca atgccacagc catagcagta gctgagggga cagatagggt      8700
tatagaagta ttacaagcag cttatagagc tattcgccac atacctagaa gaataagaca      8760
```

```
gggcttggaa aggattttgc tataagcggc cgcgatgggt ggcaagtggt caaaaagtag   8820
tgtgattgga tggcctgctg taagggaaag aatgagacga gctgagccag cagcagatgg   8880
ggtgggagca gtatctcgag acctagaaaa acatggagca atcacaagta gcaatacagc   8940
agctaacaat gctgcttgtg cctggctaga agcacaagag gaggaagagg tgggttttcc   9000
agtcacacct caggtacctt taagaccaat gacttacaag gcagctgtag atcttagcca   9060 cttttttaaaa gaaaaggggg gactggaagg gctaattcac tcccaaagaa gacaagatat   9120
ccttgatctg tggatctacc acacacaagg ctacttccct gattggcaga actacacacc   9180
agggccaggg gtcagatatc cactgacctt tggatggtgc tacaagctag taccagttga   9240
gccagataag gtagaagagg ccaataaagg agagaacacc agcttgttac accctgtgag   9300
cctgcatgga atggatgacc ctgagagaga agtgttagag tggaggtttg acagccgcct   9360
agcatttcat cacgtggccc gagagctgca tccggagtac ttcaagaact gctgacatcg   9420
agcttgctac aagggacttt ccgctgggga ctttccaggg aggcgtggcc tgggcgggac   9480
tggggagtgg cgagccctca gatgctgcat ataagcagct gctttttgcc tgtactgggt   9540
ctctctggtt agaccagatc tgagcctggg agctctctgg ctaactaggg aacccactgc   9600
ttaagcctca ataaagcttg ccttgagtgc ttcaagtagt gtgtgcccgt ctgttgtgtg   9660
actctggtaa ctagagatcc ctcagaccct tttagtcagt gtggaaaatc tctagcaccc   9720
cccaggaggt agaggttgca gtgagccaag atcgcgccac tgcattccag cctgggcaag   9780
aaaacaagac tgtctaaaat aataataata agttaagggt attaaatata tttatacatg   9840
gaggtcataa aaatatatat atttgggctg ggcgcagtgg ctcacacctg cgcccggccc   9900
tttgggaggc cgaggcaggt ggatcacctg agtttgggag ttccagacca gcctgaccaa   9960
catggagaaa cccttctct gtgtattttt agtagatttt attttatgtg tattttattc  10020
acaggtattt ctggaaaact gaaactgttt ttcctctact ctgataccac aagaatcatc  10080
agcacagagg aagacttctg tgatcaaatg tggtgggaga gggaggtttt caccagcaca  10140
tgagcagtca gttctgccgc agactcggcg ggtgtccttc ggttcagttc caacaccgcc  10200
tgcctggaga gaggtcagac cacagggtga gggctcagtc cccaagacat aaacacccaa  10260
gacataaaca cccaacaggt ccacccccgcc tgctgcccag gcagagccga ttcaccaaga  10320
cgggaattag gatagagaaa gagtaagtca cacagagccg gctgtgcggg agaacggagt  10380
tctattatga ctcaaatcag tctccccaag cattcgggga tcagagtttt taaggataac  10440
ttagtgtgta gggggccagt gagttggaga tgaaagcgta gggagtcgaa ggtgtcccttt  10500 tgcgccgagt cagttcctgg gtggggccca caagatcgga tgagccagtt tatcaatccg  10560
ggggtgccag ctgatccatg gagtgcaggg tctgcaaaat atctcaagca ctgattgatc  10620
ttaggtttta caatagtgat gttaccccag gaacaatttg gggaaggtca gaatcttgta  10680
gcctgtagct gcatgactcc taaaccataa tttcttttt gttttttttt ttttatttttt  10740 gagacagggt ctcactctgt cacctaggct ggagtgcagt ggtgcaatca cagctcactg  10800
cagcctcaac gtcgtaagct caagcgatcc tcccacctca gcctgcctgg tagctgagac  10860
tacaagcgac gccccagtta attttttgtat ttttggtaga gcagcgtttt tgccgtgtgg  10920
ccctggctgg tctcgaactc ctgggctcaa gtgatccagc ctcagcctcc caaagtgctg  10980
ggacaaccgg ggccagtcac tgcacctggc cctaaaccat aatttctaat cttttggcta  11040
atttgttagt cctacaaagg cagtctagtc cccaggcaaa aaggggggttt gtttcgggaa  11100
```

```
agggctgtta ctgtctttgt ttcaaactat aaactaagtt cctcctaaac ttagttcggc    11160
ctacacccag gaatgaacaa ggagagcttg gaggttagaa gcacgatgga attggttagg    11220
tcagatctct ttcactgtct gagttataat tttgcaatgg tggttcaaag actgcccgct    11280
tctgacacca gtcgctgcat taatgaatcg gccaacgcgc ggggagaggc ggtttgcgta    11340
ttggcgctct tccgcttcct cgctcactga ctcgctgcgc tcggtcgttc ggctgcggcg    11400
agcggtatca gctcactcaa aggcggtaat acggttatcc acagaatcag gggataacgc    11460
aggaaagaac atgtgagcaa aaggccagca aaaggccagg aaccgtaaaa aggccgcgtt    11520
gctggcgttt ttccataggc tccgcccccc tgacgagcat cacaaaaatc gacgctcaag    11580
tcagaggtgg cgaaacccga caggactata aagataccag gcgtttcccc ctggaagctc    11640
cctcgtgcgc tctcctgttc cgaccctgcc gcttaccgga tacctgtccg cctttctccc    11700
ttcgggaagc gtggcgcttt ctcaatgctc acgctgtagg tatctcagtt cggtgtaggt    11760
cgttcgctcc aagctgggct gtgtgcacga accccccgtt cagcccgacc gctgcgcctt    11820
atccggtaac tatcgtcttg agtccaaccc ggtaagacac gacttatcgc cactggcagc    11880
agccactggt aacaggatta gcagagcgag gtatgtaggc ggtgctacag agttcttgaa    11940
gtggtggcct aactacggct acactagaag gacagtattt ggtatctgcg ctctgctgaa    12000
gccagttacc ttcggaaaaa gagttggtag ctcttgatcc ggcaaacaaa ccaccgctgg    12060
tagcggtggt ttttttgttt gcaagcagca gattacgcgc agaaaaaaag gatctcaaga    12120
agatcctttg atcttttcta cggggtctga cgctcagtgg aacgaaaact cacgttaagg    12180
gattttggtc atgagattat caaaaaggat cttcacctag atccttttaa attaaaaatg    12240
aagttttaaa tcaatctaaa gtatatatga gtaaacttgg tctgacagtt accaatgctt    12300
aatcagtgag gcacctatct cagcgatctg tctatttcgt tcatccatag ttgcctgact    12360
ccccgtcgtg tagataacta cgatacggga gggcttacca tctggcccca gtgctgcaat    12420
gataccgcga gacccacgct caccggctcc agatttatca gcaataaacc agccagccgg    12480
aagggccgag cgcagaagtg gtcctgcaac tttatccgcc tccatccagt ctattaattg    12540
ttgccgggaa gctagagtaa gtagttcgcc agttaatagt ttgcgcaacg ttgttgccat    12600
tgctacaggc atcgtggtgt cacgctcgtc gtttggtatg gcttcattca gctccggttc    12660
ccaacgatca aggcgagtta catgatcccc catgttgtgc aaaaaagcgg ttagctcctt    12720
cggtcctccg atcgttgtca gaagtaagtt ggccgcagtg ttatcactca tggttatggc    12780
agcactgcat aattctctta ctgtcatgcc atccgtaaga tgcttttctg tgactggtga    12840
gtactcaacc aagtcattct gagaatagtg tatgcggcga ccgagttgct cttgcccggc    12900
gtcaatacgg gataataccg cgccacatag cagaacttta aaagtgctca tcattggaaa    12960
acgttcttcg gggcgaaaac tctcaaggat cttaccgctg ttgagatcca gttcgatgta    13020
acccactcgt gcacccaact gatcttcagc atcttttact ttcaccagcg tttctgggtg    13080
agcaaaaaca ggaaggcaaa atgccgcaaa aaagggaata agggcgacac ggaaatgttg    13140
aatactcata ctcttccttt ttcaatatta ttgaagcatt tatcagggtt attgtctcat    13200
gagcggatac atatttgaat gtatttagaa aaataaacaa ataggggttc cgcgcacatt    13260
tccccgaaaa gtgccacctg acgtctaaga aaccattatt atcatgacat taacctataa    13320
aaataggcgt atcacgaggc cctttcgtct tcaagaactg cctcgcgcgt ttcggtgatg    13380
acggtgaaaa cctctgacac atgcagctcc cggagacggt cacagcttgt ctgtaagcgg    13440
atgccgggag cagacaagcc cgtcagggcg cgtcagcggg tgttggcggg tgtcggggcg    13500
```

```
cagccatgac ccagtcacgt agcgatagcg gagtgtactg gcttaactat gcggcatcag    13560
agcagattgt actgagagtg caccatatgc ggtgtgaaat accgcacaga tgcgtaagga    13620 gaaataccg catcaggcgc cattcgccat tcaggctgcg caactgttgg gaagggcgat     13680
cggtgcgggc ctcttcgcta ttacgccagg ggaggcagag attgcagtaa gctgagatcg    13740
cagcactgca ctccagcctg ggcgacagag taagactctg tctcaaaaat aaaataaata    13800
aatcaatcag atattccaat cttttccttt atttatttat ttattttcta ttttggaaac    13860
acagtccttc cttattccag aattacacat atattctatt tttctttata tgctccagtt    13920 tttttagac cttcacctga aatgtgtgta tacaaaatct aggccagtcc agcagagcct     13980
aaaggtaaaa aataaaataa taaaaaataa ataaaatcta gctcactcct tcacatcaaa    14040
atggagatac agctgttagc attaaatacc aaataaccca tcttgtcctc aataatttta    14100
agcgcctctc tccaccacat ctaactcctg tcaaaggcat gtgccccttc cgggcgctct    14160
gctgtgctgc caaccaactg gcatgtggac tctgcagggt ccctaactgc caagccccac    14220
agtgtgccct gaggctgccc cttccttcta gcggctgccc ccactcggct ttgctttccc    14280
tagtttcagt tacttgcgtt cagccaaggt ctgaaactag gtgcgcacag agcggtaaga    14340
ctgcgagaga aagagaccag ctttacaggg ggtttatcac agtgcaccct gacagtcgtc    14400
agcctcacag ggggtttatc acattgcacc ctgacagtcg tcagcctcac aggggggttta   14460 tcacagtgca cccttacaat cattccattt gattcacaat ttttttagtc tctactgtgc    14520
ctaacttgta agttaaattt gatcagaggt gtgttcccag aggggaaaac agtatataca    14580
gggttcagta ctatcgcatt tcaggcctcc acctgggtct tggaatgtgt cccccgaggg    14640
gtgatgacta cctcagttgg atctccacag gtcacagtga cacaagataa ccaagacacc    14700
tcccaaggct accacaatgg gccgccctcc acgtgcacat ggccggagga actgccatgt    14760
cggaggtgca agcacacctg cgcatcgaga tccttggtgt ggaggggagg gaccagcgcag   14820 cttccagcca tccacctgat gaacagaacc tagggaaagc cccagttcta cttacaccag    14880
gaaaggc                                                              14887
```

<210> SEQ ID NO 6
<211> LENGTH: 14812
<212> TYPE: DNA
<213> ORGANISM: Human immunodeficiency virus type 1

<400> SEQUENCE: 6

```
tggaagggct aatttggtcc caaaaaagac aagagatcct tgatctgtgg atctaccaca      60
cacaaggcta cttccctgat tggcagaact acacaccagg gccagggatc agatatccac     120
tgacctttgg atggtgcttc aagttagtac cagttgaacc agagcaagta gaagaggcca     180
aataaggaga gaagaacagc ttgttacacc ctatgagcca gcatgggatg gaggacccgg     240
agggagaagt attagtgtgg aagtttgaca gcctcctagc atttcgtcac atggcccgag     300
agctgcatcc ggagtactac aaagactgct gacatcgagc tttctacaag gactttccg     360 ctggggactt tccagggagg tgtggcctgg gcgggactgg ggagtggcga gccctcagat    420
gctacatata agcagctgct ttttgcctgt actgggtctc tctggttaga ccagatctga    480
gcctgggagc tctctggcta actagggaac ccactgctta agcctcaata agcttgcct     540 tgagtgctca aagtagtgtg tgcccgtctg ttgtgtgact ctggtaacta gagatccctc    600 agacccttttt agtcagtgtg aaaatctcta gcagtggcg cccgaacagg gacttgaaag     660
```

-continued

| | |
|---|---|
| cgaaagtaaa gccagaggag atctctcgac gcaggactcg gcttgctgaa gcgcgcacgg | 720 |
| caagaggcga gggcggcga ctggtgagta cgccaaaaat tttgactagc ggaggctaga | 780 |
| aggagagaga tgggtgcgag agcgtcggta ttaagcgggg gagaattaga taaatgggaa | 840 |
| aaaattcggt taaggccagg gggaagaaa caatataaac taaaacatat agtatgggca | 900 |
| agcagggagc tagaacgatt cgcagttaat cctggccttt tagagacatc agaaggctgt | 960 |
| agacaaatac tgggacagct acaaccatcc cttcagacag gatcagaaga acttagatca | 1020 |
| ttatataata caatagcagt cctctattgt gtgcatcaaa ggatagatgt aaaagacacc | 1080 |
| aaggaagcct tagataagat agaggaagag caaaacaaaa gtaagaaaaa ggcacagcaa | 1140 |
| gcagcagctg acacaggaaa caacagccag gtcagccaaa attaccctat agtgcagaac | 1200 |
| ctccaggggc aaatggtaca tcaggccata tcacctagaa cttta aatgc atgggtaaaa | 1260 |
| gtagtagaag agaaggcttt cagcccagaa gtaataccca tgttttcagc attatcagaa | 1320 |
| ggagccaccc cacaagattt aaataccatg ctaaacacag tggggggaca tcaagcagcc | 1380 |
| atgcaaatgt taaaagagac catcaatgag gaagctgcag aatgggatag attgcatcca | 1440 |
| gtgcatgcag ggcctattgc accaggccag atgagagaac caaggggaag tgacatagca | 1500 |
| ggaactacta gtacccttca ggaacaaata ggatggatga cacataatcc acctatccca | 1560 |
| gtaggagaaa tctataaaag atggataatc ctgggattaa ataaaatagt aagaatgtat | 1620 |
| agccctacca gcattctgga cataagacaa ggaccaaagg aacccttag agactatgta | 1680 |
| gaccgattct ataaaactct aagagccgag caagcttcac aagaggtaaa aaattggatg | 1740 |
| acagaaacct tgttggtcca aaatgcgaac ccagattgta agactatttt aaaagcattg | 1800 |
| ggaccaggag cgacactaga agaaatgatg acagcatgtc agggagtggg ggacccggc | 1860 |
| cataaagcaa gagttttggc tgaagcaatg agccaagtaa caaatccagc taccataatg | 1920 |
| atacagaaag gcaattttag gaaccaaaga aagactgtta agtgtttcaa ttgtggcaaa | 1980 |
| gaagggcaca tagccaaaaa ttgcagggcc cctaggaaaa agggctgttg gaaatgtgga | 2040 |
| aaggaaggac accaaatgaa agattgtact gagagacagg ctaattttt agggaagatc | 2100 |
| tggccttccc acaagggaag gccagggaat tttcttcaga gcagaccaga gccaacagcc | 2160 |
| ccaccagaag agagcttcag gtttggggaa gagacaacaa ctccctctca gaagcaggag | 2220 |
| ccgatagaca aggaactgta tcctttagct tccctcagat cactctttgg cagcgacccc | 2280 |
| tcgtcacaat aaagataggg gggcaattaa aggaagctct attagataca ggagcagatg | 2340 |
| atacagtatt agaagaaatg aatttgccag gaagatggaa accaaaaatg ataggggaa | 2400 |
| ttggaggttt tatcaaagta ggacagtatg atcagatact catagaaatc tgcggacata | 2460 |
| aagctatagg tacagtatta gtaggaccta cacctgtcaa cataattgga agaaatctgt | 2520 |
| tgactcagat tggctgcact ttaaattttc ccattagtcc tattgagact gtaccagtaa | 2580 |
| aattaaagcc aggaatggat ggcccaaaag ttaaacaatg gccattgaca gaagaaaaaa | 2640 |
| taaaagcatt agtagaaatt tgtacagaaa tggaaaagga aggaaaaatt tcaaaaattg | 2700 |
| ggcctgaaaa tccatacaat actccagtat ttgccataaa gaaaaaagac agtactaaat | 2760 |
| ggagaaaatt agtagatttc agagaactta ataagagaac tcaagatttc tgggaagttc | 2820 |
| aattaggaat accacatcct gcagggttaa aacagaaaaa atcagtaaca gtactggatg | 2880 |
| tgggcgatgc atatttttca gttcccttag ataaagactt caggaagtat actgcattta | 2940 |
| ccatacctag tataaacaat gagacaccag ggattagata tcagtacaat gtgcttccac | 3000 |
| agggatggaa aggatcacca gcaatattcc agtgtagcat gacaaaaatc ttagagcctt | 3060 |

```
ttagaaaaca aaatccagac atagtcatct atcaatacat ggatgatttg tatgtaggat    3120
ctgacttaga aatagggcag catagaacaa aaatagagga actgagacaa catctgttga    3180
ggtggggatt taccacacca gacaaaaaac atcagaaaga acctccattc ctttggatgg    3240
gttatgaact ccatcctgat aaatggacag tacagcctat agtgctgcca gaaaaggaca    3300
gctggactgt caatgacata cagaaattag tgggaaaatt gaattgggca agtcagattt    3360
atgcagggat taaagtaagg caattatgta aacttcttag gggaaccaaa gcactaacag    3420
aagtagtacc actaacagaa gaagcagagc tagaactggc agaaaacagg gagattctaa    3480
aagaaccggt acatggagtg tattatgacc catcaaaaga cttaatagca gaaatacaga    3540
agcaggggca aggccaatgg acatatcaaa tttatcaaga gccatttaaa aatctgaaaa    3600
caggaaaata tgcaagaatg aagggtgccc acactaatga tgtgaaacaa ttaacagagg    3660
cagtacaaaa aatagccaca gaaagcatag taatatgggg aaagactcct aaatttaaat    3720
tacccataca aaaggaaaca tgggaagcat ggtggacaga gtattggcaa gccacctgga    3780
ttcctgagtg ggagtttgtc aatacccctc ccttagtgaa gttatggtac cagttagaga    3840
aagaacccat aataggagca gaaacttttct atgtagatgg ggcagccaat agggaaacta    3900
aattaggaaa agcaggatat gtaactgaca gaggaagaca aaaagttgtc cccctaacgg    3960
acacaacaaa tcagaagact gagttacaag caattcatct agctttgcag gattcgggat    4020
tagaagtaaa catagtgaca gactcacaat atgcattggg aatcattcaa gcacaaccag    4080
ataagagtga atcagagtta gtcagtcaaa taatagagca gttaataaaa aaggaaaaag    4140
tctacctggc atgggtacca gcacacaaag gaattggagg aaatgaacaa gtagatgggt    4200
tggtcagtgc tggaatcagg aaagtactat ttttagatgg aatagataag gcccaagaag    4260
aacatgagaa atatcacagt aattggagag caatggctag tgattttaac ctaccacctg    4320
tagtagcaaa agaaatagta gccagctgtg ataaatgtca gctaaaaggg gaagccatgc    4380
atggacaagt agactgtagc ccaggaatat ggcagctaga ttgtacacat ttagaaggaa    4440
aagttatctt ggtagcagtt catgtagcca gtggatatat agaagcagaa gtaattccag    4500
cagagacagg gcaagaaaca gcatacttcc tcttaaaatt agcaggaaga tggccagtaa    4560
aaacagtaca tacagacaat ggcagcaatt tcaccagtac tacagttaag gccgcctgtt    4620
ggtgggcggg gatcaagcag gaatttggca ttccctacaa tccccaaagt caaggagtaa    4680
tagaatctat gaataaagaa ttaagaaaaa ttataggaca ggtaagagat caggctgaac    4740
atcttaagac agcagtacaa atggcagtat tcatccacaa ttttaaaaga aaaggggggga    4800
ttggggggta cagtgcaggg gaaagaatag tagacataat agcaacagac atacaaacta    4860
aagaattaca aaaacaaatt acaaaaattc aaaattttcg ggtttattac agggacagca    4920
gagatccagt ttggaaagga ccagcaaagc tcctctggaa aggtgaaggg gcagtagtaa    4980
tacaagataa tagtgacata aaagtagtgc caagaagaaa agcaaagatc atcagggatt    5040
atggaaaaca gatggcaggt gatgattgtg tggcaagtag acaggatgag gattaacaca    5100
tggaaaagat tagtaaaaca ccatatgtat atttcaagga aagctaagga ctggttttat    5160
agacatcact atgaaagtac taatccaaaa ataagttcag aagtacacat cccactaggg    5220
gatgctaaat tagtaataac aacatattgg ggtctgcata caggagaaag agactggcat    5280
ttgggtcagg gagtctccat agaatggagg aaaaagagat atagcacaca agtagaccct    5340
gacctagcag accaactaat tcatctgcac tattttgatt gttttcaga atctgctata    5400
```

```
agaaatacca tattaggacg tatagttagt cctaggtgtg aatatcaagc aggacataac    5460
aaggtaggat ctctacagta cttggcacta gcagcattaa taaaaccaaa acagataaag    5520
ccacctttgc ctagtgttag gaaactgaca gaggacagat ggaacaagcc ccagaagacc    5580
aagggccaca gagggagcca tacaatgaat ggacactaga gcttttagag gaacttaaga    5640
gtgaagctgt tagacatttt cctaggatat ggctccataa cttaggacaa catatctatg    5700
aaacttacgg ggatacttgg gcaggagtgg aagccataat aagaattctg caacaactgc    5760
tgtttatcca tttcagaatt gggtgtcgac atagcagaat aggcgttact cgacagagga    5820
gagcaagaaa tggagccagt agatcctaga ctagagccct ggaagcatcc aggaagtcag    5880
cctaaaactg cttgtaccaa ttgctattgt aaaaagtgtt gctttcattg ccaagtttgt    5940
ttcatgacaa aagccttagg catctcctat ggcaggaaga agcggagaca gcgacgaaga    6000
gctcatcaga acagtcagac tcatcaagct tctctatcaa agcagtaagt agtacatgta    6060
atgcaaccta aatagtagc aatagtagca ttagtagtag caataataat agcaatagtt    6120
gtgtggtcca tagtaatcat agaatatagg aaaatattaa gacaaagaaa aatagacagg    6180
ttaattgata gactaataga agagcagaaa gacagtggca atgagagtga aggagaagta    6240
tcagcacttg tggagatggg ggtggaaatg gggcaccatg ctccttggga tattgatgat    6300
ctgtagtgct acagaaaaat tgtgggtcac cgtctattat ggggtacctg tgtggaaaga    6360
aacaaccacc actctatttt gtgcatcaga tgctaaagca tatgatacag aggtacataa    6420
tgtttgggcc acacatgcct gtgtacccac agaccccaac ccacaagaag tagtattgga    6480
aaatgtaaca gaagatttta acatgtggaa aataacatg gtagaacaga tgcaggagga    6540
tgtaatcaat ttatgggatc aaagcttaaa gccatgtgta aaattaaccc cactctgtgt    6600
tactttaaat tgcaaagatg tgaatgctac taataccact agtagtagtg agggaatgat    6660
ggagagagga gaaataaaaa actgctcttt caatatcacc aaaagcataa gagataaggt    6720
gcagaaagaa tatgctcttt tttataaact ggatgtagta ccaatagata ataagaataa    6780
taccaaatat aggttaataa gttgtaacac ctcagtcatt acacaagcct gtccaaaggt    6840
atcctttgaa ccaattccca tacattattg tgccccggct ggttttgcga ttctaaagtg    6900
taataataag acattcaatg gaaaaggaca atgtaaaaat gtcagcacag tacaatgtac    6960
acatggaatt aggccagtag tatcaactca actgctgcta aatggcagtc tagcagaaga    7020
aaaggttgta attagatctg acaatttttac ggacaatgct aaaaccataa tagtacagct    7080
gaatgaatct gtaaaaatta attgtacaag gcccagcaac aatacaagaa aaagtataca    7140
tataggacca gggagagcat tttatacaac aggagaaata ataggagata taagacaagc    7200
acattgtaac attagtagag cacaatggaa taacacttta aaacagatag ttgaaaaatt    7260
aagagaacaa tttaataata aaacaatagt ctttactcac tcctcaggag gggatccaga    7320
aattgtaatg cacagtttta attgtggagg ggaattttc tactgtaatt caacacaact    7380
gtttaatagt acttggaatg atactgaaaa gtcaagtggc actgaaggaa atgacaccat    7440
catactccca tgcagaataa aacaaattat aaacatgtgg caggaagtgg gaaaagcaat    7500
gtatgctcct cccattaaag gacaaattag atgttcatca atattacag ggctgctatt    7560 aacaagagat ggtggtaaaa atgagagtga gatcgagatc ttcagacctg gaggaggaga    7620
catgagggac aattggagaa gtgaattata taaatataaa gtagtaaaaa ttgaaccatt    7680
aggagtagca cccaccaagg caagagaag agtggtgcaa agagaaaaaa gagcagtggg    7740
aataggagct ttgttccttg ggttcttggg agcagcagga agcactatgg gcgcagcgtc    7800
```

```
aatgacactg acggtacagg ccagacaatt attgtctggt atagtgcaac agcaaaacaa   7860
tttgctgagg gctattgagg cgcaacagca tatgttgcaa ctcacagtct ggggcatcaa   7920
gcagctccag gcaagagtcc tggctgtgga aagatacgta aaggatcaac agctcatggg   7980
gatttggggt tgctctggaa aactcatttg caccactgct gtgccttgga atactagttg   8040
gagtaataaa tctctggata gtatttggaa taacatgacc tggatggagt gggaaaaaga   8100
aattgagaat tacacaaaca caatatacac cctaattgaa gaatcgcaga tccaacaaga   8160
aaagaatgaa caagaattat tggaattaga taaatgggca agtttgtgga attggtttgg   8220
cataacaaaa tggctgtggt atataaaaat attcataatg atagtaggag gcttgatagg   8280
tttaagaata gttttttctg tactttctat agtgaataga gttaggcagg gatactcacc   8340
cttatcgttt cagacccctcc tcccagcaac gaggggaccc gacaggcccg aaggaatcga   8400
agaagaaggt ggagagagag acagagacag atccggacaa ttagtgaacg gattcttagc   8460
acttatctgg gtcgacctgc ggagcctgtt cctcttcagc taccaccgct tgagagactt   8520
actcttgact gtaacgagga ttgtggaact tctgggacgc aggggggtggg aaatcctgaa   8580 atactggtgg aatctcctac agtattggag tcaggaacta aagaatagtg ctgttagctt   8640
gcttaatgcc acagctatag cagtagctga ggggacagat aggattatag aagtagtaca   8700
aagagtttat agggctattc tccacatacc tacaagaata agacagggct tggaaagggc   8760
tttgctataa gcggccgcga tgggtggcaa gtggtcaaaa agtagtgtga ttggatggcc   8820
tgctgtaagg gaaagaatga gacgagctga gccagcagca gatggggtgg gagcagtatc   8880
tcgagaccta gaaaaacatg gagcaatcac aagtagcaat acagcagcta acaatgctgc   8940
ttgtgcctgg ctagaagcac aagaggagga gaggtgggt tttccagtca cacctcaggt   9000 accttttaaga ccaatgactt acaaggcagc tgtagatctt agccactttt taaaagaaaa   9060
ggggggactg gaagggctaa ttcactccca aagaagacaa gatatccttg atctgtggat   9120
ctaccacaca caaggctact tccctgattg gcagaactac acaccagggc cagggggtcag   9180 atatccactg acctttggat ggtgctacaa gctagtacca gttgagccag ataaggtaga   9240
tgaccctgag agagaagtgt tagagtggag gtttgacagc cgcctagcat ttcatcacgt   9300
ggcccgagag ctgcatccgg agtacttcaa gaactgctga catcgagctt gctacaaggg   9360
actttccgct ggggactttc cagggaggcg tggcctgggc gggactgggg agtggcgagc   9420
cctcagatgc tgcatataag cagctgcttt ttgcctgtac tgggtctctc tggttagacc   9480
agatctgagc ctgggagctc tctggctaac tagggaaccc actgcttaag cctcaataaa   9540
gcttgccttg agtgcttcaa gtagtgtgtg cccgtctgtt gtgtgactct ggtaactaga   9600
gatccctcag acccttttag tcagtgtgga aaatctctag cacccccag gaggtagagg   9660 ttgcagtgag ccaagatcgc gccactgcat tccagcctgg gcaagaaaac aagactgtct   9720
aaaataataa taataagtta agggtattaa atatatttat acatggaggt cataaaaata   9780
tatatatttg gctgggcgc agtggctcac acctgcgccc ggcccttgg gaggccgagg   9840 caggtggatc acctgagttt gggagttcca ggaccagcctg accaacatgg agaaacccct   9900
tctctgtgta ttttttagtag attttatttt atgtgtattt tattcacagg tatttctgga   9960
aaactgaaac tgttttttcct ctactctgat accacaagaa tcatcagcac agaggaagac  10020
ttctgtgatc aaatgtggtg ggagagggag gttttcacca gcacatgagc agtcagttct  10080
gccgcagact cggcgggtgt ccttcggttc agttccaaca ccgcctgcct ggagagaggt  10140
```

```
cagaccacag ggtgagggct cagtccccaa gacataaaca cccaagacat aaacacccaa    10200
caggtccacc ccgcctgctg cccaggcaga gccgattcac caagacggga attaggatag    10260
agaaagagta agtcacacag agccggctgt gcgggagaac ggagttctat tatgactcaa    10320
atcagtctcc ccaagcattc ggggatcaga gttttttaagg ataacttagt gtgtaggggg    10380
ccagtgagtt ggagatgaaa gcgtagggag tcgaaggtgt cctttttgcgc cgagtcagtt    10440 cctgggtggg ggccacaaga tcggatgagc cagtttatca atccgggggt gccagctgat    10500
ccatggagtg cagggtctgc aaaatatctc aagcactgat tgatcttagg ttttacaata    10560
gtgatgttac cccaggaaca atttggggaa ggtcagaatc ttgtagcctg tagctgcatg    10620
actcctaaac cataatttct ttttttgtttt tttttttttta tttttgagac agggtctcac    10680
tctgtcacct aggctggagt gcagtggtgc aatcacagct cactgcagcc tcaacgtcgt    10740
aagctcaagc gatcctccca cctcagcctg cctggtagct gagactacaa gcgacgcccc    10800
agttaatttt tgtatttttg gtagaggcag cgttttgccg tgtggccctg gctggtctcg    10860
aactcctggg ctcaagtgat ccagcctcag cctcccaaag tgctgggaca accggggcca    10920
gtcactgcac ctggccctaa accataattt ctaatctttt ggctaatttg ttagtcctac    10980
aaaggcagtc tagtccccag gcaaaaaggg ggtttgtttc gggaaagggc tgttactgtc    11040 tttgttttcaa actataaact aagttcctcc taaacttagt tcggcctaca cccaggaatg    11100
aacaaggaga gcttggaggt tagaagcacg atggaattgg ttaggtcaga tctctttcac    11160
tgtctgagtt ataattttgc aatggtggtt caaagactgc ccgcttctga caccagtcgc    11220
tgcattaatg aatcggccaa cgcgcgggga gaggcggttt gcgtattggc gctcttccgc    11280
ttcctcgctc actgactcgc tgcgctcggt cgttcggctg cggcgagcgg tatcagctca    11340
ctcaaaggcg gtaatacggt tatccacaga atcaggggat aacgcaggaa agaacatgtg    11400
agcaaaaggc cagcaaaagg ccaggaaccg taaaaaggcc gcgttgctgg cgttttttcca    11460 taggctccgc cccctgacg agcatcacaa aaatcgacgc tcaagtcaga ggtggcgaaa    11520
cccgacagga ctataaagat accaggcgtt tccccctgga agctccctcg tgcgctctcc    11580
tgttccgacc ctgccgctta ccggatacct gtccgccttt ctcccttcgg gaagcgtggc    11640
gctttctcaa tgctcacgct gtaggtatct cagttcggtg taggtcgttc gctccaagct    11700
gggctgtgtg cacgaacccc ccgttcagcc cgaccgctgc gccttatccg gtaactatcg    11760
tcttgagtcc aacccggtaa gacacgactt atcgccactg gcagcagcca ctggtaacag    11820
gattagcaga gcgaggtatg taggcggtgc tacagagttc ttgaagtggt ggcctaacta    11880
cggctacact agaaggacag tatttggtat ctgcgctctg ctgaagccag ttaccttcgg    11940
aaaaagagtt ggtagctctt gatccggcaa acaaaccacc gctggtagcg gtggtttttt    12000
tgtttgcaag cagcagatta cgcgcagaaa aaaaggatct caagaagatc ctttgatctt    12060
ttctacgggg tctgacgctc agtggaacga aaactcacgt taagggattt tggtcatgag    12120
attatcaaaa aggatcttca cctagatcct tttaaattaa aaatgaagtt ttaaatcaat    12180
ctaaagtata tatgagtaaa cttggtctga cagttaccaa tgcttaatca gtgaggcacc    12240
tatctcagcg atctgtctat ttcgttcatc catagttgcc tgactccccg tcgtgtagat    12300
aactacgata cgggagggct taccatctgg ccccagtgct gcaatgatac cgcgagaccc    12360
acgctcaccg gctccagatt tatcagcaat aaaccagcca gccggaaggg ccgagcgcag    12420
aagtggtcct gcaactttat ccgcctccat ccagtctatt aattgttgcc gggaagctag    12480
agtaagtagt tcgccagtta atagtttgcg caacgttgtt gccattgcta caggcatcgt    12540
```

```
ggtgtcacgc tcgtcgtttg gtatggcttc attcagctcc ggttcccaac gatcaaggcg    12600
agttacatga tcccccatgt tgtgcaaaaa agcggttagc tccttcggtc ctccgatcgt    12660
tgtcagaagt aagttggccg cagtgttatc actcatggtt atggcagcac tgcataattc    12720
tcttactgtc atgccatccg taagatgctt ttctgtgact ggtgagtact caaccaagtc    12780
attctgagaa tagtgtatgc ggcgaccgag ttgctcttgc ccggcgtcaa tacgggataa    12840
taccgcgcca catagcagaa ctttaaaagt gctcatcatt ggaaaacgtt cttcggggcg    12900
aaaactctca aggatcttac cgctgttgag atccagttcg atgtaaccca ctcgtgcacc    12960
caactgatct tcagcatctt ttactttcac cagcgtttct gggtgagcaa aaacaggaag    13020
gcaaaatgcc gcaaaaaagg gaataagggc gacacggaaa tgttgaatac tcatactctt    13080
ccttttttcaa tattattgaa gcatttatca gggttattgt ctcatgagcg gatacatatt    13140
tgaatgtatt tagaaaaata aacaaatagg ggttccgcgc acatttcccc gaaaagtgcc    13200
acctgacgtc taagaaacca ttattatcat gacattaacc tataaaaata ggcgtatcac    13260
gaggcccttt cgtcttcaag aactgcctcg cgcgtttcgg tgatgacggt gaaaacctct    13320
gacacatgca gctcccggag acggtcacag cttgtctgta agcggatgcc gggagcagac    13380
aagcccgtca gggcgcgtca gcgggtgttg gcgggtgtcg gggcgcagcc atgacccagt    13440
cacgtagcga tagcggagtg tactggctta actatgcggc atcagagcag attgtactga    13500
gagtgcacca tatgcggtgt gaaataccgc acagatgcgt aaggagaaaa taccgcatca    13560
ggcgccattc gccattcagg ctgcgcaact gttgggaagg gcgatcggtg cgggcctctt    13620
cgctattacg ccaggggagg cagagattgc agtaagctga gatcgcagca ctgcactcca    13680
gcctgggcga cagagtaaga ctctgtctca aaataaaat aaataaatca atcagatatt    13740
ccaatctttt cctttatta tttatttatt ttctattttg gaaacacagt ccttccttat    13800
tccagaatta cacatatatt ctattttttct ttatatgctc cagttttttt tagaccttca    13860
cctgaaatgt gtgtatacaa aatctaggcc agtccagcag agcctaaagg taaaaaataa    13920
aataataaaa aataaataaa atctagctca ctccttcaca tcaaaatgga gatacagctg    13980
ttagcattaa ataccaaata acccatcttg tcctcaataa ttttaagcgc ctctctccac    14040
cacatctaac tcctgtcaaa ggcatgtgcc ccttccgggc gctctgctgt gctgccaacc    14100
aactggcatg tggactctgc agggtcccta actgccaagc ccacagtgt gccctgaggc    14160
tgcccctttcc ttctagcggc tgcccccact cggctttgct ttccctagtt tcagttactt    14220
gcgttcagcc aaggtctgaa actaggtgcg cacagagcgg taagactgcg agagaaagag    14280
accagctttta caggggggttt atcacagtgc accctgacag tcgtcagcct cacagggggt    14340
ttatcacatt gcaccctgac agtcgtcagc ctcacagggg gtttatcaca gtgcacccctt    14400
acaatcattc catttgattc acaatttttt tagtctctac tgtgcctaac ttgtaagtta    14460
aatttgatca gaggtgtgtt cccagagggg aaaacagtat atacagggtt cagtactatc    14520
gcatttcagg cctccacctg ggtcttggaa tgtgtccccc gaggggtgat gactacctca    14580
gttggatctc cacaggtcac agtgacacaa gataaccaag acacctccca aggctaccac    14640
aatgggccgc cctccacgtg cacatggccg gaggaactgc catgtcggag gtgcaagcac    14700
acctgcgcat cagagtcctt ggtgtggagg gagggaccag cgcagcttcc agccatccac    14760
ctgatgaaca gaacctaggg aaagcccag ttctacttac accaggaaag gc             14812
```

<210> SEQ ID NO 7

```
<211> LENGTH: 14872
<212> TYPE: DNA
<213> ORGANISM: Human immunodeficiency virus type 1

<400> SEQUENCE: 7
tggaagggct aatttggtcc caaaaaagac aagagatcct tgatctgtgg atctaccaca      60
cacaaggcta cttccctgat tggcagaact acacaccagg gccagggatc agatatccac     120
tgacctttgg atggtgcttc aagttagtac cagttgaacc agagcaagta gaagaggcca     180
aataaggaga gaagaacagc ttgttacacc ctatgagcca gcatgggatg gaggacccgg     240
agggagaagt attagtgtgg aagtttgaca gcctcctagc atttcgtcac atggcccgag     300
agctgcatcc ggagtactac aaagactgct gacatcgagc tttctacaag ggactttccg     360
ctggggactt tccagggagg tgtggcctgg gcgggactgg ggagtggcga gccctcagat     420
gctacatata agcagctgct ttttgcctgt actgggtctc tctggttaga ccagatctga     480
gcctgggagc tctctggcta actagggaac ccactgctta agcctcaata agcttgcct      540
tgagtgctca aagtagtgtg tgcccgtctg ttgtgtgact ctggtaacta gagatccctc     600
agaccccttt agtcagtgtg aaaatctct agcagtggcg cccgaacagg gacttgaaag      660
cgaaagtaaa gccagaggag atctctcgac gcaggactcg gcttgctgaa gcgcgcacgg     720
caagaggcga gggcggcga ctggtgagta cgccaaaaat tttgactagc ggaggctaga      780
aggagagaga tgggtgcgag agcgtcggta ttaagcgggg gagaattaga taaatgggaa     840
aaaattcggt taaggccagg gggaaagaaa caatataaac taaaacatat agtatgggca     900
agcagggagc tagaacgatt cgcagttaat cctggccttt tagagacatc agaaggctgt     960
agacaaatac tgggacagct acaaccatcc cttcagacag gatcagaaga acttagatca    1020
ttatataata caatagcagt cctctattgt gtgcatcaaa ggatagatgt aaaagacacc    1080
aaggaagcct tagataagat agaggaagag caaacaaaa gtaagaaaaa ggcacagcaa     1140
gcagcagctg acacaggaaa caacagccag gtcagccaaa attaccctat agtgcagaac    1200
ctccagggc aaatggtaca tcaggccata tcacctagaa ctttaaatgc atgggtaaaa     1260
gtagtagaag agaaggcttt cagcccagaa gtaataccca tgttttcagc attatcagaa    1320
ggagccaccc cacaagattt aaataccatg ctaaacacag tgggggggaca tcaagcagcc    1380
atgcaaatgt taaaagagac catcaatgag gaagctgcag aatgggatag attgcatcca    1440
gtgcatgcag ggcctattgc accaggccag atgagagaac caaggggaag tgacatagca    1500
ggaactacta gtaccttca ggaacaaata ggatggatga cacataatcc acctatccca     1560
gtaggagaaa tctataaaag atggataatc ctgggattaa ataaaatagt aagaatgtat    1620
agccctacca gcattctgga cataagacaa ggaccaaagg aaccctttag agactatgta    1680
gaccgattct ataaaactct aagagccgag caagcttcac aagaggtaaa aaattggatg    1740
acagaaacct tgttggtcca aaatgcgaac ccagattgta agactatttt aaaagcattg    1800
ggaccaggag cgacactaga agaaatgatg acagcatgtc agggagtggg gggacccggc    1860
cataaagcaa gagttttggc tgaagcaatg agccaagtaa caaatccagc taccataatg    1920
atacagaaag gcaattttag gaaccaaaga aagactgtta agtgtttcaa ttgtggcaaa    1980
gaagggcaca tagccaaaaa ttgcagggcc cctaggaaaa agggctgttg gaaatgtgga    2040
aaggaaggac accaaatgaa agattgtact gagagacagg ctaattttt agggaagatc     2100
tggccttccc acaagggaag gccagggaat tttcttcaga gcagaccaga gccaacagcc    2160
ccaccagaag agagcttcag gtttggggaa gagacaacaa ctccctctca gaagcaggag    2220
```

-continued

```
ccgatagaca aggaactgta tcctttagct tccctcagat cactctttgg cagcgacccc   2280
tcgtcacaat aaagataggg gggcaattaa aggaagctct attagataca ggagcagatg   2340
atacagtatt agaagaaatg aatttgccag gaagatggaa accaaaaatg atagggggaa   2400
ttggaggttt tatcaaagta ggacagtatg atcagatact catagaaatc tgcggacata   2460
aagctatagg tacagtatta gtaggaccta cacctgtcaa cataattgga agaaatctgt   2520
tgactcagat tggctgcact ttaaattttc ccattagtcc tattgagact gtaccagtaa   2580
aattaaagcc aggaatggat ggcccaaaag ttaaacaatg gccattgaca agagaaaaaa   2640
taaaagcatt agtagaaatt tgtacagaaa tggaaaagga aggaaaaatt tcaaaaattg   2700
ggcctgaaaa tccatacaat actccagtat ttgccataaa gaaaaagac agtactaaat   2760 ggagaaaatt agtagatttc agagaactta ataagagaac tcaagatttc tgggaagttc   2820
aattaggaat accacatcct gcagggttaa acagaaaaaa atcagtaaca gtactggatg   2880
tgggcgatgc atatttttca gttcccttag ataaagactt caggaagtat actgcattta   2940
ccatacctag tataaacaat gagacaccag ggattagata tcagtacaat gtgcttccac   3000
agggatggaa aggatcacca gcaatattcc agtgtagcat gacaaaaatc ttagagcctt   3060
ttagaaaaca aaatccagac atagtcatct atcaatacat ggatgatttg tatgtaggat   3120
ctgacttaga aatagggcag catagaacaa aaatagagga actgagacaa catctgttga   3180
ggtggggatt taccacacca gacaaaaaac atcagaaaga acctccattc ctttggatgg   3240
gttatgaact ccatcctgat aaatggacag tacagcctat agtgctgcca gaaaaggaca   3300
gctggactgt caatgacata cagaaattag tgggaaaatt gaattgggca agtcagattt   3360
atgcagggat taaagtaagg caattatgta aacttcttag gggaaccaaa gcactaacag   3420
aagtagtacc actaacagaa gaagcagagc tagaactggc agaaaacagg gagattctaa   3480
aagaaccggt acatggagtg tattatgacc catcaaaaga cttaatagca gaaatacaga   3540
agcaggggca aggccaatgg acatatcaaa tttatcaaga gccatttaaa aatctgaaaa   3600
caggaaaata tgcaagaatg aagggtgccc acactaatga tgtgaaacaa ttaacagagg   3660
cagtacaaaa aatagccaca gaaagcatag taatatgggg aaagactcct aaatttaaat   3720
tacccataca aaaggaaaca tgggaagcat ggtggacaga gtattggcaa gccacctgga   3780
ttcctgagtg ggagtttgtc aatacccctc ccttagtgaa gttatggtac cagttagaga   3840
aagaacccat aataggagca gaaactttct atgtagatgg ggcagccaat agggaaacta   3900
aattaggaaa agcaggatat gtaactgaca gaggaagaca aaaagttgtc cccctaacgg   3960
acacaacaaa tcagaagact gagttacaag caattcatct agctttgcag gattcgggat   4020
tagaagtaaa catagtgaca gactcacaat atgcattggg aatcattcaa gcacaaccag   4080
ataagagtga atcagagtta gtcagtcaaa taatagagca gttaataaaa aaggaaaaag   4140
tctacctggc atgggtacca gcacacaaag gaattggagg aaatgaacaa gtagatgggt   4200
tggtcagtgc tggaatcagg aaagtactat ttttagatgg aatagataag gcccaagaag   4260
aacatgagaa atatcacagt aattggagag caatggctag tgattttaac ctaccacctg   4320
tagtagcaaa agaaatagta gccagctgtg ataaatgtca gctaaaaggg gaagccatgc   4380
atggacaagt agactgtagc ccaggaatat ggcagctaga ttgtacacat ttagaaggaa   4440
aagttatctt ggtagcagtt catgtagcca gtggatatat agaagcagaa gtaattccag   4500
cagagacagg gcaagaaaca gcatacttcc tcttaaaatt agcaggaaga tggccagtaa   4560
```

```
aaacagtaca tacagacaat ggcagcaatt tcaccagtac tacagttaag gccgcctgtt    4620
ggtgggcggg gatcaagcag gaatttggca ttccctacaa tccccaaagt caaggagtaa    4680
tagaatctat gaataaagaa ttaaagaaaa ttataggaca ggtaagagat caggctgaac    4740
atcttaagac agcagtacaa atggcagtat tcatccacaa ttttaaaaga aaaggggga     4800 ttgggggta cagtgcaggg gaaagaatag tagacataat agcaacagac atacaaacta    4860
aagaattaca aaaacaaatt acaaaaattc aaaattttcg ggtttattac agggacagca    4920
gagatccagt ttggaaagga ccagcaaagc tcctctggaa aggtgaaggg gcagtagtaa    4980
tacaagataa tagtgacata aaagtagtgc caagaagaaa agcaaagatc atcagggatt    5040
atggaaaaca gatggcaggt gatgattgtg tggcaagtag acaggatgag gattaacaca    5100
tggaaaagat tagtaaaaca ccatatgtat atttcaagga aagctaagga ctggttttat    5160
agacatcact atgaaagtac taatccaaaa ataagttcag aagtacacat cccactaggg    5220
gatgctaaat tagtaataac aacatattgg ggtctgcata caggagaaag agactggcat    5280
ttgggtcagg gagtctccat agaatggagg aaaaagagat atagcacaca gtagacccct    5340
gacctagcag accaactaat tcatctgcac tattttgatt gttttttcaga atctgctata    5400 agaaatacca tattaggacg tatagttagt cctaggtgtg aatatcaagc aggacataac    5460
aaggtaggat ctctacagta cttggcacta gcagcattaa taaaaccaaa acagataaag    5520
ccacctttgc ctagtgttag gaaactgaca gaggacagat ggaacaagcc ccagaagacc    5580
aagggccaca gagggagcca tacaatgaat ggacactaga gcttttagag gaacttaaga    5640
gtgaagctgt tagacatttt cctaggatat ggctccataa cttaggacaa catatctatg    5700
aaacttacgg ggatacttgg gcaggagtgg aagccataat aagaattctg caacaactgc    5760
tgtttatcca tttcagaatt gggtgtcgac atagcagaat aggcgttact cgacagagga    5820
gagcaagaaa tggagccagt agatcctaga ctagagccct ggaagcatcc aggaagtcag    5880
cctaaaactg cttgtaccaa ttgctattgt aaaaagtgtt gctttcattg ccaagtttgt    5940
ttcatgacaa aagccttagg catctcctat ggcaggaaga agcggagaca gcgacgaaga    6000
gctcatcaga acagtcagac tcatcaagct tctctatcaa agcagtaagt agtacatgta    6060
atgcaaccta taatagtagc aatagtagca ttagtagtag caataataat agcaatagtt    6120
gtgtggtcca tagtaatcat agaatatagg aaaatattaa gacaaagaaa atagacagg    6180 ttaattgata gactaataga aagagcagaa gacagtggca atgagagtga aggagaagta    6240
tcagcacttg tggagatggg ggtggaaatg gggcaccatg ctccttggga tattgatgat    6300
ctgtagtgct acagaaaaat tgtgggtcac cgtctattat ggggtacctg tgtggaaaga    6360
aacaaccacc actctatttt gtgcatcaga tgctaaagca tatgatacag aggtacataa    6420
tgtttgggcc acacatgcct gtgtacccac agaccccaac ccacaagaag tagtattgga    6480
aaatgtaaca gaagatttta acatgtggaa aaataacatg gtagaacaga tgcaggagga    6540
tgtaatcaat ttatgggatc aaagcttaaa gccatgtgta aaattaaccc cactctgtgt    6600
tactttaaat tgcaaagatg tgaatgctac taataccact agtagtagtg agggaatgat    6660
ggagagagga gaaataaaaa actgctcttt caatatcacc aaaagcataa gagataaggt    6720
gcagaaagaa tatgctcttt tttataaact ggatgtagta ccaatagata ataagaataa    6780
taccaaatat aggttaataa gttgtaacac ctcagtcatt acacaagcct gtccaaaggt    6840
atcctttgaa ccaattccca tacattattg tgccccggct ggttttgcga ttctaaagtg    6900
taataataag acattcaatg gaaaggaca atgtaaaaat gtcagcacag tacaatgtac    6960
```

```
acatggaatt aggccagtag tatcaactca actgctgcta aatggcagtc tagcagaaga    7020
aaaggttgta attagatctg acaatttac  ggacaatgct aaaaccataa tagtacagct    7080
gaatgaatct gtaaaaatta attgtacaag gcccagcaac aatacaagaa aaagtataca    7140
tataggacca gggagagcat tttatacaac aggagaaata ataggagata taagacaagc    7200
acattgtaac attagtagag cacaatggaa taacactta  aaacagatag ttgaaaaatt    7260
aagagaacaa tttaataata aaacaatagt ctttactcac tcctcaggag gggatccaga    7320
aattgtaatg cacagttta  attgtggagg ggaattttc  tactgtaatt caacacaact    7380
gtttaatagt acttggaatg atactgaaaa gtcaagtggc actgaaggaa atgacaccat    7440
catactccca tgcagaataa aacaaattat aaacatgtgg caggaagtgg aaaagcaat     7500 gtatgctcct cccattaaag gacaaattag atgttcatca aatattacag gctgctatt     7560 aacaagagat ggtggtaaaa atgagagtga gatcgagatc ttcagacctg gaggaggaga    7620
catgagggac aattggagaa gtgaattata taaatataaa gtagtaaaaa ttgaaccatt    7680
aggagtagca cccaccaagg caaagagaag agtggtgcaa agagaaaaaa gagcagtggg    7740
aataggagct ttgttccttg ggttcttggg agcagcagga agcactatgg gcgcagcgtc    7800
aatgacactg acggtacagg ccagacaatt attgtctggt atagtgcaac agcaaaacaa    7860
tttgctgagg gctattgagg cgcaacagca tatgttgcaa ctcacagtct ggggcatcaa    7920
gcagctccag gcaagagtcc tggctgtgga agataccta  aaggatcaac agctcatggg    7980
gatttggggt tgctctggaa aactcatttg caccactgct gtgccttgga atactagttg    8040
gagtaataaa tctctggata gtatttggaa taacatgacc tggatggagt gggaaaaaga    8100
aattgagaat tacacaaaca caatatacac cctaattgaa gaatcgcaga tccaacaaga    8160
aaagaatgaa caagaattat tggaattaga taatgggca  agtttgtgga attggtttgg    8220
cataacaaaa tggctgtggt atataaaaat attcataatg atagtaggag gcttgatagg    8280
tttaagaata gttttttctg tactttctat agtgaataga gttaggcagg gatactcacc    8340
cttatcgttt cagaccctcc tcccagcaac gaggggaccc gacaggcccg aaggaatcga    8400
agaagaaggt ggagagagag acagagacag atccggacaa ttagtgaacg gattcttagc    8460
acttatctgg gtcgacctgc ggagcctgtt cctcttcagc taccaccgct tgagagactt    8520
actcttgact gtaacgagga ttgtggaact tctgggacgc aggggggtggg aaatcctgaa    8580 atactggtgg aatctcctac agtattggag tcaggaacta agaatagtg  ctgttagctt    8640 gcttaatgcc acagctatag cagtagctga ggggacagat aggattatag aagtagtaca    8700
aagagtttat agggctattc tccacatacc tacaagaata agacagggct tggaagggc     8760 tttgctataa gcgccgcga  tgggtggcaa gtggtcaaaa agtagtgtga ttggatggcc    8820
tgctgtaagg gaaagaatga gacgagctga gccagcagca gatgggtgg  gagcagtatc    8880 tcgagaccta gaaaaacatg gagcaatcac aagtagcaat acagcagcta acaatgctgc    8940
ttgtgcctgg ctagaagcac aagaggagga agaggtgggt tttccagtca cacctcaggt    9000
acctttaaga ccaatgactt acaaggcagc tgtagatctt agccactttt taaaagaaaa    9060
ggggggactg gaagggctaa ttcactccca agaagacaa  gatatccttg atctgtggat    9120
ctaccacaca caaggctact tccctgattg gcagaactac acaccagggc cagggtcag    9180 atatccactg acctttggat ggtgctacaa gctagtacca gttgagccag ataaggtaga    9240
agaggccaat aaaggagaga acaccagctt gttacaccct gtgagcctgc atggaatgga    9300
```

```
tgaccctgag agagaagtgt tagagtggag gtttgacagc cgcctagcat ttcatcacgt    9360
ggcccgagag ctgcatccgg agtacttcaa gaactgctga catcgagctt gctacaaggg    9420
actttccgct ggggactttc cagggaggcg tggcctgggc gggactgggg agtggcgagc    9480
cctcagatgc tgcatataag cagctgcttt ttgcctgtac tgggtctctc tggttagacc    9540
agatctgagc ctgggagctc tctggctaac tagggaaccc actgcttaag cctcaataaa    9600
gcttgccttg agtgcttcaa gtagtgtgtg cccgtctgtt gtgtgactct ggtaactaga    9660
gatccctcag acccttttag tcagtgtgga aaatctctag caccccccag gaggtagagg    9720
ttgcagtgag ccaagatcgc gccactgcat tccagcctgg gcaagaaaac aagactgtct    9780
aaaataataa taataagtta agggtattaa atatatttat acatggaggt cataaaaata    9840
tatatatttg ggctgggcgc agtggctcac acctgcgccc ggcccttggg gaggccgagg    9900
caggtggatc acctgagttt gggagttcca gaccagcctg accaacatgg agaaacccct    9960
tctctgtgta ttttagtag atttttatttt atgtgtattt tattcacagg tatttctgga    10020
aaactgaaac tgttttcct ctactctgat accacaagaa tcatcagcac agaggaagac    10080
ttctgtgatc aaatgtggtg ggagagggag gttttcacca gcacatgagc agtcagttct    10140
gccgcagact cggcgggtgt ccttcggttc agttccaaca ccgcctgcct ggagagaggt    10200
cagaccacag ggtgagggct cagtccccaa gacataaaca cccaagacat aaacacccaa    10260
caggtccacc ccgcctgctg cccaggcaga gccgattcac caagacggga attaggatag    10320
agaaagagta agtcacacag agccggctgt gcgggagaac ggagttctat tatgactcaa    10380
atcagtctcc ccaagcattc ggggatcaga gttttttaagg ataacttagt gtgtaggggg    10440
ccagtgagtt ggagatgaaa gcgtagggag tcgaaggtgt cctttttgcgc cgagtcagtt    10500 cctgggtggg ggccacaaga tcggatgagc cagtttatca atccgggggt gccagctgat    10560
ccatggagtg cagggtctgc aaaatatctc aagcactgat tgatcttagg ttttacaata    10620
gtgatgttac cccaggaaca atttgggggaa ggtcagaatc ttgtagcctg tagctgcatg    10680
actcctaaac cataatttct tttttgtttt tttttttttta ttttgagac agggtctcac    10740 tctgtcacct aggctggagt gcagtggtgc aatcacagct cactgcagcc tcaacgtcgt    10800
aagctcaagc gatcctccca cctcagcctg cctggtagct gagactacaa gcgacgcccc    10860
agttaatttt tgtatttttg gtagaggcag cgttttgccg tgtggccctg gctggtctcg    10920
aactcctggg ctcaagtgat ccagcctcag cctcccaaag tgctgggaca accggggcca    10980
gtcactgcac ctggccctaa accataattt ctaatctttt ggctaatttg ttagtcctac    11040
aaaggcagtc tagtccccag gcaaaaaggg ggtttgtttc gggaaagggc tgttactgtc    11100 tttgttttcaa actataaaact aagttcctcc taaacttagt tcggcctaca cccaggaatg    11160
aacaaggaga gcttggaggt tagaagcacg atggaattgg ttaggtcaga tctctttcac    11220
tgtctgagtt ataattttgc aatggtggtt caaagactgc ccgcttctga caccagtcgc    11280
tgcattaatg aatcggccaa cgcgcgggga gaggcggttt gcgtattggc gctcttccgc    11340
ttcctcgctc actgactcgc tgcgctcggt cgttcggctg cggcgagcgg tatcagctca    11400
ctcaaaggcg gtaatacggt tatccacaga atcaggggat aacgcaggaa agaacatgtg    11460
agcaaaaggc cagcaaaagg ccaggaaccg taaaaaggcc gcgttgctgg cgttttttcca    11520 taggctccgc cccctgacg agcatcacaa aaatcgacgc tcaagtcaga ggtggcgaaa    11580
cccgacagga ctataaagat accaggcgtt tcccctggaa gctccctcg tgcgctctcc    11640 tgttccgacc ctgccgctta ccggatacct gtccgccttt ctcccttcgg gaagcgtggc    11700
```

```
gctttctcaa tgctcacgct gtaggtatct cagttcggtg taggtcgttc gctccaagct    11760
gggctgtgtg cacgaacccc ccgttcagcc cgaccgctgc gccttatccg gtaactatcg    11820
tcttgagtcc aacccggtaa gacacgactt atcgccactg gcagcagcca ctggtaacag    11880
gattagcaga gcgaggtatg taggcggtgc tacagagttc ttgaagtggt ggcctaacta    11940
cggctacact agaaggacag tatttggtat ctgcgctctg ctgaagccag ttaccttcgg    12000
aaaaagagtt ggtagctctt gatccggcaa acaaaccacc gctggtagcg gtggtttttt    12060
tgtttgcaag cagcagatta cgcgcagaaa aaaggatct caagaagatc ctttgatctt    12120
ttctacgggg tctgacgctc agtggaacga aaactcacgt taagggattt tggtcatgag    12180
attatcaaaa aggatcttca cctagatcct tttaaattaa aaatgaagtt ttaaatcaat    12240
ctaaagtata tatgagtaaa cttggtctga cagttaccaa tgcttaatca gtgaggcacc    12300
tatctcagcg atctgtctat ttcgttcatc catagttgcc tgactccccg tcgtgtagat    12360
aactacgata cgggagggct taccatctgg ccccagtgct gcaatgatac cgcgagaccc    12420
acgctcaccg gctccagatt tatcagcaat aaaccagcca gccggaaggg ccgagcgcag    12480
aagtggtcct gcaactttat ccgcctccat ccagtctatt aattgttgcc gggaagctag    12540
agtaagtagt tcgccagtta atagtttgcg caacgttgtt gccattgcta caggcatcgt    12600
ggtgtcacgc tcgtcgtttg gtatggcttc attcagctcc ggttcccaac gatcaaggcg    12660
agttacatga tcccccatgt tgtgcaaaaa agcggttagc tccttcggtc ctccgatcgt    12720
tgtcagaagt aagttggccg cagtgttatc actcatggtt atggcagcac tgcataattc    12780
tcttactgtc atgccatccg taagatgctt ttctgtgact ggtgagtact caaccaagtc    12840
attctgagaa tagtgtatgc ggcgaccgag ttgctcttgc ccggcgtcaa tacgggataa    12900
taccgcgcca catagcagaa ctttaaaagt gctcatcatt ggaaaacgtt cttcggggcg    12960
aaaactctca aggatcttac cgctgttgag atccagttcg atgtaaccca ctcgtgcacc    13020
caactgatct tcagcatctt ttactttcac cagcgtttct gggtgagcaa aaacaggaag    13080
gcaaaatgcc gcaaaaaagg gaataagggc gacacggaaa tgttgaatac tcatactctt    13140
cctttttcaa tattattgaa gcatttatca gggttattgt ctcatgagcg gatacatatt    13200
tgaatgtatt tagaaaaata aacaaatagg ggttccgcgc acatttcccc gaaaagtgcc    13260
acctgacgtc taagaaacca ttattatcat gacattaacc tataaaaata ggcgtatcac    13320
gaggcccttt cgtcttcaag aactgcctcg cgcgtttcgg tgatgacggt gaaaacctct    13380
gacacatgca gctcccggag acggtcacag cttgtctgta gcggatgccg ggagcagac    13440 aagcccgtca gggcgcgtca gcgggtgttg gcgggtgtcg gggcgcagcc atgacccagt    13500
cacgtagcga tagcggagtg tactggctta actatgcggc atcagagcag attgtactga    13560
gagtgcacca tatgcggtgt gaaataccgc acagatgcgt aaggagaaaa taccgcatca    13620
ggcgccattc gccattcagg ctgcgcaact gttgggaagg gcgatcggtg cgggcctctt    13680
cgctattacg ccaggggagg cagagattgc agtaagctga gatcgcagca ctgcactcca    13740
gcctgggcga cagagtaaga ctctgtctca aaaataaaat aaataaatca atcagatatt    13800
ccaatctttt cctttattta tttatttatt ttctattttg gaaacacagt ccttccttat    13860
tccagaatta cacatatatt ctattttct ttatatgctc cagttttttt tagaccttca    13920
cctgaaatgt gtgtatacaa aatctaggcc agtccagcag agcctaaagg taaaaaataa    13980
aataataaaa aataaataaa atctagctca ctccttcaca tcaaaatgga gatacagctg    14040
```

-continued

| | | | | |
|---|---|---|---|---|
| ttagcattaa | ataccaaata | acccatcttg | tcctcaataa | ttttaagcgc ctctctccac | 14100 |
| cacatctaac | tcctgtcaaa | ggcatgtgcc | ccttccgggc | gctctgctgt gctgccaacc | 14160 |
| aactggcatg | tggactctgc | agggtcccta | actgccaagc | cccacagtgt gccctgaggc | 14220 |
| tgccccttcc | ttctagcggc | tgcccccact | cggctttgct | ttccctagtt tcagttactt | 14280 |
| gcgttcagcc | aaggtctgaa | actaggtgcg | cacagagcgg | taagactgcg agagaaagag | 14340 |
| accagcttta | caggggggttt | atcacagtgc | accctgacag | tcgtcagcct cacaggggggt | 14400 |
| ttatcacatt | gcaccctgac | agtcgtcagc | ctcacagggg | gtttatcaca gtgcacccctt | 14460 |
| acaatcattc | catttgattc | acaatttttt | tagtctctac | tgtgcctaac ttgtaagtta | 14520 |
| aatttgatca | gaggtgtgtt | cccagagggg | aaaacagtat | atacagggtt cagtactatc | 14580 |
| gcatttcagg | cctccacctg | ggtcttggaa | tgtgtccccc | gagggtgat gactacctca | 14640 |
| gttggatctc | cacaggtcac | agtgacacaa | gataaccaag | acacctccca aggctaccac | 14700 |
| aatgggccgc | cctccacgtg | cacatggccg | gaggaactgc | catgtcggag gtgcaagcac | 14760 |
| acctgcgcat | cagagtcctt | ggtgtggagg | gagggaccag | cgcagcttcc agccatccac | 14820 |
| ctgatgaaca | gaacctaggg | aaagccccag | ttctacttac | accaggaaag gc | 14872 |

<210> SEQ ID NO 8
<211> LENGTH: 14976
<212> TYPE: DNA
<213> ORGANISM: Human immunodeficiency virus type 1

<400> SEQUENCE: 8

| | | | | |
|---|---|---|---|---|
| tggaagggct | aatttggtcc | caaaaaagac | aagagatcct | tgatctgtgg atctaccaca | 60 |
| cacaaggcta | cttccctgat | tggcagaact | acacaccagg | ccagggatc agatatccac | 120 |
| tgacctttgg | atggtgcttc | aagttagtac | cagttgaacc | agagcaagta gaagaggcca | 180 |
| aataaggaga | gaagaacagc | ttgttacacc | ctatgagcca | gcatgggatg gaggacccgg | 240 |
| agggagaagt | attagtgtgg | aagtttgaca | gcctcctagc | atttcgtcac atggcccgag | 300 |
| agctgcatcc | ggagtactac | aaagactgct | gacatcgagc | tttctacaag ggactttccg | 360 |
| ctggggactt | tccagggagg | tgtggcctgg | gcgggactgg | ggagtggcga gccctcagat | 420 |
| gctacatata | agcagctgct | ttttgcctgt | actgggtctc | tctggttaga ccagatctga | 480 |
| gcctgggagc | tctctggcta | actagggaac | ccactgctta | agcctcaata agcttgcct | 540 |
| tgagtgctca | agtagtgtg | tgcccgtctg | ttgtgtgact | ctggtaacta gagatccctc | 600 |
| agaccctttt | agtcagtgtg | gaaaatctct | agcagtggcg | cccgaacagg gacttgaaag | 660 |
| cgaaagtaaa | gccagaggag | atctctcgac | gcaggactcg | gcttgctgaa gcgcgcacgg | 720 |
| caagaggcga | ggggcggcga | ctggtgagta | cgccaaaaat | tttgactagc ggaggctaga | 780 |
| aggagagaga | tgggtgcgag | agcgtcggta | ttaagcgggg | gagaattaga taaatgggaa | 840 |
| aaaattcggt | taaggccagg | gggaaagaaa | caatataaac | taaaacatat agtatgggca | 900 |
| agcagggagc | tagaacgatt | cgcagttaat | cctggccttt | tagagacatc agaaggctgt | 960 |
| agacaaatac | tgggacagct | acaaccatcc | cttcagacag | gatcagaaga acttagatca | 1020 |
| ttatataata | caatagcagt | cctctattgt | gtgcatcaaa | ggatagatgt aaaagacacc | 1080 |
| aaggaagcct | tagataagat | agaggaagag | caaaacaaaa | gtaagaaaaa ggcacagcaa | 1140 |
| gcagcagctg | acacaggaaa | caacagccag | gtcagccaaa | attaccctat agtgcagaac | 1200 |
| ctccagggggc | aaatggtaca | tcaggccata | tcacctagaa | ctttaaatgc atgggtaaaa | 1260 |
| gtagtagaag | agaaggcttt | cagcccagaa | gtaatacccca | tgttttcagc attatcagaa | 1320 |

-continued

```
ggagccaccc cacaagattt aaataccatg ctaaacacag tgggggaca tcaagcagcc    1380
atgcaaatgt taaaagagac catcaatgag gaagctgcag aatgggatag attgcatcca    1440
gtgcatgcag ggcctattgc accaggccag atgagagaac caaggggaag tgacatagca    1500
ggaactacta gtaccttca ggaacaaata ggatggatga cacataatcc acctatccca    1560
gtaggagaaa tctataaaag atggataatc ctgggattaa ataaaatagt aagaatgtat    1620
agccctacca gcattctgga cataagacaa ggaccaaagg aacccttag agactatgta    1680
gaccgattct ataaaactct aagagccgag caagcttcac aagaggtaaa aaattggatg    1740
acagaaacct tgttggtcca aaatgcgaac ccagattgta agactatttt aaaagcattg    1800
ggaccaggag cgacactaga agaaatgatg acagcatgtc agggagtggg gggacccggc    1860
cataaagcaa gagttttggc tgaagcaatg agccaagtaa caaatccagc taccataatg    1920
atacagaaag gcaattttag gaaccaaaga aagactgtta agtgtttcaa ttgtggcaaa    1980
gaagggcaca tagccaaaaa ttgcagggcc cctaggaaaa agggctgttg gaaatgtgga    2040
aaggaaggac accaaatgaa agattgtact gagagacagg ctaatttttt agggaagatc    2100
tggccttccc acaagggaag gccagggaat tttcttcaga gcagaccaga gccaacagcc    2160
ccaccagaag agagcttcag gtttggggaa gagacaacaa ctccctctca gaagcaggag    2220
ccgatagaca aggaactgta tcctttagct tccctcagat cactctttgg cagcgacccc    2280
tcgtcacaat aaagataggg gggcaattaa aggaagctct attagataca ggagcagatg    2340
atacagtatt agaagaaatg aatttgccag gaagatggaa accaaaaatg ataggggaa    2400
ttggaggttt tatcaaagta ggacagtatg atcagatact catagaaatc tgcggacata    2460
aagctatagg tacagtatta gtaggaccta cacctgtcaa cataattgga agaaatctgt    2520
tgactcagat tggctgcact ttaaattttc ccattagtcc tattgagact gtaccagtaa    2580
aattaaagcc aggaatggat ggcccaaaag ttaaacaatg gccattgaca gaagaaaaaa    2640
taaaagcatt agtagaaatt tgtacagaaa tggaaaagga aggaaaaatt tcaaaaattg    2700
ggcctgaaaa tccatacaat actccagtat ttgccataaa gaaaaaagac agtactaaat    2760
ggagaaaatt agtagatttc agagaactta ataagagaac tcaagatttc tgggaagttc    2820
aattaggaat accacatcct gcagggttaa aacagaaaaa atcagtaaca gtactggatg    2880
tgggcgatgc atatttttca gttcccttag ataaagactt caggaagtat actgcattta    2940
ccatacctag tataaacaat gagacaccag ggattagata tcagtacaat gtgcttccac    3000
agggatggaa aggatcacca gcaatattcc agtgtagcat gacaaaaatc ttagagcctt    3060
ttagaaaaca aaatccagac atagtcatct atcaatacat ggatgatttg tatgtaggat    3120
ctgacttaga aatagggcag catagaacaa aaatagagga actgagacaa catctgttga    3180
ggtggggatt taccacacca gacaaaaaac atcagaaaga acctccattc ctttggatgg    3240
gttatgaact ccatcctgat aaatggacag tacagcctat agtgctgcca gaaaaggaca    3300
gctggactgt caatgacata cagaaattag tgggaaaatt gaattgggca agtcagattt    3360
atgcagggat taaagtaagg caattatgta aacttcttag gggaaccaaa gcactaacag    3420
aagtagtacc actaacagaa gaagcagagc tagaactggc agaaaacagg gagattctaa    3480
aagaaccggt acatggagtg tattatgacc catcaaaaga cttaatagca gaaatacaga    3540
agcagggca aggccaatgg acatatcaaa tttatcaaga gccatttaaa aatctgaaaa    3600
caggaaaata tgcaagaatg aagggtgccc acactaatga tgtgaaacaa ttaacagagg    3660
```

```
cagtacaaaa aatagccaca gaaagcatag taatatgggg aaagactcct aaatttaaat    3720
tacccataca aaaggaaaca tgggaagcat ggtggacaga gtattggcaa gccacctgga    3780
ttcctgagtg ggagtttgtc aatacccctc ccttagtgaa gttatggtac cagttagaga    3840
aagaacccat aataggagca gaaacttcct atgtagatgg ggcagccaat agggaaacta    3900
aattaggaaa agcaggatat gtaactgaca gaggaagaca aaaagttgtc cccctaacgg    3960
acacaacaaa tcagaagact gagttacaag caattcatct agctttgcag gattcgggat    4020
tagaagtaaa catagtgaca gactcacaat atgcattggg aatcattcaa gcacaaccag    4080
ataagagtga atcagagtta gtcagtcaaa taatagagca gttaataaaa aaggaaaaag    4140
tctacctggc atgggtacca gcacacaaag gaattggagg aaatgaacaa gtagatgggt    4200
tggtcagtgc tggaatcagg aaagtactat ttttagatgg aatagataag gcccaagaag    4260
aacatgagaa atatcacagt aattggagag caatggctag tgattttaac ctaccacctg    4320
tagtagcaaa agaaatagta gccagctgtg ataaatgtca gctaaaaggg gaagccatgc    4380
atggacaagt agactgtagc ccaggaatat ggcagctaga ttgtacacat ttagaaggaa    4440
aagttatctt ggtagcagtt catgtagcca gtggatatat agaagcagaa gtaattccag    4500
cagagacagg gcaagaaaca gcatacttcc tcttaaaatt agcaggaaga tggccagtaa    4560
aaacagtaca tacagacaat ggcagcaatt tcaccagtac tacagttaag gccgcctgtt    4620
ggtgggcggg gatcaagcag gaatttggca ttccctacaa tccccaaagt caaggagtaa    4680
tagaatctat gaataaagaa ttaaagaaaa ttataggaca ggtaagagat caggctgaac    4740
atcttaagac agcagtacaa atggcagtat tcatccacaa ttttaaaaga aaaggggggg    4800 ttgggggta cagtgcaggg gaaagaatag tagacataat agcaacagac atacaaacta    4860
aagaattaca aaaacaaatt acaaaaattc aaaattttcg ggtttattac agggacagca    4920
gagatccagt ttggaaagga ccagcaaagc tcctctggaa aggtgaaggg gcagtagtaa    4980
tacaagataa tagtgacata aaagtagtgc caagaagaaa agcaaagatc atcagggatt    5040
atggaaaaca gatggcaggt gatgattgtg tggcaagtag acaggatgag gattaacaca    5100
tggaaaagat tagtaaaaca ccatatgtat atttcaagga aagctaagga ctggttttat    5160
agacatcact atgaaagtac taatccaaaa ataagttcag aagtacacat cccactaggg    5220
gatgctaaat tagtaataac aacatattgg ggtctgcata caggagaaag agactggcat    5280
ttgggtcagg gagtctccat agaatggagg aaaaagagat atagcacaca agtagaccct    5340
gacctagcag accaactaat tcatctgcac tattttgatt gttttcaga atctgctata    5400 agaaatacca tattaggacg tatagttagt cctaggtgtg aatatcaagc aggacataac    5460
aaggtaggat ctctacagta cttggcacta gcagcattaa taaaaccaaa acagataaag    5520
ccacctttgc ctagtgttag gaaactgaca gaggacagat ggaacaagcc ccagaagacc    5580
aagggccaca gagggagcca tacaatgaat ggacactaga gcttttagag gaacttaaga    5640
gtgaagctgt tagacatttt cctaggtata ggctccataa cttaggacaa catatctatg    5700
aaacttacgg ggatacttgg gcaggagtgg aagccataat aagaattctg caacaactgc    5760
tgtttatcca tttcagaatt gggtgtcgac atagcagaat aggcgttact cgacagagga    5820
gagcaagaaa tggagccagt agatcctaga ctagagccct ggaagcatcc aggaagtcag    5880
cctaaaactg cttgtaccaa ttgctattgt aaaaagtgtt gctttcattg ccaagtttgt    5940
ttcatgacaa aagccttagg catctcctat ggcaggaaga gcggagaca gcgacgaaga    6000 gctcatcaga acagtcagac tcatcaagct tctctatcaa agcagtaagt agtacatgta    6060
```

```
atgcaaccta taatagtagc aatagtagca ttagtagtag caataataat agcaatagtt   6120
gtgtggtcca tagtaatcat agaatatagg aaaatattaa gacaaagaaa aatagacagg   6180
ttaattgata gactaataga aagagcagaa gacagtggca atgagagtga aggagaagta   6240
tcagcacttg tggagatggg ggtggaaatg gggcaccatg ctccttggga tattgatgat   6300
ctgtagtgct acagaaaaat tgtgggtcac cgtctattat ggggtacctg tgtggaaaga   6360
agcaaccacc actctatttt gtgcatcaga tgctaaagca tatgatacag aggtacataa   6420
tgtttgggcc acacatgcct gtgtacccac agaccccaac ccacaagaag tagtattgga   6480
aaatgtaaca gaacatttta acatgtggaa aaataacatg gtagaacaga tgcaggagga   6540
tataatcagt ttatgggatc aaagcctaaa gccatgtgta aaattaaccc cactctgtgt   6600
tactttaaat tgcaaggatg tgaatgctac taataccact aatgatagcg agggaacgat   6660
ggagagagga gaaataaaaa actgctcttt caatatcacc acaagcataa gagatgaggt   6720
gcagaaagaa tatgctcttt tttataaact tgatgtagta ccaatagata ataataatac   6780
cagctatagg ttgataagtt gtgacacctc agtcattaca caggcctgtc caaagatatc   6840
ctttgagcca attcccatac attattgtgc cccggctggt tttgcgattc taaagtgtaa   6900
tgataagacg ttcaatggaa aaggaccatg taaaaatgtc agcacagtac aatgtacaca   6960
tggaattagg ccagtagtat caactcaact gctgctaaat ggcagtctag cagaagaaga   7020
ggtagtaatt agatctgaca atttcacgaa caatgctaaa accataatag tacagctgaa   7080
agaatctgta gaaattaatt gtacaagacc caacaacaat acaagaaaaa gtatacatat   7140
aggaccaggg agagcatttt atactacagg agaaataata ggagatataa gacaagcaca   7200
ttgtaacatt agtagagcaa aatggaatga cactttaaaa cagatagtta taaaattaag   7260
agaacaattt gagaataaaa caatagtctt taatcactcc tcaggagggg acccagaaat   7320
tgtaatgcac agttttaatt gtggaggaga attttctac tgtaattcaa cacaactgtt   7380
taatagtact tggaataata atactgaagg gtcaaataac actgaaggaa atactatcac   7440
actcccatgc agaataaaac aaattataaa catgtggcag gaagtaggaa agcaatgta   7500 tgcccctccc atcagaggac aaattagatg ttcatcaaat attacagggc tgctattaac   7560
aagagatggt ggtattaatg agaatgggac cgagatcttc agacctggag gaggagatat   7620
gagggacaat tggagaagtg aattatataa atataaagta gtaaaaattg aaccattagg   7680
agtagcaccc accaaggcaa agagaagagt ggtgcaaaga gaaaaaagag cagtgggaat   7740
aggagctgtg ttccttgggt tcttgggagc agcaggaagc actatgggcg cagcgtcaat   7800
gacactgacg gtacaggcca gactattatt gtctggtata gtgcaacagc agaacaattt   7860
gctgagggct attgaggcgc aacagcgtat gttgcaactc acagtctggg gcatcaagca   7920
gctccaggca agagtcctgg ctgtggaaag ataccctaggg gatcaacagc tcctggggat   7980
ttggggttgc tctggaaaac tcatttgcac cactgctgtg ccttggaatg ctagttggag   8040
taataaatct ctggatagga tttggaataa catgacctgg atggagtggg aaagagaaat   8100
tgacaattac acaagcgaaa tatacaccct aattgaagaa tcgcagaacc aacaagaaaa   8160
gaatgaacaa gaattattgg aattagataa atgggcaagt ttgtggaatt ggtttgacat   8220
aacaaaatgg ctgtggtata taaaaatatt cataatgata gtaggaggct tagtaggttt   8280
aagactagtt tttactgtac tttctatagt gaatagagtt aggcagggat actcaccatt   8340
atcgtttcag accctcctcc cagccccgag gggacccgac aggcccgaag gaatcgaaga   8400
```

```
agaaggtgga gagagagaca gagacagatc cggacgatta gtgaacggat tcttagcact    8460
tatctgggtc gacctgcgga gcctgtgcct cttcagctac caccgcttga gagacttact    8520
cttgactgta acgaggattg tggaacttct gggacgcagg gggtgggaag tcctgaaata    8580
ttggtggaat ctcctacagt attggagtca ggaactaaag aatagtgctg ttagcttgct    8640
caatgccaca gccatagcag tagctgaggg gacagatagg attatagaag cattacaaag    8700
aacttataga gctattctcc acatacctac aagaataaga cagggcttgg aaagggcttt    8760
gctataagcg gccgcaatga gcgacccaag agagagaatc ccaccaggca atagcggcga    8820
agaaacaatc ggagaggctt ttgaatggct gaacaggacc gtcgaggaaa tcaaccggga    8880
ggcagtgaat cacctgccta gagaactgat tttccaggtc tggcagcgat cttgggagta    8940
ctggcatgac gaacagggga tgagccagtc ctatgtgaag tacagatatc tgtgcctgat    9000
gcagaaagcc ctgtttatgc actgtaagaa aggctgcagg tgtctgggag agggccatgg    9060
ggccggcggg tggcgccccg gacccccctcc accccctcca cccggcctgg cttgacccgg    9120
gtacctttaa gaccaatgac ttacaaggca gctgtagatc ttagccactt tttaaaagaa    9180
aaggggggac tggaagggct aattcactcc caaagaagac aagatatcct tgatctgtgg    9240
atctaccaca cacaaggcta cttccctgat tggcagaact acacaccagg gccagggtc    9300
agatatccac tgacctttgg atggtgctac aagctagtac cagttgagcc agataaggta    9360
gaagaggcca ataaaggaga gaacaccagc ttgttacacc ctgtgagcct gcatggaatg    9420
gatgaccctg agagagaagt gttacgccta gcatttcatc acgtggcccg agagctgcat    9480
ccggagtact tcaagaactg ctgacatcga gcttgctaca agggactttc cgctggggac    9540
tttccaggga ggcgtggcct gggcgggact ggggagtggc gagccctcag atgctgcata    9600
taagcagctg cttttttgcct gtactgggtc tctctggtta ccagatct gagcctggga    9660
gctctctggc taactaggga acccactgct taagcctcaa taaagcttgc cttgagtgct    9720
tcaagtagtg tgtgcccgtc tgttgtgtga ctctggtaac tagagatccc tcagacccct    9780
ttagtcagtg tggaaaatct ctagcacccc ccaggaggta gaggttgcag tgagccaaga    9840
tcgcgccact gcattccagc ctgggcaaga aaacaagact gtctaaaata ataataataa    9900
gttaagggta ttaaatatat ttatacatgg aggtcataaa aatatatata tttgggctgg    9960
gcgcagtggc tcacacctgc gcccggccct ttgggaggcc gaggcaggtg gatcacctga   10020
gtttgggagt tccagaccag cctgaccaac atggagaaac cccttctctg tgtatttta    10080
gtagatttta ttttatgtgt attttattca caggtatttc tggaaaactg aaactgtttt   10140
tcctctactc tgataccaca agaatcatca gcacagagga agacttctgt gatcaaatgt   10200
ggtgggagag ggaggttttc accagcacat gagcagtcag ttctgccgca gactcggcgg   10260
gtgtccttcg gttcagttcc aacaccgcct gcctggagag aggtcagacc acagggtgag   10320
ggctcagtcc ccaagacata aacacccaag acataaacac caacaggtc caccccgcct   10380
gctgcccagg cagagccgat tcaccaagac gggaattagg atagagaaag agtaagtcac   10440
acagagccgg ctgtgcggga aacggagtt ctattatgac tcaaatcagt ctccccaagc   10500
attcggggat cagagttttt aaggataact tagtgtgtag gggccagtg agttggagat   10560
gaaagcgtag ggagtcgaag gtgtcctttt gcgccgagtc agttcctggg tgggggccac   10620
aagatcggat gagccagttt atcaatccgg gggtgccagc tgatccatgg agtgcagggt   10680
ctgcaaaata tctcaagcac tgattgatct taggttttac aatagtgatg ttaccccagg   10740
aacaatttgg ggaaggtcag aatcttgtag cctgtagctg catgactcct aaaccataat   10800
```

```
ttcttttttg ttttttttttt tttattttttg agacagggtc tcactctgtc acctaggctg    10860
gagtgcagtg gtgcaatcac agctcactgc agcctcaacg tcgtaagctc aagcgatcct    10920
cccacctcag cctgcctggt agctgagact acaagcgacg ccccagttaa tttttgtatt    10980
tttggtagag gcagcgtttt gccgtgtggc cctggctggt ctcgaactcc tgggctcaag    11040
tgatccagcc tcagcctccc aaagtgctgg gacaaccggg gccagtcact gcacctggcc    11100
ctaaaccata atttctaatc ttttggctaa tttgttagtc ctacaaaggc agtctagtcc    11160
ccaggcaaaa aggggggtttg tttcgggaaa gggctgttac tgtctttgtt tcaaactata    11220
aactaagttc ctcctaaact tagttcggcc tacacccagg aatgaacaag agagcttgg     11280 aggttagaag cacgatggaa ttggttaggt cagatctctt tcactgtctg agttataatt    11340
ttgcaatggt ggttcaaaga ctgcccgctt ctgacaccag tcgctgcatt aatgaatcgg    11400
ccaacgcgcg gggagaggcg gtttgcgtat tggcgctctt ccgcttcctc gctcactgac    11460
tcgctgcgct cggtcgttcg gctgcggcga gcggtatcag ctcactcaaa ggcggtaata    11520
cggttatcca cagaatcagg ggataacgca ggaaagaaca tgtgagcaaa aggccagcaa    11580
aaggccagga accgtaaaaa ggccgcgttg ctggcgtttt tccataggct ccgcccccct    11640
gacgagcatc acaaaaatcg acgctcaagt cagaggtggc gaaacccgac aggactataa    11700
agataccagg cgtttccccc tggaagctcc ctcgtgcgct ctcctgttcc gaccctgccg    11760
cttaccggat acctgtccgc ctttctccct tcgggaagcg tggcgctttc tcaatgctca    11820
cgctgtaggt atctcagttc ggtgtaggtc gttcgctcca agctgggctg tgtgcacgaa    11880
ccccccgttc agcccgaccg ctgcgcctta tccggtaact atcgtcttga gtccaacccg    11940
gtaagacacg acttatcgcc actggcagca gccactggta acaggattag cagagcgagg    12000
tatgtaggcg gtgctacaga gttcttgaag tggtggccta actacggcta cactagaagg    12060
acagtatttg gtatctgcgc tctgctgaag ccagttacct tcggaaaaag agttggtagc    12120
tcttgatccg gcaaacaaac caccgctggt agcggtggtt ttttgtttg caagcagcag    12180 attacgcgca gaaaaaaagg atctcaagaa gatcctttga tcttttctac ggggtctgac    12240
gctcagtgga acgaaaactc acgttaaggg attttggtca tgagattatc aaaaaggatc    12300
ttcacctaga tccttttaaa ttaaaaatga agttttaaat caatctaaag tatatatgag    12360
taaacttggt ctgacagtta ccaatgctta atcagtgagg cacctatctc agcgatctgt    12420
ctatttcgtt catccatagt tgcctgactc cccgtcgtgt agataactac gatacgggag    12480
ggcttaccat ctggccccag tgctgcaatg ataccgcgag acccacgctc accggctcca    12540
gatttatcag caataaacca gccagccgga agggccgagc gcagaagtgg tcctgcaact    12600
ttatccgcct ccatccagtc tattaattgt tgccgggaag ctagagtaag tagttcgcca    12660
gttaatagtt tgcgcaacgt tgttgccatt gctacaggca tcgtggtgtc acgctcgtcg    12720
tttggtatgg cttcattcag ctccggttcc caacgatcaa ggcgagttac atgatccccc    12780
atgttgtgca aaaaagcggt tagctccttc ggtcctccga tcgttgtcag aagtaagttg    12840
gccgcagtgt tatcactcat ggttatggca gcactgcata attctcttac tgtcatgcca    12900
tccgtaagat gcttttctgt gactggtgag tactcaacca agtcattctg agaatagtgt    12960
atgcggcgac cgagttgctc ttgcccggcg tcaatacggg ataataccgc gccacatagc    13020
agaactttaa aagtgctcat cattggaaaa cgttcttcgg ggcgaaaact ctcaaggatc    13080
ttaccgctgt tgagatccag ttcgatgtaa cccactcgtg cacccaactg atcttcagca    13140
```

```
tcttttactt tcaccagcgt ttctgggtga gcaaaaacag gaaggcaaaa tgccgcaaaa    13200
aagggaataa gggcgacacg gaaatgttga atactcatac tcttcctttt tcaatattat    13260
tgaagcattt atcagggtta ttgtctcatg agcggataca tatttgaatg tatttagaaa    13320
aataaacaaa tagggggttcc gcgcacattt ccccgaaaag tgccacctga cgtctaagaa    13380
accattatta tcatgacatt aacctataaa aataggcgta tcacgaggcc ctttcgtctt    13440
caagaactgc ctcgcgcgtt tcggtgatga cggtgaaaac ctctgacaca tgcagctccc    13500
ggagacggtc acagcttgtc tgtaagcgga tgccgggagc agacaagccc gtcagggcgc    13560
gtcagcgggt gttggcgggt gtcggggcgc agccatgacc cagtcacgta gcgatagcgg    13620
agtgtactgg cttaactatg cggcatcaga gcagattgta ctgagagtgc accatatgcg    13680
gtgtgaaata ccgcacagat gcgtaaggag aaaataccgc atcaggcgcc attcgccatt    13740
caggctgcgc aactgttggg aagggcgatc ggtgcgggcc tcttcgctat tacgccaggg    13800
gaggcagaga ttgcagtaag ctgagatcgc agcactgcac tccagcctgg gcgacagagt    13860
aagactctgt ctcaaaaata aaataaataa atcaatcaga tattccaatc ttttcctttta   13920 tttatttatt tatttttctat tttgaaaaca cagtccttcc ttattccaga attacacata    13980
tattctattt ttctttatat gctccagttt tttttagacc ttcacctgaa atgtgtgtat    14040
acaaaatcta ggccagtcca gcagagccta aaggtaaaaa ataaaataat aaaaaataaa    14100
taaaatctag ctcactcctt cacatcaaaa tggagataca gctgttagca ttaaatacca    14160
aataacccat cttgtcctca ataattttaa gcgcctctct ccaccacatc taactcctgt    14220
caaaggcatg tgccccttcc gggcgctctg ctgtgctgcc aaccaactgg catgtggact    14280
ctgcagggtc cctaactgcc aagccccaca gtgtgccctg aggctgcccc ttccttctag    14340
cggctgcccc cactcggctt tgctttccct agtttcagtt acttgcgttc agccaaggtc    14400
tgaaactagg tgcgcacaga gcggtaagac tgcgagagaa agagaccagc tttacagggg    14460
gtttatcaca gtgcaccctg acagtcgtca gcctcacagg gggtttatca cattgcaccc    14520
tgacagtcgt cagcctcaca gggggtttat cacagtgcac ccttacaatc attccatttg    14580
attcacaatt ttttttagtct ctactgtgcc taacttgtaa gttaaatttg atcagaggtg   14640
tgttcccaga ggggaaaaca gtatatacag ggttcagtac tatcgcattt caggcctcca    14700
cctgggtctt ggaatgtgtc ccccgagggg tgatgactac ctcagttgga tctccacagg    14760
tcacagtgac acaagataac caagacacct cccaaggcta ccacaatggg ccgccctcca    14820
cgtgcacatg gccggaggaa ctgccatgtc ggaggtgcaa gcacacctgc gcatcagagt    14880
ccttggtgtg gagggaggga ccagcgcagc ttccagccat ccacctgatg aacagaacct    14940
agggaaagcc ccagttctac ttacaccagg aaaggc                              14976
```

<210> SEQ ID NO 9
<211> LENGTH: 14997
<212> TYPE: DNA
<213> ORGANISM: Human immunodeficiency virus type 1

<400> SEQUENCE: 9

```
tggaagggct aatttggtcc caaaaaagac aagagatcct tgatctgtgg atctaccaca     60
cacaaggcta cttccctgat tggcagaact acacaccagg gccagggatc agatatccac    120
tgacctttgg atggtgcttc aagttagtac cagttgaacc agagcaagta gaagaggcca    180
aataaggaga gaagaacagc ttgttacacc ctatgagcca gcatgggatg gaggacccgg    240
agggagaagt attagtgtgg aagtttgaca gcctcctagc atttcgtcac atggcccgag    300
```

```
agctgcatcc ggagtactac aaagactgct gacatcgagc tttctacaag ggactttccg      360
ctggggactt tccagggagg tgtggcctgg gcgggactgg ggagtggcga gccctcagat      420
gctacatata agcagctgct ttttgcctgt actgggtctc tctggttaga ccagatctga      480
gcctgggagc tctctggcta actagggaac ccactgctta agcctcaata aagcttgcct      540
tgagtgctca aagtagtgtg tgcccgtctg ttgtgtgact ctggtaacta gagatccctc      600 agacccttt agtcagtgtg gaaaatctct agcagtggcg cccgaacagg gacttgaaag      660
cgaaagtaaa gccagaggag atctctcgac gcaggactcg gcttgctgaa gcgcgcacgg      720
caagaggcga gggcggcga ctggtgagta cgccaaaaat tttgactagc ggaggctaga      780
aggagagaga tgggtgcgag agcgtcggta ttaagcgggg gagaattaga taaatgggaa      840
aaaattcggt taaggccagg gggaagaaa caatataaac taaaacatat agtatgggca      900
agcagggagc tagaacgatt cgcagttaat cctggccttt tagagacatc agaaggctgt      960
agacaaatac tgggacagct acaaccatcc cttcagacag gatcagaaga acttagatca     1020
ttatataata caatagcagt cctctattgt gtgcatcaaa ggatagatgt aaaagacacc     1080
aaggaagcct tagataagat agaggaagag caaaacaaaa gtaagaaaaa ggcacagcaa     1140
gcagcagctg acacaggaaa caacagccag gtcagccaaa attaccctat agtgcagaac     1200
ctccaggggc aaatggtaca tcaggccata tcacctagaa ctttaaatgc atgggtaaaa     1260
gtagtagaag agaaggcttt cagcccagaa gtaatacca tgttttcagc attatcagaa     1320
ggagccaccc cacaagattt aaataccatg ctaaacacag tggggggaca tcaagcagcc     1380
atgcaaatgt taaaagagac catcaatgag gaagctgcag aatgggatag attgcatcca     1440
gtgcatgcag ggcctattgc accaggccag atgagagaac caaggggaag tgacatagca     1500
ggaactacta gtacccttca ggaacaaata ggatggatga cacataatcc acctatccca     1560
gtaggagaaa tctataaaag atggataatc ctgggattaa ataaaatagt aagaatgtat     1620
agccctacca gcattctgga cataagacaa ggaccaaagg aacccttag agactatgta     1680 gaccgattct ataaaactct aagagccgag caagcttcac aagaggtaaa aaattggatg     1740
acagaaacct tgttggtcca aaatgcgaac ccagattgta agactatttt aaaagcattg     1800
ggaccaggag cgacactaga agaaatgatg acagcatgtc agggagtggg gggacccggc     1860
cataaagcaa gagtttttgc tgaagcaatg agccaagtaa caaatccagc taccataatg     1920
atacagaaag gcaattttag gaaccaaaga aagactgtta agtgtttcaa ttgtggcaaa     1980
gaagggcaca tagccaaaaa ttgcagggcc cctaggaaaa agggctgttg gaaatgtgga     2040
aaggaaggac accaaatgaa agattgtact gagagacagg ctaattttt agggaagatc     2100 tggccttccc acaagggaag gccagggaat tttcttcaga gcagaccaga gccaacagcc     2160
ccaccagaag acccagctgt ggatctgcta gagagcttca ggtttgggga agagacaaca     2220
actccctctc agaagcagga gccgatagac aaggaactgt atcctttagc ttccctcaga     2280
tcactctttg gcagcgaccc ctcgtcacaa taaagatagg ggggcaatta aaggaagctc     2340
tattagatac aggagcagat gatacagtat agaagaaat gaatttgcca ggaagatgga     2400
aaccaaaaat gatagggga attggaggtt ttatcaaagt aagacagtat gatcagatac     2460
tcatagaaat ctgcggacat aaagctatag gtacagtatt agtaggacct acacctgtca     2520
acataattgg aagaaatctg ttgactcaga ttggctgcac tttaaatttt cccattagtc     2580
ctattgagac tgtaccagta aaattaaagc caggaatgga tggcccaaaa gttaaacaat     2640
```

```
ggccattgac agaagaaaaa ataaaagcat tagtagaaat ttgtacagaa atggaaaagg    2700
aaggaaaaat ttcaaaaatt gggcctgaaa atccatacaa tactccagta tttgccataa    2760
agaaaaaaga cagtactaaa tggagaaaat tagtagattt cagagaactt aataagagaa    2820
ctcaagattt ctgggaagtt caattaggaa taccacatcc tgcagggtta aaacagaaaa    2880
aatcagtaac agtactggat gtgggcgatg catattttc agttcccttta gataaagact    2940 tcaggaagta tactgcattt accataccta gtataaacaa tgagacacca gggattagat    3000
atcagtacaa tgtgcttcca cagggatgga aaggatcacc agcaatattc cagtgtagca    3060
tgacaaaaat cttagagcct tttagaaaac aaaatccaga catagtcatc tatcaataca    3120
tggatgattt gtatgtagga tctgacttag aaatagggca gcatagaaca aaaatagagg    3180
aactgagaca acatctgttg aggtggggat ttaccacacc agacaaaaaa catcagaaag    3240
aacctccatt cctttggatg ggttatgaac tccatcctga taaatggaca gtacagccta    3300
tagtgctgcc agaaaaggac agctggactg tcaatgacat acagaaatta gtgggaaaat    3360
tgaattgggc aagtcagatt tatgcaggga ttaaagtaag gcaattatgt aaacttctta    3420
ggggaaccaa agcactaaca gaagtagtac cactaacaga agaagcagag ctagaactgg    3480
cagaaaacag ggagattcta aaagaaccgg tacatggagt gtattatgac ccatcaaaag    3540
acttaatagc agaaatacag aagcaggggc aaggccaatg gacatatcaa atttatcaag    3600
agccatttaa aaatctgaaa acaggaaaat atgcaagaat gaaggtgcc cacactaatg    3660 atgtgaaaca attaacagag gcagtacaaa aaatagccac agaaagcata gtaatatggg    3720
gaaagactcc taaatttaaa ttacccatac aaaaggaaac atgggaagca tggtggacag    3780
agtattggca agccacctgg attcctgagt gggagtttgt caatacccct cccttagtga    3840
agttatggta ccagttagag aaagaaccca ataggagc agaaactttc tatgtagatg    3900
gggcagccaa tagggaaact aaattaggaa aagcaggata tgtaactgac agaggaagac    3960
aaaaagttgt ccccctaacg gacacaacaa atcagaagac tgagttacaa gcaattcatc    4020
tagctttgca ggattcggga ttagaagtaa acatagtgac agactcacaa tatgcattgg    4080
gaatcattca agcacaacca gataagagtg aatcagagtt agtcagtcaa ataatagagc    4140
agttaataaa aaaggaaaaa gtctacctgg catgggtacc agcacacaaa ggaattggag    4200
gaaatgaaca agtagatggg ttggtcagtg ctggaatcag gaaagtacta ttttagatg     4260 gaatagataa ggcccaagaa gaacatgaga atatcacag taattggaga gcaatggcta    4320
gtgattttaa cctaccacct gtagtagcaa aagaaatagt agccagctgt gataaatgtc    4380
agctaaaagg ggaagccatg catggacaag tagactgtag cccaggaata tggcagctag    4440
attgtacaca tttagaagga aaagttatct tggtagcagt tcatgtagcc agtggatata    4500
tagaagcaga agtaattcca gcagagacag ggcaagaaac agcatacttc ctcttaaaat    4560
tagcaggaag atggccagta aaaacagtac atacagacaa tggcagcaat ttcaccagta    4620
ctacagttaa ggccgcctgt tggtgggcgg ggatcaagca ggaatttggc attccctaca    4680
atccccaaag tcaaggagta atagaatcta tgaataaaga attaaagaaa attataggac    4740
aggtaagaga tcaggctgaa catcttaaga cagcagtaca aatggcagta ttcatccaca    4800
attttaaaag aaaagggggg attgggggt acagtgcagg ggaaagaata gtagacataa    4860
tagcaacaga catacaaact aaagaattac aaaaacaaat tacaaaaatt caaaatttc     4920 gggtttatta cagggacagc agagatccag tttggaaagg accagcaaag ctcctctgga    4980
aaggtgaagg ggcagtagta atacaagata atagtgacat aaaagtagtg ccaagaagaa    5040
```

```
aagcaaagat catcagggat tatggaaaac agatggcagg tgatgattgt gtggcaagta    5100
gacaggatga ggattaacac atggaaaaga ttagtaaaac accatatgta tatttcaagg    5160
aaagctaagg actggtttta tagacatcac tatgaaagta ctaatccaaa aataagttca    5220
gaagtacaca tcccactagg ggatgctaaa ttagtaataa caacatattg gggtctgcat    5280
acaggagaaa gagactggca tttgggtcag ggagtctcca tagaatggag gaaaagaga    5340 tatagcacac aagtagaccc tgacctagca gaccaactaa ttcatctgca ctattttgat    5400 tgttttcag aatctgctat aagaaatacc atattaggac gtatagttag tcctaggtgt    5460
gaatatcaag caggacataa caaggtagga tctctacagt acttggcact agcagcatta    5520
ataaaaccaa aacagataaa gccacctttg cctagtgtta ggaaactgac agaggacaga    5580
tggaacaagc cccagaagac caagggccac agagggagcc atacaatgaa tggacactag    5640 agctttaga ggaacttaag agtgaagctg ttagacattt tcctaggata tggctccata    5700
acttaggaca acatatctat gaaacttacg gggatacttg gcaggagtg gaagccataa    5760 taagaattct gcaacaactg ctgtttatcc atttcagaat tgggtgtcga catagcagaa    5820
taggcgttac tcgacagagg agagcaagaa atggagccag tagatcctag actagagccc    5880
tggaagcatc caggaagtca gcctaaaact gcttgtacca attgctattg taaaaagtgt    5940
tgctttcatt gccaagtttg tttcatgaca aaagccttag gcatctccta tggcaggaag    6000
aagcggagac agcgacgaag agctcatcag aacagtcaga ctcatcaagc ttctctatca    6060
aagcagtaag tagtacatgt aatgcaacct ataatagtag caatagtagc attagtagta    6120
gcaataataa tagcaatagt tgtgtggtcc atagtaatca tagaatatag gaaaatatta    6180
agacaaagaa aaatagacag gttaattgat agactaatag aaagagcaga agacagtggc    6240
aatgagagtg aaggagaagt atcagcactt gtggagatgg gggtggaaat ggggcaccat    6300
gctccttggg atattgatga tctgtagtgc tacagaaaaa ttgtgggtca ccgtctatta    6360
tggggtacct gtgtggaaag aagcaaccac cactctattt tgtgcatcag atgctaaagc    6420
atatgataca gaggtacata atgtttgggc cacacatgcc tgtgtaccca cagaccccaa    6480
cccacaagaa gtagtattgg aaaatgtaac agaacatttt aacatgtgga aaataacat    6540 ggtagaacag atgcaggagg atataatcag tttatgggat caaagcctaa agccatgtgt    6600
aaaattaacc ccactctgtg ttactttaaa ttgcaaggat gtgaatgcta ctaataccac    6660
taatgatagc gagggaacga tggagagagg agaaataaaa aactgctctt tcaatatcac    6720
cacaagcata agagatgagg tgcagaaaga atatgctctt ttttataaac ttgatgtagt    6780
accaatagat aataataata ccagctatag gttgataagt tgtgacacct cagtcattac    6840
acaggcctgt ccaaagatat cctttgagcc aattcccata cattattgtg ccccggctgg    6900
ttttgcgatt ctaaagtgta atgataagac gttcaatgga aaaggaccat gtaaaatgt    6960 cagcacagta caatgtacac atggaattag gccagtagta tcaactcaac tgctgctaaa    7020
tggcagtcta gcagaagaag aggtagtaat tagatctgac aatttcacga acaatgctaa    7080
aaccataata gtacagctga agaatctgt agaaattaat tgtacaagac ccaacaacaa    7140
tacaagaaaa agtatacata taggaccagg gagagcattt tatactacag agaaataat    7200 aggagatata agacaagcac attgtaacat tagtagagca aaatggaatg cactttaaa    7260 acagatagtt ataaaattaa gagaacaatt tgagaataaa acaatagtct ttaatcactc    7320
ctcaggaggg gacccagaaa ttgtaatgca cagttttaat tgtggaggag aattttctc    7380
```

```
ctgtaattca acacaactgt ttaatagtac ttggaataat aatactgaag ggtcaaataa    7440
cactgaagga aatactatca cactcccatg cagaataaaa caaattataa acatgtggca    7500
ggaagtagga aaagcaatgt atgcccctcc catcagagga caaattagat gttcatcaaa    7560
tattacaggg ctgctattaa caagagatgg tggtattaat gagaatggga ccgagatctt    7620
cagacctgga ggaggagata tgagggacaa ttggagaagt gaattatata aatataaagt    7680
agtaaaaatt gaaccattag gagtagcacc caccaaggca aagagaagag tggtgcaaag    7740
agaaaaaaga gcagtgggaa taggagctgt gttccttggg ttcttgggag cagcaggaag    7800
cactatgggc gcagcgtcaa tgacactgac ggtacaggcc agactattat tgtctggtat    7860
agtgcaacag cagaacaatt tgctgagggc tattgaggcg caacagcgta tgttgcaact    7920
cacagtctgg ggcatcaagc agctccaggc aagagtcctg gctgtggaaa gatacctagg    7980
ggatcaacag ctcctgggga tttggggttg ctctggaaaa ctcatttgca ccactgctgt    8040
gccttggaat gctagttgga gtaataaatc tctggatagg atttggaata acatgacctg    8100
gatggagtgg gaaagagaaa ttgacaatta cacaagcgaa atatacaccc taattgaaga    8160
atcgcagaac caacaagaaa agaatgaaca agaattattg gaattagata atgggcaag    8220 tttgtggaat tggtttgaca taacaaaatg gctgtggtat ataaaaatat tcataatgat    8280
agtaggaggc ttagtaggtt taagactagt ttttactgta cttttctatag tgaatagagt    8340 taggcaggga tactcaccat tatcgtttca gaccctcctc ccagccccga ggggacccga    8400
caggcccgaa ggaatcgaag aagaaggtgg agagagagac agagacagat ccggacgatt    8460
agtgaacgga ttcttagcac ttatctgggt cgacctgcgg agcctgtgcc tcttcagcta    8520
ccaccgcttg agagacttac tcttgactgt aacgaggatt gtggaacttc tgggacgcag    8580
ggggtgggaa gtcctgaaat attggtggaa tctcctacag tattggagtc aggaactaaa    8640
gaatagtgct gttagcttgc tcaatgccac agccatagca gtagctgagg ggacagatag    8700
gattatagaa gcattacaaa gaacttatag agctattctc cacatacctac aagaataag    8760 acagggcttg gaaagggctt tgctataagc ggccgcaatg agcgacccaa gagagagaat    8820
cccaccaggc aatagcggcg aagaaacaat cggagaggct tttgaatggc tgaacaggac    8880
cgtcgaggaa atcaaccggg aggcagtgaa tcacctgcct agagaactga ttttccaggt    8940
ctggcagcga tcttgggagt actggcatga cgaacagggg atgagccagt cctatgtgaa    9000
gtacagatat ctgtgcctga tgcagaaagc cctgtttatg cactgtaaga aaggctgcag    9060
gtgtctggga gagggccatg gggccggcgg gtggcgcccc ggaccccctc caccccctcc    9120
acccggcctg gcttgacccg ggtacctttta agaccaatga cttacaaggc agctgtagat    9180
cttagccact ttttaaaaga aaggggggga ctggaagggc taattcactc ccaaagaaga    9240
caagatatcc ttgatctgtg gatctaccac acacaaggct acttccctga ttggcagaac    9300
tacacaccag ggccagggt cagatatcca ctgacctttg gatggtgcta caagctagta    9360
ccagttgagc cagataaggt agaagaggcc aataaaggag agaacaccag cttgttacac    9420
cctgtgagcc tgcatggaat ggatgaccct gagagagaag tgttacgcct agcatttcat    9480
cacgtggccc gagagctgca tccggagtac ttcaagaact gctgacatcg agcttgctac    9540
aagggacttt ccgctgggga cttccaggg aggcgtggcc tgggcgggac tggggagtgg    9600
cgagccctca gatgctgcat ataagcagct gcttttttgcc tgtactgggt ctctctggtt    9660
agaccagatc tgagcctggg agctctctgg ctaactaggg aacccactgc ttaagcctca    9720
ataaagcttg ccttgagtgc ttcaagtagt gtgtgcccgt ctgttgtgtg actctggtaa    9780
```

```
ctagagatcc ctcagaccct tttagtcagt gtggaaaatc tctagcaccc cccaggaggt      9840
agaggttgca gtgagccaag atcgcgccac tgcattccag cctgggcaag aaaacaagac      9900
tgtctaaaat aataataata agttaagggt attaaatata tttatacatg gaggtcataa      9960
aaatatatat atttgggctg gcgcagtgg ctcacacctg cgcccggccc tttgggaggc      10020
cgaggcaggt ggatcacctg agtttgggag ttccagacca gcctgaccaa catggagaaa      10080
ccccttctct gtgtattttt agtagatttt attttatgtg tattttattc acaggtattt      10140
ctggaaaact gaaactgttt ttcctctact ctgataccac aagaatcatc agcacagagg      10200
aagacttctg tgatcaaatg tggtgggaga gggaggtttt caccagcaca tgagcagtca      10260
gttctgccgc agactcggcg ggtgtccttc ggttcagttc aacaccgcc tgcctggaga       10320 gaggtcagac cacagggtga gggctcagtc cccaagacat aaacacccaa gacataaaca      10380
cccaacaggt ccaccccgcc tgctgcccag gcagagccga ttcaccaaga cgggaattag      10440
gatagagaaa gagtaagtca cacagagccg gctgtgcggg agaacggagt tctattatga      10500
ctcaaatcag tctccccaag cattcgggga tcagagtttt taaggataac ttagtgtgta      10560
gggggccagt gagttggaga tgaaagcgta gggagtcgaa ggtgtccttt tgcgccgagt      10620
cagttcctgg gtgggggcca caagatcgga tgagccagtt tatcaatccg ggggtgccag      10680
ctgatccatg gagtgcaggg tctgcaaaat atctcaagca ctgattgatc ttaggtttta      10740
caatagtgat gttaccccag gaacaatttg gggaaggtca gaatcttgta gcctgtagct      10800
gcatgactcc taaaccataa tttctttttt gttttttttt ttttatttt gagacagggt       10860 ctcactctgt cacctaggct ggagtgcagt ggtgcaatca cagctcactg cagcctcaac      10920
gtcgtaagct caagcgatcc tcccacctca gcctgcctgg tagctgagac tacaagcgac      10980
gccccagtta atttttgtat ttttggtaga ggcagcgttt tgccgtgtgg ccctggctgg      11040
tctcgaactc ctgggctcaa gtgatccagc ctcagcctcc caaagtgctg gacaaccgg       11100 ggccagtcac tgcacctggc cctaaaccat aatttctaat cttttggcta atttgttagt      11160
cctacaaagg cagtctagtc cccaggcaaa aaggggggttt gtttcgggaa agggctgtta    11220
ctgtctttgt ttcaaactat aaactaagtt cctcctaaac ttagttcggc ctacacccag     11280
gaatgaacaa ggagagcttg gaggttagaa gcacgatgga attggttagg tcagatctct     11340
ttcactgtct gagttataat tttgcaatgg tggttcaaag actgcccgct tctgacacca    11400
gtcgctgcat taatgaatcg gccaacgcgc ggggagaggc ggtttgcgta ttggcgctct    11460
tccgcttcct cgctcactga ctcgctgcgc tcggtcgttc ggctgcggcg agcggtatca    11520
gctcactcaa aggcggtaat acggttatcc acagaatcag gggataacgc aggaaagaac    11580
atgtgagcaa aaggccagca aaaggccagg aaccgtaaaa aggccgcgtt gctggcgttt    11640
ttccataggc tccgccccc tgacgagcat cacaaaaatc gacgctcaag tcagaggtgg    11700
cgaaacccga caggactata aagataccag gcgtttcccc ctggaagctc cctcgtgcgc    11760
tctcctgttc cgaccctgcc gcttaccgga tacctgtccg cctttctccc ttcgggaagc    11820
gtggcgcttt ctcaatgctc acgctgtagg tatctcagtt cggtgtaggt cgttcgctcc    11880
aagctgggct gtgtgcacga accccccgtt cagcccgacc gctgcgcctt atccggtaac    11940
tatcgtcttg agtccaaccc ggtaagacac gacttatcgc cactggcagc agccactggt    12000
aacaggatta gcagagcgag gtatgtaggc ggtgctacag agttcttgaa gtggtggcct    12060
aactacggct acactagaag gacagtattt ggtatctgcg ctctgctgaa gccagttacc    12120
```

```
ttcggaaaaa gagttggtag ctcttgatcc ggcaaacaaa ccaccgctgg tagcggtggt    12180
ttttttgttt gcaagcagca gattacgcgc agaaaaaaag gatctcaaga agatcctttg    12240
atcttttcta cggggtctga cgctcagtgg aacgaaaact cacgttaagg gattttggtc    12300
atgagattat caaaaaggat cttcacctag atccttttaa attaaaaatg aagttttaaa    12360
tcaatctaaa gtatatatga gtaaacttgg tctgacagtt accaatgctt aatcagtgag    12420
gcacctatct cagcgatctg tctatttcgt tcatccatag ttgcctgact ccccgtcgtg    12480
tagataacta cgatacggga gggcttacca tctggcccca gtgctgcaat gataccgcga    12540
gacccacgct caccggctcc agatttatca gcaataaacc agccagccgg aagggccgag    12600
cgcagaagtg gtcctgcaac tttatccgcc tccatccagt ctattaattg ttgccgggaa    12660
gctagagtaa gtagttcgcc agttaatagt ttgcgcaacg ttgttgccat tgctacaggc    12720
atcgtggtgt cacgctcgtc gtttggtatg gcttcattca gctccggttc ccaacgatca    12780
aggcgagtta catgatcccc catgttgtgc aaaaaagcgg ttagctcctt cggtcctccg    12840
atcgttgtca gaagtaagtt ggccgcagtg ttatcactca tggttatggc agcactgcat    12900
aattctctta ctgtcatgcc atccgtaaga tgcttttctg tgactggtga gtactcaacc    12960
aagtcattct gagaatagtg tatgcggcga ccgagttgct cttgcccggc gtcaatacgg    13020
gataataccg cgccacatag cagaacttta aaagtgctca tcattggaaa acgttcttcg    13080
gggcgaaaac tctcaaggat cttaccgctg ttgagatcca gttcgatgta acccactcgt    13140
gcacccaact gatcttcagc atcttttact ttcaccagcg tttctgggtg agcaaaaaca    13200
ggaaggcaaa atgccgcaaa aaagggaata agggcgacac ggaaatgttg aatactcata    13260
ctcttccttt ttcaatatta ttgaagcatt tatcagggtt attgtctcat gagcggatac    13320
atatttgaat gtatttagaa aaataaacaa ataggggttc cgcgcacatt tccccgaaaa    13380
gtgccacctg acgtctaaga aaccattatt atcatgacat taacctataa aaataggcgt    13440
atcacgaggc cctttcgtct tcaagaactg cctcgcgcgt ttcggtgatg acggtgaaaa    13500
cctctgacac atgcagctcc cggagacggt cacagcttgt ctgtaagcgg atgccgggag    13560
cagacaagcc cgtcagggcg cgtcagcggg tgttggcggg tgtcggggcg cagccatgac    13620
ccagtcacgt agcgatagcg gagtgtactg gcttaactat gcggcatcag agcagattgt    13680
actgagagtg caccatatgc ggtgtgaaat accgcacaga tgcgtaagga gaaaataccg    13740
catcaggcgc cattcgccat tcaggctgcg caactgttgg gaagggcgat cggtgcgggc    13800
ctcttcgcta ttacgccagg ggaggcagag attgcagtaa gctgagatcg cagcactgca    13860
ctccagcctg ggcgacagag taagactctg tctcaaaaat aaaataaata aatcaatcag    13920
atattccaat cttttccttt atttatttat ttattttcta ttttggaaac acagtccttc    13980
cttattccag aattacacat atattctatt tttctttata tgctccagtt tttttttagac    14040 cttcacctga aatgtgtgta tacaaaatct aggccagtcc agcagagcct aaaggtaaaa    14100
aataaaataa taaaaaataa ataaaatcta gctcactcct tcacatcaaa atggagatac    14160
agctgttagc attaaatacc aaataaccca tcttgtcctc aataattttta agcgcctctc    14220 tccaccacat ctaactcctg tcaaaggcat gtgcccttc cgggcgctct gctgtgctgc    14280
caaccaactg gcatgtggac tctgcagggt ccctaactgc caagcccccac agtgtgccct    14340 gaggctgccc cttccttcta gcggctgccc ccactcggct ttgctttccc tagtttcagt    14400
tacttgcgtt cagccaaggt ctgaaactag gtgcgcacag agcggtaaga ctgcgagaga    14460
aagagaccag cttttacaggg ggtttatcac agtgcaccct gacagtcgtc agcctcacag    14520
```

```
ggggtttatc acattgcacc ctgacagtcg tcagcctcac aggggggttta tcacagtgca    14580 cccttacaat cattccattt gattcacaat tttttagtc tctactgtgc ctaacttgta    14640
agttaaattt gatcagaggt gtgttcccag aggggaaaac agtatataca gggttcagta    14700
ctatcgcatt tcaggcctcc acctgggtct tggaatgtgt cccccgaggg gtgatgacta    14760
cctcagttgg atctccacag gtcacagtga cacaagataa ccaagacacc tcccaaggct    14820
accacaatgg gccgccctcc acgtgcacat ggccggagga actgccatgt cggaggtgca    14880
agcacacctg cgcatcagag tccttggtgt ggagggaggg accagcgcag cttccagcca    14940
tccacctgat gaacagaacc tagggaaagc cccagttcta cttacaccag gaaaggc      14997

<210> SEQ ID NO 10
<211> LENGTH: 15357
<212> TYPE: DNA
<213> ORGANISM: Human immunodeficiency virus type 1

<400> SEQUENCE: 10
tggaagggct aatttggtcc caaaaaagac aagagatcct tgatctgtgg atctaccaca      60
cacaaggcta cttccctgat ggcagaact acacaccagg gccagggatc agatatccac     120
tgacctttgg atggtgcttc aagttagtac cagttgaacc agagcaagta gaagaggcca     180
aataaggaga agaacagc ttgttacacc ctatgagcca gcatgggatg gaggacccgg     240
agggagaagt attagtgtgg aagtttgaca gcctcctagc atttcgtcac atggcccgag     300
agctgcatcc ggagtactac aaagactgct gacatcgagc tttctacaag ggactttccg     360
ctggggactt tccagggagg tgtggcctgg gcgggactgg ggagtggcga gccctcagat     420
gctacatata agcagctgct ttttgcctgt actgggtctc tctggttaga ccagatctga     480
gcctgggagc tctctggcta actagggaac ccactgctta agcctcaata aagcttgcct     540
tgagtgctca agtagtgtg tgcccgtctg ttgtgtgact ctggtaacta gagatccctc     600
agaccctttt agtcagtgtg gaaaatctct agcagtggcg cccgaacagg gacttgaaag     660
cgaaagtaaa gccagaggag atctctcgac gcaggactcg gcttgctgaa gcgcgcacgg     720
caagaggcga ggggcggcga ctggtgagta cgccaaaaat tttgactagc ggaggctaga     780
aggagagaga tgggtgcgag agcgtcggta ttaagcgggg gagaattaga taaatgggaa     840
aaaattcggt taaggccagg gggaaagaaa caatataaac taaaacatat agtatgggca     900
agcagggagc tagaacgatt cgcagttaat cctggccttt tagagacatc agaaggctgt     960
agacaaatac tgggacagct acaaccatcc cttcagacag gatcagaaga acttagatca    1020
ttatataata caatagcagt cctctattgt gtgcatcaaa ggatagatgt aaaagacacc    1080
aaggaagcct tagataagat agaggaagag caaaacaaaa gtaagaaaaa ggcacagcaa    1140
gcagcagctg acacaggaaa caacagccag gtcagccaaa attaccctat agtgcagaac    1200
ctccaggggc aaatggtaca tcaggccata tcacctagac ctttaaatgc atgggtaaaa    1260
gtagtagaag agaaggcttt cagcccagaa gtaatacccca tgttttcagc attatcagaa    1320
ggagccaccc cacaagattt aaataccatg ctaaacacag tgggggggaca tcaagcagcc    1380 atgcaaatgt taaaagagac catcaatgag gaagctgcag aatgggatag attgcatcca    1440
gtgcatgcag ggcctattgc accaggccag atgagagaac caagggggaag tgacatagca    1500 ggaactacta gtacccttca ggaacaaata ggatggatga cacataatcc acctatccca    1560
gtaggagaaa tctataaaag atggataatc ctgggattaa ataaaatagt aagaatgtat    1620
```

-continued

```
agccctacca gcattctgga cataagacaa ggaccaaagg aacccttag agactatgta    1680
gaccgattct ataaaactct aagagccgag caagcttcac aagaggtaaa aaattggatg    1740
acagaaacct tgttggtcca aaatgcgaac ccagattgta agactatttt aaaagcattg    1800
ggaccaggag cgacactaga agaaatgatg acagcatgtc agggagtggg gggacccggc    1860
cataaagcaa gagttttggc tgaagcaatg agccaagtaa caaatccagc taccataatg    1920
atacagaaag gcaattttag gaaccaaaga aagactgtta agtgtttcaa ttgtggcaaa    1980
gaagggcaca tagccaaaaa ttgcagggcc cctaggaaaa agggctgttg gaaatgtgga    2040
aaggaaggac accaaatgaa agattgtact gagagacagg ctaattttt agggaagatc    2100
tggccttccc acaagggaag gccagggaat tttcttcaga gcagaccaga gccaacagcc    2160
ccaccagaag agagcttcag gtttggggaa gagacaacaa ctccctctca gaagcaggag    2220
ccgatagaca aggaactgta tcctttagct tccctcagat cactctttgg cagcgacccc    2280
tcgtcacaat aaagataggg gggcaattaa aggaagctct attagataca ggagcagatg    2340
atacagtatt agaagaaatg aatttgccag gaagatggaa accaaaaatg ataggggaa    2400
ttggaggttt tatcaaagta ggacagtatg atcagatact catagaaatc tgcggacata    2460
aagctatagg tacagtatta gtaggaccta cacctgtcaa cataattgga agaaatctgt    2520
tgactcagat tggctgcact ttaaattttc ccattagtcc tattgagact gtaccagtaa    2580
aattaaagcc aggaatggat ggcccaaaag ttaaacaatg gccattgaca gaagaaaaaa    2640
taaaagcatt agtagaaatt tgtacagaaa tggaaaagga aggaaaaatt tcaaaaattg    2700
ggcctgaaaa tccatacaat actccagtat ttgccataaa gaaaaagac agtactaaat    2760
ggagaaaatt agtagatttc agagaactta ataagagaac tcaagatttc tgggaagttc    2820
aattaggaat accacatcct gcagggttaa aacagaaaaa atcagtaaca gtactggatg    2880
tgggcgatgc atatttttca gttcccttag ataaagactt caggaagtat actgcattta    2940
ccatacctag tataaacaat gagacaccag ggattagata tcagtacaat gtgcttccac    3000
agggatggaa aggatcacca gcaatattcc agtgtagcat gacaaaaatc ttagagcctt    3060
ttagaaaaca aaatccagac atagtcatct atcaatacat ggatgatttg tatgtaggat    3120
ctgacttaga aatagggcag catagaacaa aaatagagga actgagacaa catctgttga    3180
ggtgggggatt taccacacca gacaaaaaac atcagaaaga acctccattc ctttggatgg    3240
gttatgaact ccatcctgat aaatggacag tacagcctat agtgctgcca gaaaaggaca    3300
gctggactgt caatgacata cagaaattag tgggaaaatt gaattgggca agtcagattt    3360
atgcagggat taaagtaagg caattatgta aacttcttag gggaaccaaa gcactaacag    3420
aagtagtacc actaacagaa gaagcagagc tagaactggc agaaaacagg gagattctaa    3480
aagaaccggt acatggagtg tattatgacc catcaaaaga cttaatagca gaaatacaga    3540
agcaggggca aggccaatgg acatatcaaa tttatcaaga gccatttaaa aatctgaaaa    3600
caggaaaata tgcaagaatg aagggtgccc acactaatga tgtgaaacaa ttaacagagg    3660
cagtacaaaa aatagccaca gaaagcatag taatatgggg aaagactcct aaatttaaat    3720
tacccataca aaaggaaaca tgggaagcat ggtggacaga gtattggcaa gccacctgga    3780
ttcctgagtg ggagtttgtc aatacccctc ccttagtgaa gttatggtac cagttagaga    3840
aagaacccat aataggagca gaaacttct atgtagatgg ggcagccaat agggaaacta    3900
aattaggaaa agcaggatat gtaactgaca gaggaagaca aaaagttgtc cccctaacgg    3960
acacaacaaa tcagaagact gagttacaag caattcatct agctttgcag gattcgggat    4020
```

```
tagaagtaaa catagtgaca gactcacaat atgcattggg aatcattcaa gcacaaccag    4080
ataagagtga atcagagtta gtcagtcaaa taatagagca gttaataaaa aaggaaaaag    4140
tctacctggc atgggtacca gcacacaaag gaattggagg aaatgaacaa gtagatgggt    4200
tggtcagtgc tggaatcagg aaagtactat ttttagatgg aatagataag gcccaagaag    4260
aacatgagaa atatcacagt aattggagag caatggctag tgattttaac ctaccacctg    4320
tagtagcaaa agaaatagta gccagctgtg ataaatgtca gctaaagggg gaagccatgc    4380
atggacaagt agactgtagc ccaggaatat ggcagctaga ttgtacacat ttagaaggaa    4440
aagttatctt ggtagcagtt catgtagcca gtggatatat agaagcagaa gtaattccag    4500
cagagacagg gcaagaaaca gcatacttcc tcttaaaatt agcaggaaga tggccagtaa    4560
aaacagtaca tacagacaat ggcagcaatt tcaccagtac tacagttaag gccgcctgtt    4620
ggtgggcggg gatcaagcag gaatttggca ttccctacaa tccccaaagt caaggagtaa    4680
tagaatctat gaataaagaa ttaagaaaaa ttataggaca ggtaagagat caggctgaac    4740
atcttaagac agcagtacaa atggcagtat tcatccacaa ttttaaaaga aagggggga    4800 ttggggggta cagtgcaggg gaaagaatag tagacataat agcaacagac atacaaacta    4860
aagaattaca aaaacaaatt acaaaaattc aaaattttcg ggtttattac agggacagca    4920
gagatccagt ttggaaagga ccagcaaagc tcctctggaa aggtgaaggg gcagtagtaa    4980
tacaagataa tagtgacata aaagtagtgc caagaagaaa agcaaagatc atcagggatt    5040
atggaaaaca gatggcaggt gatgattgtg tggcaagtag acaggatgag gattaacaca    5100
tggaaaagat tagtaaaaca ccatatgtat atttcaagga aagctaagga ctggttttat    5160
agacatcact atgaaagtac taatccaaaa ataagttcag aagtacacat cccactaggg    5220
gatgctaaat tagtaataac aacatattgg ggtctgcata caggagaaag agactggcat    5280
ttgggtcagg gagtctccat agaatggagg aaaaagagat atagcacaca agtagaccct    5340
gacctagcag accaactaat tcatctgcac tattttgatt gttttcaga atctgctata    5400 agaaatacca tattaggacg tatagttagt cctaggtgtg aatatcaagc aggacataac    5460
aaggtaggat ctctacagta cttggcacta gcagcattaa taaaaccaaa acagataaag    5520
ccacctttgc ctagtgttag gaaactgaca gaggacagat ggaacaagcc ccagaagacc    5580
aagggccaca gagggagcca tacaatgaat ggacactaga gcttttagag gaacttaaga    5640
gtgaagctgt tagacatttt cctaggatat ggctccataa cttaggacaa catatctatg    5700
aaacttacgg ggatacttgg gcaggagtgg aagccataat aagaattctg caacaactgc    5760
tgtttatcca tttcagaatt gggtgtcgac atagcagaat aggcgttact cgacagagga    5820
gagcaagaaa tggagccagt agatcctaga ctagagccct ggaagcatcc aggaagtcag    5880
cctaaaactg cttgtaccaa ttgctattgt aaaaagtgtt gctttcattg ccaagtttgt    5940
ttcatgacaa aagccttagg catctcctat ggcaggaaga agcggagaca gcgacgaaga    6000
gctcatcaga acagtcagac tcatcaagct tctctatcaa agcagtaagt agtacatgta    6060
atgcaaccta atatagtagc aatagtagca ttagtagtag caataataat agcaatagtt    6120
gtgtggtcca tagtaatcat agaatatagg aaaatattaa gacaaagaaa aatagacagg    6180
ttaattgata gactaataga aagagcagaa gacagtggca atgagagtga aggagaagta    6240
tcagcacttg tggagatggg ggtggaaatg gggcaccatg ctccttggga tattgatgat    6300
ctgtagtgct acagaaaaat tgtgggtcac cgtctattat ggggtacctg tgtggaaaga    6360
```

```
agcaaccacc actctatttt gtgcatcaga tgctaaagca tatgatacag aggtacataa    6420
tgtttgggcc acacatgcct gtgtacccac agaccccaac ccacaagaag tagtattgga    6480
aaatgtaaca gaacatttta acatgtggaa aaataacatg gtagaacaga tgcaggagga    6540
tataatcagt ttatgggatc aaagcctaaa gccatgtgta aaattaaccc cactctgtgt    6600
tactttaaat tgcaaggatg tgaatgctac taataccact aatgatagcg agggaacgat    6660
ggagagagga gaaataaaaa actgctcttt caatatcacc acaagcataa agatgaggt    6720 gcagaaagaa tatgctcttt tttataaact tgatgtagta ccaatagata ataataatac    6780
cagctatagg ttgataagtt gtgacacctc agtcattaca caggcctgtc caaagatatc    6840
ctttgagcca attcccatac attattgtgc cccggctggt tttgcgattc taaagtgtaa    6900
tgataagacg ttcaatggaa aaggaccatg taaaaatgtc agcacagtac aatgtacaca    6960
tggaattagg ccagtagtat caactcaact gctgctaaat ggcagtctag cagaagaaga    7020
ggtagtaatt agatctgaca atttcacgaa caatgctaaa accataatag tacagctgaa    7080
agaatctgta gaaattaatt gtacaagacc caacaacaat acaagaaaaa gtatacatat    7140
aggaccaggg agagcatttt atactacagg agaaataata ggagatataa gacaagcaca    7200
ttgtaacatt agtagagcaa aatggaatga cactttaaaa cagatagtta taaaattaag    7260
agaacaattt gagaataaaa caatagtctt taatcactcc tcaggagggg acccagaaat    7320
tgtaatgcac agttttaatt gtggaggaga atttttctac tgtaattcaa cacaactgtt    7380
taatagtact tggaataata atactgaagg gtcaaataac actgaaggaa atactatcac    7440
actcccatgc agaataaaac aaattataaa catgtggcag gaagtaggaa aagcaatgta    7500
tgcccctccc atcagaggac aaattagatg ttcatcaaat attacagggc tgctattaac    7560
aagagatggt ggtattaatg agaatgggac cgagatcttc agacctggag gaggagatat    7620
gagggacaat tggagaagtg aattatataa atataaagta gtaaaaattg aaccattagg    7680
agtagcaccc accaaggcaa agagaagagt ggtgcaaaga gaaaaaagag cagtgggaat    7740
aggagctgtg ttccttgggt tcttgggagc agcaggaagc actatgggcg cagcgtcaat    7800
gacactgacg gtacaggcca gactattatt gtctggtata gtgcaacagc agaacaattt    7860
gctgagggct attgaggcgc aacagcgtat gttgcaactc acagtctggg gcatcaagca    7920
gctccaggca agagtcctgg ctgtggaaag atacctaggg gatcaacagc tcctggggat    7980
ttggggttgc tctggaaaac tcatttgcac cactgctgtg ccttggaatg ctagttggag    8040
taataaatct ctggataggt tttggaataa catgacctgg atggagtggg aaagagaaat    8100
tgacaattac acaagcgaaa tatacaccct aattgaagaa tcgcagaacc aacaagaaaa    8160
gaatgaacaa gaattattgg aattagataa atgggcaagt ttgtggaatt ggtttgacat    8220
aacaaaatgg ctgtggtata taaaaatatt cataatgata gtaggaggct tagtaggttt    8280
aagactagtt tttactgtac tttctatagt gaatagagtt aggcagggat actcaccatt    8340
atcgtttcag accctcctcc cagccccgag gggacccgac aggcccgaag gaatcgaaga    8400
agaaggtgga gagagagaca gagacagatc cggacgatta gtgaacggat tcttagcact    8460
tatctgggtc gacctgcgga gcctgtgcct cttcagctac caccgcttga gagacttact    8520
cttgactgta acgaggattg tggaacttct gggacgcagg gggtgggaag tcctgaaata    8580
ttggtggaat ctcctacagt attggagtca ggaactaaag aatagtgctg ttagcttgct    8640
caatgccaca gccatagcag tagctgaggg gacagatagg attatagaag cattacaaag    8700
aacttataga gctattctcc acatacctac aagaataaga cagggcttgg aaagggcttt    8760
```

```
gctataagcg gccgccatgg tgagcaaggg cgaggagctg ttcaccgggg tggtgcccat   8820
cctggtcgag ctggacggcg acgtaaacgg ccacaagttc agcgtgtccg gcagggcga    8880 gggcgatgcc acctacggca agctgaccct gaagttcatc tgcaccaccg gcaagctgcc   8940
cgtgccctgg cccacccctcg tgaccaccct gacctacggc gtgcagtgct tcagccgcta  9000
ccccgaccac atgaagcagc acgacttctt caagtccgcc atgcccgaag gctacgtcca   9060
ggagcgcacc atcttcttca aggacgacgg caactacaag acccgcgccg aggtgaagtt   9120
cgagggcgac accctggtga accgcatcga gctgaagggc atcgacttca aggaggacgg   9180
caacatcctg gggcacaagc tggagtacaa ctacaacagc cacaacgtct atatcatggc   9240
cgacaagcag aagaacggca tcaaggtgaa cttcaagatc cgccacaaca tcgaggacgg   9300
cagcgtgcag ctcgccgacc actaccagca gaacaccccc atcggcgacg gccccgtgct   9360
gctgcccgac aaccactacc tgagcaccca gtccgccctg agcaaagacc ccaacgagaa   9420
gcgcgatcac atggtcctgc tggagttcgt gaccgccgcc gggatcactc tcggcatgga   9480
cgagctgtac aagtaacccg gtacctttta agaccaatga cttacaaggc agctgtagat   9540
cttagccact ttttaaaaga aaagggggga ctggaagggc taattcactc ccaaagaaga   9600
caagatatcc ttgatctgtg gatctaccac acacaaggct acttccctga ttggcagaac   9660
tacacaccag ggccagggt cagatatcca ctgacctttg gatggtgcta caagctagta    9720
ccagttgagc cagataaggt agaagaggcc aataaaggag agaacaccag cttgttacac   9780
cctgtgagcc tgcatggaat ggatgaccct gagagagaag tgttacgcct agcatttcat   9840
cacgtggccc gagagctgca tccggagtac ttcaagaact gctgacatcg agcttgctac   9900
aagggacttt ccgctgggga ctttccaggg aggcgtggcc tgggcgggac tggggagtgg   9960
cgagccctca gatgctgcat ataagcagct gctttttgcc tgtactgggt ctctctggtt  10020
agaccagatc tgagcctggg agctctctgg ctaactaggg aacccactgc ttaagcctca  10080
ataaagcttg ccttgagtgc ttcaagtagt gtgtgcccgt ctgttgtgtg actctggtaa  10140
ctagagatcc ctcagaccct tttagtcagt gtggaaaatc tctagcaccc ccaggaggt   10200 agaggttgca gtgagccaag atcgcgccac tgcattccag cctgggcaag aaaacaagac  10260
tgtctaaaat aataataata agttaagggt attaaatata tttatacatg gaggtcataa  10320
aaatatatat atttgggctg gcgcagtgg ctcacacctg cgcccggccc tttgggaggc    10380
cgaggcaggt ggatcacctg agtttgggag ttccagacca gcctgaccaa catggagaaa  10440 cccctctct gtgtattttt agtagatttt attttatgtg tattttattc acaggtattt    10500
ctggaaaact gaaactgttt ttcctctact ctgataccac aagaatcatc agcacagagg  10560
aagacttctg tgatcaaatg tggtgggaga gggaggtttt caccagcaca tgagcagtca  10620
gttctgccgc agactcggcg ggtgtccttc ggttcagttc aacaccgcc tgcctggaga    10680 gaggtcagac cacagggtga gggctcagtc cccaagacat aaaacacccaa gacataaaca  10740 cccaacaggt ccaccccgcc tgctgcccag gcagagccga ttcaccaaga cgggaattag  10800
gatagagaaa gagtaagtca cacagagccg gctgtgcggg agaacggagt tctattatga  10860
ctcaaatcag tctccccaag cattcgggga tcagagtttt aaggataac ttagtgtgta    10920 gggggccagt gagttggaga tgaaagcgta gggagtcgaa ggtgtccttt tgcgccgagt  10980
cagttcctgg gtgggggcca caagatcgga tgagccagtt tatcaatccg ggggtgccag  11040
ctgatccatg gagtgcaggg tctgcaaaat atctcaagca ctgattgatc ttaggtttta  11100
```

```
caatagtgat gttacccag gaacaatttg gggaaggtca gaatcttgta gcctgtagct    11160
gcatgactcc taaaccataa tttcttttt gttttttttt ttttatttt gagacagggt    11220
ctcactctgt cacctaggct ggagtgcagt ggtgcaatca cagctcactg cagcctcaac    11280
gtcgtaagct caagcgatcc tcccacctca gcctgcctgg tagctgagac tacaagcgac    11340
gccccagtta attttttgtat tttttggtaga ggcagcgttt tgccgtgtgg ccctggctgg    11400
tctcgaactc ctgggctcaa gtgatccagc ctcagcctcc caaagtgctg ggacaaccgg    11460
ggccagtcac tgcacctggc cctaaaccat aatttctaat cttttggcta atttgttagt    11520
cctacaaagg cagtctagtc cccaggcaaa aaggggggttt gtttcgggaa agggctgtta    11580
ctgtctttgt ttcaaactat aaactaagtt cctcctaaac ttagttcggc ctacacccag    11640
gaatgaacaa ggagagcttg gaggttagaa gcacgatgga attggttagg tcagatctct    11700
ttcactgtct gagttataat tttgcaatgg tggttcaaag actgcccgct tctgacacca    11760
gtcgctgcat taatgaatcg gccaacgcgc ggggagaggc ggtttgcgta ttggcgctct    11820
tccgcttcct cgctcactga ctcgctgcgc tcggtcgttc ggctgcggcg agcggtatca    11880
gctcactcaa aggcggtaat acggttatcc acagaatcag gggataacgc aggaaagaac    11940
atgtgagcaa aaggccagca aaaggccagg aaccgtaaaa aggccgcgtt gctggcgttt    12000
ttccataggc tccgccccc tgacgagcat cacaaaaatc gacgctcaag tcagaggtgg    12060
cgaaacccga caggactata aagataccag gcgtttcccc ctggaagctc cctcgtgcgc    12120
tctcctgttc cgaccctgcc gcttaccgga tacctgtccg cctttctccc ttcgggaagc    12180
gtggcgcttt ctcaatgctc acgctgtagg tatctcagtt cggtgtaggt cgttcgctcc    12240
aagctgggct gtgtgcacga accccccgtt cagcccgacc gctgcgcctt atccggtaac    12300
tatcgtcttg agtccaaccc ggtaagacac gacttatcgc cactggcagc agccactggt    12360
aacaggatta gcagagcgag gtatgtaggc ggtgctacag agttcttgaa gtggtggcct    12420
aactacggct acactagaag gacagtattt ggtatctgcg ctctgctgaa gccagttacc    12480
ttcggaaaaa gagttggtag ctcttgatcc ggcaaacaaa ccaccgctgg tagcggtggt    12540
tttttttgttt gcaagcagca gattacgcgc agaaaaaaag gatctcaaga agatcctttg    12600
atcttttcta cggggtctga cgctcagtgg aacgaaaact cacgttaagg gattttggtc    12660
atgagattat caaaaaggat cttcacctag atccttttaa attaaaaatg aagttttaaa    12720
tcaatctaaa gtatatatga gtaaacttgg tctgacagtt accaatgctt aatcagtgag    12780
gcacctatct cagcgatctg tctatttcgt tcatccatag ttgcctgact ccccgtcgtg    12840
tagataacta cgatacggga gggcttacca tctggcccca gtgctgcaat gataccgcga    12900
gacccacgct caccggctcc agatttatca gcaataaacc agccagccgg aagggccgag    12960
cgcagaagtg gtcctgcaac tttatccgcc tccatccagt ctattaattg ttgccgggaa    13020
gctagagtaa gtagttcgcc agttaatagt ttgcgcaacg ttgttgccat tgctacaggc    13080
atcgtggtgt cacgctcgtc gtttggtatg gcttcattca gctccggttc caacgatca    13140
aggcgagtta catgatcccc catgttgtgc aaaaaagcgg ttagctcctt cggtcctccg    13200
atcgttgtca gaagtaagtt ggccgcagtg ttatcactca tggttatggc agcactgcat    13260
aattctctta ctgtcatgcc atccgtaaga tgcttttctg tgactggtga gtactcaacc    13320
aagtcattct gagaatagtg tatgcggcga ccgagttgct cttgcccggc gtcaatacgg    13380
gataataccg cgccacatag cagaacttta aaagtgctca tcattggaaa acgttcttcg    13440
gggcgaaaac tctcaaggat cttaccgctg ttgagatcca gttcgatgta acccactcgt    13500
```

```
gcacccaact gatcttcagc atcttttact ttcaccagcg tttctgggtg agcaaaaaca    13560
ggaaggcaaa atgccgcaaa aaagggaata agggcgacac ggaaatgttg aatactcata    13620
ctcttccttt ttcaatatta ttgaagcatt tatcagggtt attgtctcat gagcggatac    13680
atatttgaat gtatttagaa aaataaacaa ataggggttc cgcgcacatt tccccgaaaa    13740
gtgccacctg acgtctaaga aaccattatt atcatgacat taacctataa aaataggcgt    13800
atcacgaggc cctttcgtct tcaagaactg cctcgcgcgt ttcggtgatg acggtgaaaa    13860
cctctgacac atgcagctcc cggagacggt cacagcttgt ctgtaagcgg atgccgggag    13920
cagacaagcc cgtcagggcg cgtcagcggg tgttggcggg tgtcggggcg cagccatgac    13980
ccagtcacgt agcgatagcg gagtgtactg gcttaactat gcggcatcag agcagattgt    14040
actgagagtg caccatatgc ggtgtgaaat accgcacaga tgcgtaagga gaaaataccg    14100
catcaggcgc cattcgccat tcaggctgcg caactgttgg gaagggcgat cggtgcgggc    14160
ctcttcgcta ttacgccagg ggaggcagag attgcagtaa gctgagatcg cagcactgca    14220
ctccagcctg ggcgacagag taagactctg tctcaaaaat aaaataaata aatcaatcag    14280
atattccaat cttttccttt atttatttat ttattttcta ttttggaaac acagtccttc    14340
cttattccag aattacacat atattctatt tttctttata tgctccagtt ttttttagac    14400
cttcacctga aatgtgtgta tacaaaatct aggccagtcc agcagagcct aaaggtaaaa    14460
aataaaataa taaaaaataa ataaaatcta gctcactcct tcacatcaaa atggagatac    14520
agctgttagc attaaatacc aaataaccca tcttgtcctc aataatttta agcgcctctc    14580
tccaccacat ctaactcctg tcaaaggcat gtgccccttc cgggcgctct gctgtgctgc    14640
caaccaactg gcatgtggac tctgcagggt ccctaactgc caagcccac agtgtgccct    14700 gaggctgccc cttccttcta gcggctgccc ccactcggct ttgctttccc tagtttcagt    14760
tacttgcgtt cagccaaggt ctgaaactag gtgcgcacag agcggtaaga ctgcgagaga    14820
aagagaccag ctttacaggg ggtttatcac agtgcaccct gacagtcgtc agcctcacag    14880
ggggtttatc acattgcacc ctgacagtcg tcagcctcac aggggggttta tcacagtgca    14940 cccttacaat cattccattt gattcacaat tttttttagtc tctactgtgc ctaacttgta    15000
agttaaattt gatcagaggt gtgttcccag aggggaaaac agtatataca gggttcagta    15060
ctatcgcatt tcaggcctcc acctgggtct tggaatgtgt cccccgaggg gtgatgacta    15120
cctcagttgg atctccacag gtcacagtga cacaagataa ccaagacacc tcccaaggct    15180
accacaatgg gccgccctcc acgtgcacat ggccggagga actgccatgt cggaggtgca    15240
agcacacctg cgcatcagag tccttggtgt ggagggaggg accagcgcag cttccagcca    15300
tccacctgat gaacagaacc tagggaaagc cccagttcta cttacaccag gaaaggc      15357
```

<210> SEQ ID NO 11
<211> LENGTH: 15414
<212> TYPE: DNA
<213> ORGANISM: Human immunodeficiency virus type 1

<400> SEQUENCE: 11

```
tggaagggct aatttggtcc caaaaaagac aagagatcct tgatctgtgg atctaccaca      60
cacaaggcta cttccctgat tggcagaact acacaccagg gccagggatc agatatccac     120
tgacctttgg atggtgcttc aagttagtac cagttgaacc agagcaagta gaagaggcca     180
aataaggaga gaagaacagc ttgttacacc ctatgagcca gcatgggatg gaggacccgg     240
```

```
agggagaagt attagtgtgg aagtttgaca gcctcctagc atttcgtcac atggcccgag      300
agctgcatcc ggagtactac aaagactgct gacatcgagc tttctacaag ggactttccg      360
ctggggactt tccagggagg tgtggcctgg gcgggactgg ggagtggcga gccctcagat      420
gctacatata agcagctgct ttttgcctgt actgggtctc tctggttaga ccagatctga      480
gcctgggagc tctctggcta actagggaac ccactgctta agcctcaata aagcttgcct      540
tgagtgctca aagtagtgtg tgcccgtctg ttgtgtgact ctggtaacta gagatccctc      600
agaccctttt agtcagtgtg gaaaatctct agcagtggcg cccgaacagg gacttgaaag      660
cgaaagtaaa gccagaggag atctctcgac gcaggactcg gcttgctgaa gcgcgcacgg      720
caagaggcga ggggcggcga ctggtgagta cgccaaaaat tttgactagc ggaggctaga      780
aggagagaga tgggtgcgag agcgtcggta ttaagcgggg gagaattaga taaatgggaa      840
aaaattcggt taaggccagg gggaagaaaa caatataaac taaaacatat agtatgggca      900
agcagggagc tagaacgatt cgcagttaat cctggccttt tagagacatc agaaggctgt      960
agacaaatac tgggacagct acaaccatcc cttcagacag gatcagaaga acttagatca     1020
ttatataata caatagcagt cctctattgt gtgcatcaaa ggatagatgt aaaagacacc     1080
aaggaagcct tagataagat agaggaagag caaaacaaaa gtaagaaaaa ggcacagcaa     1140
gcagcagctg acacaggaaa caacagccag gtcagccaaa attaccctat agtgcagaac     1200
ctccaggggc aaatggtaca tcaggccata tcacctagac ttttaaatgc atgggtaaaa     1260
gtagtagaag agaaggcttt cagcccagaa gtaataccca tgttttcagc attatcagaa     1320
ggagccaccc cacaagattt aaataccatg ctaaacacag tggggggaca tcaagcagcc     1380
atgcaaatgt taaaagagac catcaatgag gaagctgcag aatgggatag attgcatcca     1440
gtgcatgcag ggcctattgc accaggccag atgagagaac caaggggaag tgacatagca     1500
ggaactacta gtacccttca ggaacaaata ggatggatga cacataatcc acctatccca     1560
gtaggagaaa tctataaaag atggataatc ctgggattaa ataaaatagt aagaatgtat     1620
agccctacca gcattctgga cataagacaa ggaccaaagg aacccttag agactatgta      1680 gaccgattct ataaaactct aagagccgag caagcttcac aagaggtaaa aaattggatg     1740
acagaaacct tgttggtcca aaatgcgaac ccagattgta agactatttt aaaagcattg     1800
ggaccaggag cgacactaga agaaatgatg acagcatgtc agggagtggg gggacccggc     1860
cataaagcaa gagttttggc tgaagcaatg agccaagtaa caaatccagc taccataatg     1920
atacagaaag gcaattttag gaaccaaaga aagactgtta agtgtttcaa ttgtggcaaa     1980
gaagggcaca tagccaaaaa ttgcagggcc cctaggaaaa agggctgttg gaaatgtgga     2040
aaggaaggac accaaatgaa agattgtact gagagacagg ctaattttt agggaagatc      2100 tggccttccc acaagggaag gccagggaat tttcttcaga gcagaccaga gccaacagcc     2160
ccaccgaaag agagcttcag gtttggggaa gagacaacaa ctccctctca gaagcaggag     2220
ccgatagaca aggaactgta tcctttagct tccctcagat cactctttgg cagcgacccc     2280
tcgtcacaat aaagataggg gggcaattaa aggaagctct attagataca ggagcagatg     2340
atacagtatt agaagaaatg aatttgccag gaagatggaa accaaaaatg ataggggaa      2400 ttggaggttt tatcaaagta ggacagtatg atcagatact catagaaatc tgcggacata     2460
aagctatagg tacagtatta gtaggaccta cacctgtcaa cataattgga agaaatctgt     2520
tgactcagat tggctgcact ttaaattttc ccattagtcc tattgagact gtaccagtaa     2580
aattaaagcc aggaatggat ggcccaaaag ttaaacaatg gccattgaca gaagaaaaaa     2640
```

```
taaaagcatt agtagaaatt tgtacagaaa tggaaaagga aggaaaaatt tcaaaaattg     2700
ggcctgaaaa tccatacaat actccagtat ttgccataaa gaaaaaagac agtactaaat     2760
ggagaaaatt agtagatttc agagaactta ataagagaac tcaagatttc tgggaagttc     2820
aattaggaat accacatcct gcagggttaa aacagaaaaa atcagtaaca gtactggatg     2880
tgggcgatgc atatttttca gttcccttag ataaagactt caggaagtat actgcattta     2940
ccatacctag tataaacaat gagacaccag ggattagata tcagtacaat gtgcttccac     3000
agggatggaa aggatcacca gcaatattcc agtgtagcat gacaaaaatc ttagagcctt     3060
ttagaaaaca aaatccagac atagtcatct atcaatacat ggatgatttg tatgtaggat     3120
ctgacttaga aatagggcag catagaacaa aaatagagga actgagacaa catctgttga     3180
ggtggggatt taccacacca gacaaaaaac atcagaaaga acctccattc ctttggatgg     3240
gttatgaact ccatcctgat aaatggacag tacagcctat agtgctgcca gaaaaggaca     3300
gctggactgt caatgacata cagaaattag tgggaaaatt gaattgggca agtcagattt     3360
atgcagggat taaagtaagg caattatgta aacttcttag gggaaccaaa gcactaacag     3420
aagtagtacc actaacagaa gaagcagagc tagaactggc agaaaacagg gagattctaa     3480
aagaaccggt acatggagtg tattatgacc catcaaaaga cttaatagca gaaatacaga     3540 agcagggca aggccaatgg acatatcaaa tttatcaaga gccatttaaa aatctgaaaa     3600
caggaaaata tgcaagaatg aagggtgccc acactaatga tgtgaaacaa ttaacagagg     3660
cagtacaaaa aatagccaca gaaagcatag taatatgggg aaagactcct aaatttaaat     3720
tacccataca aaaggaaaca tgggaagcat ggtggacaga gtattggcaa gccacctgga     3780
ttcctgagtg ggagtttgtc aatacccctc ccttagtgaa gttatggtac cagttagaga     3840
aagaacccat aataggagca gaaactttct atgtagatgg ggcagccaat agggaaacta     3900
aattaggaaa agcaggatat gtaactgaca gaggaagaca aaaagttgtc cccctaacgg     3960
acacaacaaa tcagaagact gagttacaag caattcatct agctttgcag gattcgggat     4020
tagaagtaaa catagtgaca gactcacaat atgcattggg aatcattcaa gcacaaccag     4080
ataagagtga atcagagtta gtcagtcaaa taatagagca gttaataaaa aaggaaaaag     4140
tctacctggc atgggtacca gcacacaaag gaattggagg aaatgaacaa gtagatgggt     4200
tggtcagtgc tggaatcagg aaagtactat ttttagatgg aatagataag gcccaagaag     4260
aacatgagaa atatcacagt aattggagag caatggctag tgattttaac ctaccacctg     4320
tagtagcaaa agaaatagta gccagctgtg ataaatgtca gctaaaaggg gaagccatgc     4380
atggacaagt agactgtagc ccaggaatat ggcagctaga ttgtacacat ttagaaggaa     4440
aagttatctt ggtagcagtt catgtagcca gtggatatat agaagcagaa gtaattccag     4500
cagagacagg gcaagaaaca gcatacttcc tcttaaaatt agcaggaaga tggccagtaa     4560
aaacagtaca tacagacaat ggcagcaatt tcaccagtac tacagttaag gccgcctgtt     4620
ggtgggcggg gatcaagcag gaatttggca ttccctacaa tccccaaagt caaggagtaa     4680
tagaatctat gaataaagaa ttaaagaaaa ttataggaca ggtaagagat caggctgaac     4740
atcttaagac agcagtacaa atggcagtat tcatccacaa ttttaaaaga aaaggggggg     4800 ttgggggta cagtgcaggg gaaagaatag tagacataat agcaacagac atacaaacta     4860
aagaattaca aaaacaaatt acaaaaattc aaaattttcg ggtttattac agggacagca     4920
gagatccagt ttggaaagga ccagcaaagc tcctctggaa aggtgaaggg gcagtagtaa     4980
```

```
tacaagataa tagtgacata aaagtagtgc caagaagaaa agcaaagatc atcagggatt    5040
atggaaaaca gatggcaggt gatgattgtg tggcaagtag acaggatgag gattaacaca    5100
tggaaaagat tagtaaaaca ccatatgtat atttcaagga aagctaagga ctggttttat    5160
agacatcact atgaaagtac taatccaaaa ataagttcag aagtacacat cccactaggg    5220
gatgctaaat tagtaataac aacatattgg ggtctgcata caggagaaag agactggcat    5280
ttgggtcagg gagtctccat agaatggagg aaaaagagat atagcacaca agtagaccct    5340
gacctagcag accaactaat tcatctgcac tattttgatt gttttttcaga atctgctata    5400 agaaatacca tattaggacg tatagttagt cctaggtgtg aatatcaagc aggacataac    5460
aaggtaggat ctctacagta cttggcacta gcagcattaa taaaaccaaa acagataaag    5520 ccaccttttgc ctagtgttag gaaactgaca gaggacagat ggaacaagcc ccagaagacc    5580
aagggccaca gagggagcca tacaatgaat ggacactaga gcttttagag gaacttaaga    5640
gtgaagctgt tagacatttt cctaggtatat ggctccataa cttaggacaa catatctatg    5700
aaacttacgg ggatacttgg gcaggagtgg aagccataat aagaattctg caacaactgc    5760
tgtttatcca tttcagaatt gggtgtcgac atagcagaat aggcgttact cgacagagga    5820
gagcaagaaa tggagccagt agatcctaga ctagagccct ggaagcatcc aggaagtcag    5880
cctaaaactg cttgtaccaa ttgctattgt aaaaagtgtt gctttcattg ccaagtttgt    5940
ttcatgacaa aagccttagg catctcctat ggcaggaaga agcggagaca cgacgaaga    6000 gctcatcaga acagtcagac tcatcaagct tctctatcaa agcagtaagt agtacatgta    6060
atgcaaccta atatagtagc aatagtagca ttagtagtag caataataat agcaatagtt    6120
gtgtggtcca tagtaatcat agaatatagg aaaatattaa gacaaagaaa aatagacagg    6180
ttaattgata gactaataga aagagcagaa gacagtggca atgagagtga aggagaagta    6240
tcagcacttg tggagatggg ggtggaaatg gggcaccatg ctccttggga tattgatgat    6300
ctgtagtgct acagaaaaat tgtgggtcac cgtctattat ggggtacctg tgtggaaaga    6360
agcaaccacc actctatttt gtgcatcaga tgctaaagca tatgatacag aggtacataa    6420
tgtttgggcc acacatgcct gtgtacccac agaccccaac ccacaagaag tagtattgga    6480
aaatgtaaca gaacatttta acatgtggaa aaataacatg gtagaacaga tgcaggagga    6540
tataatcagt ttatgggatc aaagcctaaa gccatgtgta aaattaaccc cactctgtgt    6600
tactttaaat tgcaaggatg tgaatgctac taataccact aatgatagcg agggaacgat    6660
ggagagagga gaaataaaaa actgctcttt caatatcacc acaagcataa gagatgaggt    6720
gcagaaagaa tatgctcttt tttataaact tgatgtagta ccaatagata ataataatac    6780
cagctatagg ttgataagtt gtgacacctc agtcattaca caggcctgtc caaagatatc    6840
ctttgagcca attcccatac attattgtgc cccggctggt tttgcgattc taaagtgtaa    6900
tgataagacg ttcaatggaa aaggaccatg taaaaatgtc agcacagtac aatgtacaca    6960
tggaattagg ccagtagtat caactcaact gctgctaaat ggcagtctag cagaagaaga    7020
ggtagtaatt agatctgaca atttcacgaa caatgctaaa accataatag tacagctgaa    7080
agaatctgta gaattaatt gtacaagacc caacaacaat acaagaaaaa gtatacatat    7140
aggaccaggg agagcatttt atactacagg agaaataata ggagatataa gacaagcaca    7200
ttgtaacatt agtagagcaa aatggaatga cactttaaaa cagatagtta taaaattaag    7260
agaacaattt gagaataaaa caatagtctt taatcactcc tcaggagggg acccagaaat    7320
tgtaatgcac agttttaatt gtggaggaga atttttctac tgtaattcaa cacaactgtt    7380
```

```
taatagtact tggaataata atactgaagg gtcaaataac actgaaggaa atactatcac    7440
actcccatgc agaataaaac aaattataaa catgtggcag gaagtaggaa aagcaatgta    7500
tgcccctccc atcagaggac aaattagatg ttcatcaaat attacagggc tgctattaac    7560
aagagatggt ggtattaatg agaatgggac cgagatcttc agacctggag gaggagatat    7620
gagggacaat tggagaagtg aattatataa atataaagta gtaaaaattg aaccattagg    7680
agtagcaccc accaaggcaa agagaagagt ggtgcaaaga gaaaaagag cagtgggaat     7740 aggagctgtg ttccttgggt tcttgggagc agcaggaagc actatgggcg cagcgtcaat    7800
gacactgacg gtacaggcca gactattatt gtctggtata gtgcaacagc agaacaattt    7860
gctgagggct attgaggcgc aacagcgtat gttgcaactc acagtctggg gcatcaagca    7920
gctccaggca agagtcctgg ctgtggaaag atacctaggg gatcaacagc tcctggggat    7980
ttggggttgc tctggaaaac tcatttgcac cactgctgtg ccttggaatg ctagttggag    8040
taataaatct ctggatagga tttggaataa catgacctgg atggagtggg aaagagaaat    8100
tgacaattac acaagcgaaa tatacaccct aattgaagaa tcgcagaacc aacaagaaaa    8160
gaatgaacaa gaattattgg aattagataa atgggcaagt ttgtggaatt ggtttgacat    8220
aacaaaatgg ctgtggtata taaaaatatt cataatgata gtaggaggct tagtaggttt    8280
aagactagtt tttactgtac tttctatagt gaatagagtt aggcagggat actcaccatt    8340
atcgtttcag accctcctcc cagccccgag gggacccgac aggcccgaag gaatcgaaga    8400
agaaggtgga gagagagaca gagacagatc cggacgatta gtgaacggat tcttagcact    8460
tatctgggtc gacctgcgga gcctgtgcct cttcagctac caccgcttga gagacttact    8520
cttgactgta acgaggattg tggaacttct gggacgcagg gggtgggaag tcctgaaata    8580
ttggtggaat ctcctacagt attggagtca ggaactaaag aatagtgctg ttagcttgct    8640
caatgccaca gccatagcag tagctgaggg gacagatagg attatagaag cattacaaag    8700
aacttataga gctattctcc acatacctac aagaataaga cagggcttgg aaagggcttt    8760
gctataagcg gccgccatgg gcaagcagaa tgtcagtagc ctggatgaga aaaatagcgt    8820
gagcgtggac ctgcctggag aaatgaaagt gctggtgtca aggagaaga acaaagacgg    8880 gaagtacgat ctgatcgcca ccgtggacaa actggaactg aagggcacat ctgataaaaa    8940
caatggcagt ggggtgctgg aggggtcaa ggctgacaag tcaaaagtca agctgaccat    9000
tagcgacgat ctgggacaga ccacactgga agtgttcaaa gaggacggca gaccctggt     9060 gagcaagaaa gtcacatcca agataagag ctccactgag gaaaagttca cgagaaggg     9120 cgaagtgagc gagaagatca ttacacgggc cgacggcact agactggaat acaccgggat    9180
caagtccgat ggatctggca agctaagga ggtgctgaag gctatgtcc tggaaggaac     9240 actgactgca gagaaaacta ccctggtggt caaggaaggg accgtgacac tgtccaaaaa    9300
catttcaaag agcggagaag tgtctgtcga gctgaatgac accgattcta gtccgctac    9360 taagaaaacc gcagcctgga acagtggaac ttcaaccctg acaatcactg tgaatagtaa    9420
gaaaacaaag gacctggtct tcactaagga gaacaccatt acagtgcagc agtatgatag    9480
caatggcaca aagctggaag gctccgccgt ggaaatcacc aaactggatg aaatcaaaaa    9540
tgctctgaag taacccgggt acctttaaga ccaatgactt acaaggcagc tgtagatctt    9600
agccactttt taaagaaaaa ggggggactg aagggctaa ttcactccca aagaagacaa    9660
gatatccttg atctgtggat ctaccacaca caaggctact cccctgattg gcagaactac    9720
```

```
acaccagggc cagggtcag atatccactg acctttggat ggtgctacaa gctagtacca      9780
gttgagccag ataaggtaga agaggccaat aaaggagaga acaccagctt gttacaccct      9840
gtgagcctgc atggaatgga tgaccctgag agagaagtgt tacgcctagc atttcatcac      9900
gtggcccgag agctgcatcc ggagtacttc aagaactgct gacatcgagc ttgctacaag      9960
ggactttccg ctggggactt tccagggagg cgtggcctgg gcgggactgg ggagtggcga     10020
gccctcagat gctgcatata agcagctgct ttttgcctgt actgggtctc tctggttaga     10080
ccagatctga gcctgggagc tctctggcta actagggaac ccactgctta agcctcaata     10140
aagcttgcct tgagtgcttc aagtagtgtg tgcccgtctg ttgtgtgact ctggtaacta     10200
gagatccctc agacccttttt agtcagtgtg gaaaatctct agcacccccc aggaggtaga     10260
ggttgcagtg agccaagatc gcgccactgc attccagcct gggcaagaaa acaagactgt     10320
ctaaaataat aataataagt taagggtatt aaatatattt atacatggag gtcataaaaa     10380
tatatatatt tgggctgggc gcagtggctc acacctgcgc ccggcccttt gggaggccga     10440
ggcaggtgga tcacctgagt ttgggagttc agaccagcc tgaccaacat ggagaaaccc      10500
cttctctgtg tatttttagt agatttttatt ttatgtgtat tttattcaca ggtatttctg     10560
gaaaactgaa actgttttcc ctctactctg ataccacaag aatcatcagc acagaggaag     10620
acttctgtga tcaaatgtgg tgggagaggg aggttttcac cagcacatga gcagtcagtt     10680
ctgccgcaga ctcggcgggt gtccttcggt tcagttccaa caccgcctgc ctggagagag     10740
gtcagaccac agggtgaggg ctcagtcccc aagacataaa cacccaagac ataaacaccc     10800
aacaggtcca ccccgcctgc tgcccaggca gagccgattc accaagacgg gaattaggat     10860
agagaaagag taagtcacac agagccggct gtgcgggaga acggagttct attatgactc     10920
aaatcagtct ccccaagcat tcggggatca gagttttttaa ggataactta gtgtgtaggg    10980
ggccagtgag ttggagatga agcgtaggg agtcgaaggt gtccttttgc gccgagtcag     11040
ttcctgggtg ggggccacaa gatcggatga gccagtttat caatccgggg gtgccagctg    11100
atccatggag tgcagggtct gcaaaatatc tcaagcactg attgatctta ggttttacaa     11160
tagtgatgtt accccaggaa caatttgggg aaggtcagaa tcttgtagcc tgtagctgca     11220
tgactcctaa accataattt cttttttgtt ttttttttttt tatttttgag acagggtctc     11280
actctgtcac ctaggctgga gtgcagtggt gcaatcacag ctcactgcag cctcaacgtc     11340
gtaagctcaa gcgatcctcc cacctcagcc tgcctggtag ctgagactac aagcgacgcc     11400
ccagttaatt tttgtatttt tggtagaggc agcgttttgc cgtgtggccc tggctggtct     11460
cgaactcctg ggctcaagtg atccagcctc agcctcccaa agtgctggga caaccggggc     11520
cagtcactgc acctggccct aaaccataat ttctaatctt ttggctaatt tgttagtcct     11580
acaaaggcag tctagtcccc aggcaaaaag ggggtttgtt tcgggaaagg gctgttactg    11640
tctttgtttc aaactataaa ctaagttcct cctaaactta gttcggccta cacccaggaa     11700
tgaacaagga gagcttggag gttagaagca cgatggaatt ggttaggtca gatctctttc    11760
actgtctgag ttataatttt gcaatggtgg ttcaaagact gcccgcttct gacaccagtc     11820
gctgcattaa tgaatcggcc aacgcgcggg gagaggcggt ttgcgtattg gcgctcttcc     11880
gcttcctcgc tcactgactc gctgcgctcg gtcgttcggc tgcggcgagc ggtatcagct     11940
cactcaaagg cggtaatacg gttatccaca gaatcagggg ataacgcagg aaagaacatg     12000
tgagcaaaag gccagcaaaa ggccaggaac cgtaaaaagg ccgcgttgct ggcgtttttc     12060
cataggctcc gccccctga cgagcatcac aaaaatcgac gctcaagtca gaggtggcga     12120
```

```
aacccgacag gactataaag ataccaggcg tttcccctg gaagctccct cgtgcgctct    12180
cctgttccga ccctgccgct taccggatac ctgtccgcct ttctcccttc gggaagcgtg    12240
gcgctttctc aatgctcacg ctgtaggtat ctcagttcgg tgtaggtcgt tcgctccaag    12300
ctgggctgtg tgcacgaacc ccccgttcag cccgaccgct gcgccttatc cggtaactat    12360
cgtcttgagt ccaacccggt aagacacgac ttatcgccac tggcagcagc cactggtaac    12420
aggattagca gagcgaggta tgtaggcggt gctacagagt tcttgaagtg gtggcctaac    12480
tacggctaca ctagaaggac agtatttggt atctgcgctc tgctgaagcc agttaccttc    12540
ggaaaaagag ttggtagctc ttgatccggc aaacaaacca ccgctggtag cggtggtttt    12600
tttgtttgca agcagcagat tacgcgcaga aaaaaggat ctcaagaaga tcctttgatc    12660
ttttctacgg ggtctgacgc tcagtggaac gaaaactcac gttaagggat tttggtcatg    12720
agattatcaa aaaggatctt cacctagatc cttttaaatt aaaaatgaag ttttaaatca    12780
atctaaagta tatatgagta aacttggtct gacagttacc aatgcttaat cagtgaggca    12840
cctatctcag cgatctgtct atttcgttca tccatagttg cctgactccc cgtcgtgtag    12900
ataactacga tacgggaggg cttaccatct ggccccagtg ctgcaatgat accgcgagac    12960
ccacgctcac cggctccaga tttatcagca ataaccagc cagccggaag ggccgagcgc    13020
agaagtggtc ctgcaacttt atccgcctcc atccagtcta ttaattgttg ccgggaagct    13080
agagtaagta gttcgccagt taatagtttg cgcaacgttg ttgccattgc tacaggcatc    13140
gtggtgtcac gctcgtcgtt tggtatggct tcattcagct ccggttccca acgatcaagg    13200
cgagttacat gatcccccat gttgtgcaaa aaagcggtta gctccttcgg tcctccgatc    13260
gttgtcagaa gtaagttggc cgcagtgtta tcactcatgg ttatggcagc actgcataat    13320
tctcttactg tcatgccatc cgtaagatgc ttttctgtga ctggtgagta ctcaaccaag    13380
tcattctgag aatagtgtat gcggcgaccg agttgctctt gcccggcgtc aatacgggat    13440
aataccgcgc cacatagcag aactttaaaa gtgctcatca ttggaaaacg ttcttcgggg    13500
cgaaaactct caaggatctt accgctgttg agatccagtt cgatgtaacc cactcgtgca    13560
cccaactgat cttcagcatc ttttactttc accagcgttt ctgggtgagc aaaaacagga    13620
aggcaaaatg ccgcaaaaaa gggaataagg gcgacacgga aatgttgaat actcatactc    13680
ttcctttttc aatattattg aagcatttat cagggttatt gtctcatgag cggatacata    13740
tttgaatgta tttagaaaaa taaacaaata ggggttccgc gcacatttcc ccgaaaagtg    13800
ccacctgacg tctaagaaac cattattatc atgacattaa cctataaaaa taggcgtatc    13860
acgaggccct ttcgtcttca agaactgcct cgcgcgtttc ggtgatgacg gtgaaaacct    13920
ctgacacatg cagctcccgg agacggtcac agcttgtctg taagcggatg ccgggagcag    13980
acaagcccgt cagggcgcgt cagcgggtgt tggcgggtgt cggggcgcag ccatgaccca    14040
gtcacgtagc gatagcggag tgtactggct taactatgcg gcatcagagc agattgtact    14100
gagagtgcac catatgcggt gtgaaatacc gcacagatgc gtaaggagaa aataccgcat    14160
caggcgccat cgccattca ggctgcgcaa ctgttgggaa gggcgatcgg tgcgggcctc    14220
ttcgctatta cgccagggga ggcagagatt gcagtaagct gagatcgcag cactgcactc    14280
cagcctgggc gacagagtaa gactctgtct caaaaataaa ataaataaat caatcagata    14340
ttccaatctt ttcctttatt tatttattta ttttctattt tggaaacaca gtccttcctt    14400
attccagaat tacacatata ttctattttt ctttatatgc tccagttttt tttagacctt    14460
```

-continued

| | |
|---|---|
| cacctgaaat gtgtgtatac aaaatctagg ccagtccagc agagcctaaa ggtaaaaaat | 14520 |
| aaaataataa aaaataaata aaatctagct cactccttca catcaaaatg gagatacagc | 14580 |
| tgttagcatt aaataccaaa taacccatct tgtcctcaat aattttaagc gcctctctcc | 14640 |
| accacatcta actcctgtca aaggcatgtg cccctccgg gcgctctgct gtgctgccaa | 14700 |
| ccaactggca tgtggactct gcagggtccc taactgccaa gccccacagt gtgccctgag | 14760 |
| gctgccctt ccttctagcg gctgccccca ctcggctttg ctttccctag tttcagttac | 14820 |
| ttgcgttcag ccaaggtctg aaactaggtg cgcacagagc ggtaagactg cgagagaaag | 14880 |
| agaccagctt tacagggggt ttatcacagt gcaccctgac agtcgtcagc ctcacagggg | 14940 |
| gtttatcaca ttgcaccctg acagtcgtca gcctcacagg gggtttatca cagtgcaccc | 15000 |
| ttacaatcat tccatttgat tcacaatttt tttagtctct actgtgccta acttgtaagt | 15060 |
| taaatttgat cagaggtgtg ttcccagagg ggaaaacagt atatacaggg ttcagtacta | 15120 |
| tcgcatttca ggcctccacc tgggtcttgg aatgtgtccc ccgaggggtg atgactacct | 15180 |
| cagttggatc tccacaggtc acagtgacac aagataacca agacacctcc caaggctacc | 15240 |
| acaatgggcc gccctccacg tgcacatggc cggaggaact gccatgtcgg aggtgcaagc | 15300 |
| acacctgcgc atcagagtcc ttggtgtgga gggagggacc agcgcagctt ccagccatcc | 15360 |
| acctgatgaa cagaacctag ggaaagcccc agttctactt acaccaggaa aggc | 15414 |

<210> SEQ ID NO 12
<211> LENGTH: 2468
<212> TYPE: DNA
<213> ORGANISM: Human immunodeficiency virus type 1

<400> SEQUENCE: 12

| | |
|---|---|
| atgagagtga aggagaagta tcagcacttg tggagatggg ggtggaaatg gggcaccatg | 60 |
| ctccttggga tattgatgat ctgtagtgct acagaaaaat tgtgggtcac agtctattat | 120 |
| ggggtacctg tgtggaagga agcaaccacc actctatttt gtgcatcaga tgctaaagca | 180 |
| tatgatacag aggtacataa tgtttgggcc acacatgcct gtgtacccac agaccccaac | 240 |
| ccacaagaag tagtattggt aaatgtgaca gaaaatttta acatgtggaa aaatgacatg | 300 |
| gtagaacaga tgcatgagga tataatcagt ttatgggatc aaagcctaaa gccatgtgta | 360 |
| aaattaaccc cactctgtgt tagttttaaag tgcactgatt tgaagaatga tactaatacc | 420 |
| aatagtagta gcgggagaat gataatggag aaaggagaga taaaaaactg ctctttcaat | 480 |
| atcagcacaa gcataagaga taaggtgcag aaagaatatg cattcttta taaacttgat | 540 |
| atagtaccaa tagataatac cagctatagg ttgataagtt gtaacacctc agtcattaca | 600 |
| caggcctgtc caaggtatc ctttgagcca attcccatac attattgtgc cccggctggt | 660 |
| tttgcgattc taaaatgtaa taataagacg ttcaatggaa caggaccatg tacaaatgtc | 720 |
| agcacagtac aatgtacaca tggaatcagg ccagtagtat caactcaact gctgttaaat | 780 |
| ggcagtctag cagaagaaga tgtagtaatt agatctgcca atttcacaga caatgctaaa | 840 |
| accataatag tacagctgaa cacatctgta gaaattaatt gtacaagacc caacaacaat | 900 |
| acaagaaaaa gtatccgtat ccagagggga ccagggagag catttgttac aataggaaaa | 960 |
| ataggaaata tgagacaagc acattgtaac attagtagag caaaatggaa tgccacttta | 1020 |
| aaacagatag ctagcaaatt aagagaacaa tttggaaata taaaacaat aatctttaag | 1080 |
| caatcctcag gaggggaccc agaaattgta acgcacagtt ttaattgtgg aggggaattt | 1140 |
| ttctactgta attcaacaca actgtttaat agtacttggt taatagtac ttggagtact | 1200 |

```
gaagggtcaa ataacactga aggaagtgac acaatcacac tcccatgcag aataaaacaa    1260
tttataaaca tgtggcagga agtaggaaaa gcaatgtatg cccctcccat cagtggacaa    1320
attagatgtt catcaaatat tactgggctg ctattaacaa gagatggtgg taataacaac    1380
aatgggtccg agatcttcag acctggagga ggcgatatga gggacaattg gagaagtgaa    1440
ttatataaat ataaagtagt aaaaattgaa ccattaggag tagcacccac caaggcaaag    1500
agaagagtgg tgcagagaga aaaaagagca gtgggaatag gagctttgtt ccttgggttc    1560
ttgggagcag caggaagcac tatgggcgca gcgtcaatga cgctgacggt acaggccaga    1620
caattattgt ctgatatagt gcagcagcag aacaatttgc tgagggctat tgaggcgcaa    1680
cagcatctgt tgcaactcac agtctgggc atcaaacagc tccaggcaag aatcctggct    1740
gtggaaagat acctaaagga tcaacagctc ctggggattt ggggttgctc tggaaaactc    1800
atttgcacca ctgctgtgcc ttggaatgct agttggagta ataaatctct ggaacagatt    1860
tggaataaca tgacctggat ggagtgggac agagaaatta acaattacac aagcttaata    1920
cactccttaa ttgaagaatc gcaaaaccag caagaaaaga tgaacaaga attattggaa    1980 ttagataaat gggcaagttt gtggaattgg tttaacataa caattggct gtggtatata    2040 aaattattca taatgatagt aggaggcttg gtaggtttaa gaatagtttt tgctgtactt    2100
tctatagtga atagagttag gcagggatat tcaccattat cgtttcagac ccacctccca    2160
atcccgaggg gacccgacag gcccgaagga atagaagaag aaggtggaga gagagacaga    2220
gacagatcca ttcgattagt gaacggatcc ttagcactta tctgggacga tctgcggagc    2280
ctgtgcctct tcagctacca ccgcttgaga gacttactct tgattgtaac gaggattgtg    2340
gaacttctgg gacgcagggg gtgggaagcc ctcaaatatt ggtggaatct cctacagtat    2400
tggagtcagg aactaaagaa tagtgctgtt aacttgctca atgccacagc catagcagta    2460
gctgaggg                                                             2468

<210> SEQ ID NO 13
<211> LENGTH: 2565
<212> TYPE: DNA
<213> ORGANISM: Human immunodeficiency virus type 1

<400> SEQUENCE: 13
atgagagtga aggagaagta tcagcacttg tggagatggg ggtggaaatg gggcaccatg      60
ctccttggga tattgatgat ctgtagtgct acagaaaaat tgtgggtcac cgtctattat     120
ggggtacctg tgtggaagga agcaaccacc actctatttt gtgcatcaga tgctaaagca     180
tatgatacag aggtacataa tgtttgggcc acacatgcct gtgtacccac agaccccaac     240
ccacaagaag tagtattggt aaatgtgaca gaaaatttta acatgtggaa aaatgacatg     300
gtagaacaga tgcatgagga tataatcagt ttatgggatc aaagcctaaa gccatgtgta     360
aaattaaccc cactctgtgt tagtttaaag tgcactgatt tgaagaatga tactaatacc     420
aatagtagta gcgggagaat gataatggag aaaggagaga taaaaaactg ctctttcaat     480
atcagcacaa gcataagaga taaggtgcag aaagaatatg cattcttta taaacttgat     540 atagtaccaa tagataatac cagctatagg ttgataagtt gtaacacctc agtcattaca     600
caggcctgtc caaaggtatc ctttgagcca attcccatac attattgtgc cccggctggt     660
tttgcgattc taaaatgtaa taataagacg ttcaatggaa caggaccatg tacaaatgtc     720
agcacagtac aatgtacaca tggaatcagg ccagtagtat caactcaact gctgttaaat     780
```

```
ggcagtctag cagaagaaga tgtagtaatt agatctgcca atttcacaga caatgctaaa    840
accataatag tacagctgaa cacatctgta gaaattaatt gtacaagacc caacaacaat    900
acaagaaaaa gtatccgtat ccagaggggga ccagggagag catttgttac aataggaaaa    960
ataggaaata tgagacaagc acattgtaac attagtagag caaaatgtaa tgccacttta   1020
aaacagatag ctagcaaatt aagagaacaa tttggaaata taaaacaat aatctttaag    1080 caatcctcag gaggggaccc agaaattgta acgcacagtt ttaattgtgg aggggaatttt   1140 ttctactgta attcaacaca actgtttaat agtacttggt taatagtac ttggagtact    1200 gaagggtcaa ataacactga aggaagtgac acaatcacac tcccatgcag aataaaacaa    1260
tttataaaca tgtggcagga agtaggaaaa gcaatgtatg cccctcccat cagtggacaa    1320
attagatgtt catcaaatat tactgggctg ctattaacaa gagatggtgg taataacaac    1380
aatgggtccg agatcttcag acctggagga ggcgatatga gggacaattg gagaagtgaa    1440
ttatataaat ataaagtagt aaaaattgaa ccattaggag tagcacccac caaggcaaag    1500
agaagagtgg tgcagagaga aaaaagagca gtgggaatag gagctttgtt ccttgggttc    1560
ttgggagcag caggaagcac tatgggcgca gcgtcaatga cgctgacggt acaggccaga    1620
caattattgt ctgatatagt gcagcagcag aacaatttgc tgagggctat tgaggcgcaa    1680
cagcatctgt tgcaactcac agtctggggc atcaaacagc tccaggcaag aatcctggct    1740
gtggaaagat acctaaagga tcaacagctc ctggggattt ggggttgctc tggaaaactc    1800
atttgcacca ctgctgtgcc ttggaatgct agttggagta taaatctct ggaacagatt    1860 tggaataaca tgacctggat ggagtgggac agagaaatta caattacac aagcttaata    1920 cactccttaa ttgaagaatc gcaaaaccag caagaaaaga tgaacaaga attattggaa    1980 ttagataaat gggcaagttt gtggaattgg tttaacataa caattggct gtggtatata    2040 aaattattca taatgatagt aggaggcttg gtaggtttaa gaatagtttt tgctgtactt    2100
tctatagtga atagagttag gcagggatat tcaccattat cgtttcagac ccacctccca    2160
atcccgaggg gacccgacag gcccgaagga atagaagaag aaggtggaga gagagacaga    2220
gacagatcca ttcgattagt gaacggatcc ttagcactta tctgggacga tctgcggagc    2280
ctgtgcctct tcagctacca ccgcttgaga gacttactct tgattgtaac gaggattgtg    2340
gaacttctgg gacgcagggg gtgggaagcc ctcaaatatt ggtggaatct cctacagtat    2400
tggagtcagg aactaaagaa tagtgctgtt aacttgctca atgccacagc catagcagta    2460 gctgaggga cagataggt tatagaagta ttacaagcag cttatagagc tattcgccac    2520
atacctagaa gaataagaca gggcttggaa aggattttgc tataa                   2565
```

<210> SEQ ID NO 14
<211> LENGTH: 2550
<212> TYPE: DNA
<213> ORGANISM: Human immunodeficiency virus type 1

<400> SEQUENCE: 14

```
atgagagtga aggagaagta tcagcacttg tggagatggg ggtggaaatg gggcaccatg     60
ctccttggga tattgatgat ctgtagtgct acagaaaaat tgtgggtcac cgtctattat    120
ggggtacctg tgtggaaaga aacaaccacc actctatttt gtgcatcaga tgctaaagca    180
tatgatacag aggtacataa tgtttgggcc acacatgcct gtgtacccac agaccccaac    240
ccacaagaag tagtattgga aaatgtaaca gaagatttta acatgtggaa aaataacatg    300
gtagaacaga tgcaggagga tgtaatcaat ttatgggatc aaagcttaaa gccatgtgta    360
```

```
aaattaaccc cactctgtgt tactttaaat tgcaaagatg tgaatgctac taataccact    420
agtagtagtg agggaatgat ggagagagga gaaataaaaa actgctcttt caatatcacc    480
aaaagcataa gagataaggt gcagaaagaa tatgctcttt tttataaact ggatgtagta    540
ccaatagata ataagaataa taccaaatat aggttaataa gttgtaacac ctcagtcatt    600
acacaagcct gtccaaaggt atcctttgaa ccaattccca tacattattg tgccccggct    660
ggttttgcga ttctaaagtg taataataag acattcaatg gaaaaggaca atgtaaaaat    720
gtcagcacag tacaatgtac acatggaatt aggccagtag tatcaactca actgctgcta    780
aatggcagtc tagcagaaga aaaggttgta attagatctg acaattttac ggacaatgct    840
aaaaccataa tagtacagct gaatgaatct gtaaaaatta attgtacaag gcccagcaac    900
aatacaagaa aaagtataca tataggacca gggagagcat tttatacaac aggagaaata    960
ataggagata taagacaagc acattgtaac attagtagag cacaatggaa taacacttta   1020
aaacagatag ttgaaaaatt aagagaacaa tttaataata aaacaatagt ctttactcac   1080
tcctcaggag gggatccaga aattgtaatg cacagtttta attgtggagg ggaattttc    1140
tactgtaatt caacacaact gtttaatagt acttggaatg atactgaaaa gtcaagtggc   1200
actgaaggaa atgacaccat catactccca tgcagaataa aacaaattat aaacatgtgg   1260
caggaagtgg gaaaagcaat gtatgctcct cccattaaag gacaaattag atgttcatca   1320
aatattacag ggctgctatt aacaagagat ggtggtaaaa atgagagtga gatcgagatc   1380
ttcagacctg gaggaggaga catgagggac aattggagaa gtgaattata taaatataaa   1440
gtagtaaaaa ttgaaccatt aggagtagca cccaccaagg caaagagaag agtggtgcaa   1500
agagaaaaaa gagcagtggg aataggagct ttgttccttg ggttcttggg agcagcagga   1560
agcactatgg gcgcagcgtc aatgacactg acggtacagg ccagacaatt attgtctggt   1620
atagtgcaac agcaaaacaa tttgctgagg gctattgagg cgcaacagca tatgttgcaa   1680
ctcacagtct ggggcatcaa gcagctccag gcaagagtcc tggctgtgga agataccta    1740
aaggatcaac agctcatggg gatttggggt tgctctggaa aactcatttg caccactgct   1800
gtgccttgga atactagttg gagtaataaa tctctggata gtatttggaa taacatgacc   1860
tggatggagt gggaaaaaga aattgagaat tacacaaaca caatatacac cctaattgaa   1920
gaatcgcaga tccaacaaga aaagaatgaa caagaattat tggaattaga taaatgggca   1980
agtttgtgga attggtttgg cataacaaaa tggctgtggt atataaaaat attcataatg   2040
atagtaggag gcttgatagg tttaagaata gttttttctg tactttctat agtgaataga   2100
gttaggcagg gatactcacc cttatcgttt cagaccctcc tcccagcaac gaggggaccc   2160
gacaggcccg aaggaatcga agaagaaggt ggagagagag acagagacag atccggacaa   2220
ttagtgaacg gattcttagc acttatctgg gtcgacctgc ggagcctgtt cctcttcagc   2280
taccaccgct tgagagactt actcttgact gtaacgagga ttgtggaact tctgggacgc   2340
agggggtggg aaatcctgaa atactggtgg aatctcctac agtattggag tcaggaacta   2400
aagaatagtg ctgttagctt gcttaatgcc acagctatag cagtagctga ggggacagat   2460
aggattatag aagtagtaca aagagtttat agggctattc tccacatacc tacaagaata   2520
agacagggct tggaaagggc tttgctataa                                    2550
```

<210> SEQ ID NO 15
<211> LENGTH: 2550
<212> TYPE: DNA

<213> ORGANISM: Human immunodeficiency virus type 1

<400> SEQUENCE: 15

```
atgagagtga aggagaagta tcagcacttg tggagatggg ggtggaaatg gggcaccatg      60
ctccttggga tattgatgat ctgtagtgct acagaaaaat tgtgggtcac cgtctattat     120
ggggtacctg tgtggaaaga acaaccacc actctatttt gtgcatcaga tgctaaagca     180
tatgatacag aggtacataa tgtttgggcc acacatgcct gtgtacccac agaccccaac    240
ccacaagaag tagtattgga aaatgtaaca gaagatttta acatgtggaa aaataacatg    300
gtagaacaga tgcaggagga tgtaatcaat ttatgggatc aaagcttaaa gccatgtgta    360
aaattaaccc cactctgtgt tactttaaat tgcaaagatg tgaatgctac taataccact    420
agtagtagtg agggaatgat ggagagagga gaaataaaaa actgctcttt caatatcacc    480
aaaagcataa gagataaggt gcagaaagaa tatgctcttt tttataaact ggatgtagta    540
ccaatagata taagaataa taccaaatat aggttaataa gttgtaacac ctcagtcatt    600
acacaagcct gtccaaaggt atcctttgaa ccaattccca tacattattg tgccccggct    660
ggttttgcga ttctaaagtg taataataag acattcaatg gaaaaggaca atgtaaaaat    720
gtcagcacag tacaatgtac acatggaatt aggccagtag tatcaactca actgctgcta    780
aatggcagtc tagcagaaga aaaggttgta attagatctg acaattttac ggacaatgct    840
aaaaccataa tagtacagct gaatgaatct gtaaaaatta ttgtacaag cccagcaac    900
aatacaagaa aaagtataca tataggacca gggagagcat tttatacaac aggagaaata    960
ataggagata taagacaagc acattgtaac attagtagag cacaatggaa taacactta   1020
aaacagatag ttgaaaaatt aagagaacaa tttaataata aaacaatagt ctttactcac   1080
tcctcaggag gggatccaga aattgtaatg cacagtttta attgtggagg gaatttttc   1140
tactgtaatt caacacaact gtttaatagt acttggaatg atactgaaaa gtcaagtggc   1200
actgaaggaa atgacaccat catactccca tgcagaataa aacaaattat aaacatgtgg   1260
caggaagtgg gaaaagcaat gtatgctcct cccattaaag gacaaattag atgttcatca   1320
aatattacag ggctgctatt aacaagagat ggtggtaaaa atgagagtga atcgagatc   1380
ttcagacctg gaggaggaga catgagggac aattggagaa gtgaattata taaatataaa   1440
gtagtaaaaa ttgaaccatt aggagtagca cccaccaagg caaagagaag agtggtgcaa   1500
agagaaaaaa gagcagtggg aataggagct ttgttccttg ggttcttggg agcagcagga   1560
agcactatgg gcgcagcgtc aatgacactg acggtacagg ccagacaatt attgtctggt   1620
atagtgcaac agcaaaacaa tttgctgagg gctattgagg cgcaacagca tatgttgcaa   1680
ctcacagtct ggggcatcaa gcagctccag gcaagagtcc tggctgtgga agatacccta   1740
aaggatcaac agctcatggg gatttgggt tgctctggaa aactcatttg caccactgct   1800
gtgccttgga atactagttg gagtaataaa tctctggata gtatttggaa taacatgacc   1860
tggatggagt gggaaaaaga aattgagaat tacacaaaca caatatacac cctaattgaa   1920
gaatcgcaga tccaacaaga aaagaatgaa caagaattat tggaattaga taaatgggca   1980
agtttgtgga attggtttgg cataacaaaa tggctgtggt atataaaaat attcataatg   2040
atagtaggag gcttgatagg tttaagaata gtttttctg tactttctat agtgaataga   2100
gttaggcagg gatactcacc cttatcgttt cagaccctcc tcccagcaac gaggggaccc   2160
gacaggcccg aaggaatcga agaagaaggt ggagagagag acagagacag atccggacaa   2220
ttagtgaacg gattcttagc acttatctgg gtcgacctgc ggagcctgtt cctcttcagc   2280
```

```
taccaccgct tgagagactt actcttgact gtaacgagga ttgtggaact tctgggacgc    2340 aggggtggg  aaatcctgaa atactggtgg aatctcctac agtattggag tcaggaacta    2400
aagaatagtg ctgttagctt gcttaatgcc acagctatag cagtagctga ggggacagat    2460
aggattatag aagtagtaca aagagtttat agggctattc tccacatacc tacaagaata    2520
agacagggct tggaaagggc tttgctataa                                     2550
```

<210> SEQ ID NO 16
<211> LENGTH: 2571
<212> TYPE: DNA
<213> ORGANISM: Human immunodeficiency virus type 1

<400> SEQUENCE: 16

```
atgagagtga aggagaaata tcagcacttg tggagatggg ggtggagatg gggcaccatg     60
ctccttggga tgttgatgat ctgtagtgct acagaaaaat tgtgggtcac agtctattat    120
ggggtacctg tgtggaagga agcaaccacc actctatttt gtgcatcaga tgctaaagca    180
tatgatacag aggtacataa tgtttgggcc acacatgcct gtgtacccac agaccccaac    240
ccacaagaag tagtattggt aaatgtgaca gaaaatttta acatgtggaa aaatgacatg    300
gtagaacaga tgcatgagga tataatcagt ttatgggatc aaagcctaaa gccatgtgta    360
aaattaaccc cactctgtgt tagtttaaag tgcactgatt tgaagaatga tactaatacc    420
aatagtagta gcgggagaat gataatggag aaaggagaga taaaaaactg ctctttcaat    480
atcagcacaa gcataagagg taaggtgcag aaagaatatg cattttttta taaacttgat    540
ataataccaa tagataatga tactaccagc tataagttga caagttgtaa cacctcagtc    600
attacacagg cctgtccaaa ggtatccttt gagccaattc ccatacatta ttgtgccccg    660
gctggttttg cgattctaaa atgtaataat aagacgttca atggaacagg accatgtaca    720
aatgtcagca cagtacaatg tacacatgga attaggccag tagtatcaac tcaactgctg    780
ttaaatggca gtctagcaga agaagaggta gtaattagat ctgtcaattt cacggacaat    840
gctaaaacca atatagtaca gctgaacaca tctgtagaaa ttaattgtac aagacccaac    900
aacaatacaa gaaaagaat ccgtatccag agaggaccag ggagagcatt tgttacaata    960
ggaaaaatag gaaatatgag acaagcacat tgtaacatta gtagagcaaa atggaataac    1020
actttaaaac agatagctag caaattaaga gaacaatttg gaataataaa acaataatc    1080 tttaagcaat cctcaggagg ggacccagaa attgtaacgc acagttttaa ttgtggaggg    1140
gaatttttct actgtaattc aacacaactg tttaatagta cttggtttaa tagtacttgg    1200
agtactgaag ggtcaaataa cactgaagga agtgacacaa tcaccctccc atgcagaata    1260
aaacaaatta taaacatgtg gcagaaagta ggaaaagcaa tgtatgcccc tcccatcagt    1320
ggacaaatta gatgttcatc aaatattaca gggctgctat taacaagaga tggtggtaat    1380
agcaacaatg agtccgagat cttcagacct ggaggaggag atatgaggga caattggaga    1440
agtgaattat ataaatataa agtagtaaaa attgaaccat taggagtagc acccaccaag    1500
gcaaagagaa gagtggtgca gagagaaaaa agagcagtgg aataggagc tttgttcctt    1560 gggttcttgg gagcagcagg aagcactatg gcgcagcct caatgacgct gacggtacag    1620
gccagacaat tattgtctgg tatagtgcag cagcagaaca atttgctgag ggctattgag    1680
gcgcaacagc atctgttgca actcacagtc tggggcatca agcagctcca ggcaagaatc    1740
ctggctgtgg aaagatacct aaaggatcaa cagctcctgg ggatttgggg ttgctctgga    1800
```

| | |
|---|---:|
| aaactcattt gcaccactgc tgtgccttgg aatgctagtt ggagtaataa atctctggaa | 1860 |
| cagatttgga atcacacgac ctggatggag tgggacagag aaattaacaa ttacacaagc | 1920 |
| ttaatacact ccttaattga agaatcgcaa aaccagcaag aaaagaatga acaagaatta | 1980 |
| ttggaattag ataaatgggc aagtttgtgg aattggttta acataacaaa ttggctgtgg | 2040 |
| tatataaaat tattcataat gatagtagga ggcttggtag gtttaagaat agttttgct | 2100 |
| gtactttcta tagtgaatag agttaggcag ggatattcac cattatcgtt tcagacccac | 2160 |
| ctcccaaccc cgaggggacc cgacaggccc gaaggaatag aagaagaagg tggagagaga | 2220 |
| gacagagaca gatccattcg attagtgaac ggatccttgg cacttatctg ggacgatctg | 2280 |
| cggagcctgt gcctcttcag ctaccaccgc ttgagagact tactcttgat tgtaacgagg | 2340 |
| attgtggaac ttctgggacg caggggggtgg aagccctca atattggtg gaatctccta | 2400 |
| cagtattgga gtcaggaact aaagaatagt gctgttagct tgctcaatgc cacagccata | 2460 |
| gcagtagctg aggggacaga tagggttata gaagtagtac aaggagcttg tagagctatt | 2520 |
| cgccacatac ctagaagaat aagacagggc ttggaaagga ttttgctata a | 2571 |

<210> SEQ ID NO 17
<211> LENGTH: 863
<212> TYPE: PRT
<213> ORGANISM: Human immunodeficiency virus type 1

<400> SEQUENCE: 17

```
Met Arg Val Lys Gly Ile Arg Lys Asn Tyr Gln His Leu Trp Lys Trp
1               5                   10                  15

Gly Met Leu Thr Met Leu Leu Gly Ile Leu Met Ile Cys Asn Val Thr
            20                  25                  30

Gly Asn Leu Trp Val Thr Val Tyr Tyr Gly Val Pro Val Trp Lys Glu
        35                  40                  45

Ala Thr Thr Thr Leu Phe Cys Ala Ser Asp Ala Lys Ser Tyr Asp Thr
    50                  55                  60

Glu Val His Asn Val Trp Ala Thr His Ala Cys Val Pro Thr Asp Pro
65                  70                  75                  80

Ser Pro Gln Glu Ile Arg Met Glu Asn Val Thr Glu Asn Phe Asn Val
                85                  90                  95

Trp Lys Asn Asn Met Val Asp Gln Met His Glu Asp Ile Ile Ser Leu
            100                 105                 110

Trp Asp Glu Ser Leu Lys Pro Cys Val Lys Leu Thr Pro Leu Cys Val
        115                 120                 125

Asn Leu Asn Cys Thr Asp Lys Val Thr Val Asn Asn Ser Thr Ile Lys
    130                 135                 140

Asn Thr Thr Asn Asp Asp Gly Val Gly Met Met Asp Lys Glu Met Lys
145                 150                 155                 160

Asn Cys Ser Phe Asn Val Thr Thr Asn Glu Gly Asn Lys Val Arg Lys
                165                 170                 175

Glu Tyr Ala Leu Leu Tyr Lys Leu Asp Val Val Ser Ile Asp Gly Asn
            180                 185                 190

Lys Asn Asn Asn Tyr Ser Asn Tyr Arg Leu Ile Ser Cys Asn Thr
        195                 200                 205

Ser Val Ile Thr Gln Ala Cys Pro Lys Val Ser Phe Glu Pro Ile Pro
    210                 215                 220

Ile His Tyr Cys Ala Pro Ala Gly Phe Ala Ile Leu Lys Cys Asn Asp
225                 230                 235                 240
```

-continued

Lys Lys Phe Asn Gly Lys Gly Glu Cys Lys Asn Val Ser Thr Val Gln
            245                 250                 255

Cys Thr His Gly Ile Arg Pro Val Val Ser Thr His Leu Leu Leu Asn
        260                 265                 270

Gly Ser Leu Ala Glu Glu Val Val Ile Arg Ser Asp Asn Phe Ser
        275                 280                 285

Asn Asn Ala Lys Thr Ile Ile Val Gln Leu Asn Lys Thr Val Lys Ile
    290                 295                 300

Asn Cys Thr Arg Pro Asn Asn Thr Arg Arg Ser Ile Ser Phe Gly
305                 310                 315                 320

Pro Gly Arg Ala Trp His Ala Thr Thr Asp Ile Val Gly Asp Ile Arg
                325                 330                 335

Gln Ala His Cys Thr Ile Asn Gly Thr Glu Trp Asn Asn Ile Leu Lys
            340                 345                 350

Leu Val Val Ser Lys Leu Gln Glu Gln Tyr Gly Thr Asn Lys Thr Ile
        355                 360                 365

Arg Phe Glu Gln Pro Val Gln Gly Gly Asp Leu Glu Ile Val Met His
    370                 375                 380

Ser Phe Asn Cys Gly Gly Glu Phe Phe Tyr Cys Asn Thr Ser Gln Leu
385                 390                 395                 400

Phe Asn Ser Thr Trp Asp Asn Thr Ser Thr Gly Asn Asn Thr Glu Glu
                405                 410                 415

Asp Gly Thr Leu Thr Leu Pro Cys Lys Ile Arg Gln Ile Ile Asn Met
            420                 425                 430

Trp Gln Lys Val Gly Lys Ala Met Tyr Ala Pro Pro Ile Ser Gly Arg
        435                 440                 445

Ile Asn Cys Leu Ser Asn Ile Thr Gly Leu Leu Leu Met Arg Asp Gly
    450                 455                 460

Gly Ser Asn Asp Thr Asn Glu Pro Glu Ile Phe Arg Pro Gly Gly Gly
465                 470                 475                 480

Asp Met Arg Asp Asn Trp Arg Ser Glu Leu Tyr Lys Tyr Lys Val Ile
                485                 490                 495

Lys Ile Glu Pro Leu Gly Ile Ala Pro Thr Lys Ala Lys Arg Arg Val
            500                 505                 510

Val Gln Lys Glu Lys Arg Ala Val Gly Leu Gly Ala Met Phe Leu Gly
        515                 520                 525

Phe Leu Gly Ala Ala Gly Ser Thr Met Gly Ala Ala Ser Leu Thr Leu
    530                 535                 540

Thr Val Gln Ala Arg Gln Leu Leu Ser Gly Ile Val Gln Gln Ser
545                 550                 555                 560

Lys Leu Leu Arg Ala Ile Glu Ala Gln Gln His Leu Leu Gln Leu Thr
                565                 570                 575

Val Trp Gly Ile Lys Gln Leu Gln Ala Arg Val Leu Ala Val Glu Ala
            580                 585                 590

Tyr Leu Lys Asp Gln Gln Leu Leu Gly Ile Trp Gly Cys Ser Gly Lys
        595                 600                 605

Arg Ile Cys Thr Thr Val Val Pro Trp Asn Asn Ser Trp Ser Asn Lys
    610                 615                 620

Ser Tyr Asn Asp Ile Trp Asp Asn Met Thr Trp Met Gln Trp Asp Lys
625                 630                 635                 640

Glu Ile Glu Asn Tyr Thr Gly Gln Ile Tyr Thr Leu Ile Glu Glu Ala
                645                 650                 655

Gln Ile Gln Gln Glu Lys Asn Glu Gln Glu Leu Leu Glu Leu Asp Lys

-continued

```
                        660                 665                 670
Trp Ala Ser Leu Trp Asn Trp Phe Asp Ile Thr Lys Trp Leu Trp Tyr
                675                 680                 685

Ile Lys Ile Phe Ile Met Ile Val Gly Gly Leu Ile Gly Leu Arg Ile
            690                 695                 700

Ile Phe Thr Val Leu Ser Ile Val Asn Arg Val Arg Gln Gly Tyr Ser
705                 710                 715                 720

Pro Leu Ser Phe Gln Thr His Leu Pro Thr Pro Arg Gly Pro Asp Arg
                725                 730                 735

Pro Glu Gly Ile Glu Glu Gly Gly Glu Arg Asp Arg Gly Gly Ser
            740                 745                 750

Gly Arg Leu Val Asn Gly Phe Leu Ala Ile Phe Trp Val Asp Leu Arg
                755                 760                 765

Ser Leu Cys Leu Phe Ser Tyr His Arg Leu Arg Asp Leu Leu Leu Ile
                770                 775                 780

Val Ala Arg Thr Val Glu Leu Leu Gly Arg Arg Gly Trp Glu Ala Leu
785                 790                 795                 800

Lys Tyr Leu Trp Asn Leu Leu Gln Tyr Trp Ile Gln Glu Leu Arg Asn
                805                 810                 815

Ser Ala Val Ser Leu Leu Asn Ala Thr Ala Ile Ala Val Gly Glu Gly
                820                 825                 830

Thr Asp Arg Val Ile Glu Val Val Gln Arg Ile Phe Arg Ala Val Ile
                835                 840                 845

Asn Ile Pro Arg Arg Ile Arg Gln Gly Leu Glu Arg Ile Leu Leu
            850                 855                 860

<210> SEQ ID NO 18
<211> LENGTH: 858
<212> TYPE: PRT
<213> ORGANISM: Human immunodeficiency virus type 1

<400> SEQUENCE: 18

Met Arg Val Lys Gly Ile Lys Lys Asn Cys Gln Gly Leu Trp Arg Trp
1               5                   10                  15

Gly Met Met Leu Leu Gly Ile Leu Met Ile Cys Ser Ala Thr Glu Lys
                20                  25                  30

Leu Trp Val Thr Val Tyr Tyr Gly Val Pro Val Trp Lys Glu Ala Thr
            35                  40                  45

Thr Thr Leu Phe Cys Ala Ser Asp Ala Lys Ala Tyr Glu Thr Glu Val
        50                  55                  60

His Asn Val Trp Ala Thr His Ala Cys Val Pro Thr Asp Pro Asn Pro
65                  70                  75                  80

Gln Glu Ile Val Leu Glu Asn Val Thr Glu Asn Phe Asn Met Trp Lys
                85                  90                  95

Asn Asn Met Val Glu Gln Met His Glu Asp Ile Ile Ser Leu Trp Asp
            100                 105                 110

Gln Ser Leu Lys Pro Cys Val Lys Leu Thr Pro Leu Cys Val Thr Leu
        115                 120                 125

Asn Cys Thr Lys Met Met Asn Val Thr Asn Thr Asn Ser Ser Ala Thr
    130                 135                 140

Thr Asn Thr Ser Ser Ser Glu Asn Pro Met Glu Glu Met Lys Asn Cys
145                 150                 155                 160

Ser Phe Asn Ile Thr Thr His Leu Arg Asp Gln Val Lys Lys Glu Tyr
                165                 170                 175
```

```
Ala Thr Phe Tyr Asn Leu Asp Leu Val Pro Ile Ser Asp Lys Asn Asp
            180                 185                 190

Ser Lys Tyr Met Leu Ala Ser Cys Asn Thr Ser Val Ile Thr Gln Ala
        195                 200                 205

Cys Pro Lys Val Ser Phe Glu Pro Ile Pro Ile His Tyr Cys Ala Pro
    210                 215                 220

Ala Gly Phe Ala Ile Leu Lys Cys Asn Asn Lys Thr Phe Asn Gly Lys
225                 230                 235                 240

Gly Pro Cys Thr Asn Val Ser Thr Val Gln Cys Thr His Gly Ile Lys
                245                 250                 255

Pro Val Val Ser Thr Gln Leu Leu Leu Asn Gly Ser Leu Ala Glu Lys
            260                 265                 270

Glu Ile Val Ile Arg Ser Glu Asn Leu Thr Asn Asn Ala Lys Thr Ile
        275                 280                 285

Ile Val Gln Leu Asn Glu Ser Val Ile Ile Asn Cys Thr Arg Pro Asn
    290                 295                 300

Asn Asn Thr Arg Lys Ser Ile His Ile Gln Pro Gly Arg Ala Phe Tyr
305                 310                 315                 320

Ala Thr Gly Glu Ile Ile Gly Asn Ile Arg Gln Ala Tyr Cys Thr Leu
                325                 330                 335

Asn Gly Thr Glu Trp Asn Asn Thr Leu Lys Gln Ile Val Asp Lys Leu
            340                 345                 350

Arg Glu Glu Phe Lys Asn Lys Thr Ile Thr Phe Asn Gln Ser Ser Gly
        355                 360                 365

Gly Asp Pro Glu Ile Val Met His Thr Phe Asn Cys Gly Gly Glu Phe
    370                 375                 380

Phe Tyr Cys Asn Thr Thr Lys Leu Phe Asn Ser Thr Trp Asn Ile Asn
385                 390                 395                 400

Gly Thr Trp Lys Gly Thr Glu Glu Ser Asn Ile Thr Leu Gln Cys Lys
                405                 410                 415

Ile Lys Gln Ile Ile Asn Met Trp Gln Glu Val Gly Lys Ala Met Tyr
            420                 425                 430

Ala Pro Pro Ile Lys Gly Gln Ile Asn Cys Ser Ser Tyr Ile Thr Gly
        435                 440                 445

Leu Leu Leu Thr Arg Asp Gly Gly Tyr Glu Ser Arg Asn Gly Thr Glu
    450                 455                 460

Ile Phe Arg Pro Gly Gly Gly Asn Met Arg Asp Asn Trp Arg Ser Glu
465                 470                 475                 480

Leu Tyr Lys Tyr Lys Val Val Lys Ile Glu Pro Ile Gly Val Ala Pro
                485                 490                 495

Thr Lys Ala Lys Arg Arg Val Val Gln Arg Glu Lys Arg Ala Val Gly
            500                 505                 510

Ile Gly Ala Val Phe Leu Gly Phe Leu Gly Ala Ala Gly Ser Thr Met
        515                 520                 525

Gly Ala Ala Ser Ile Thr Leu Thr Val Gln Ala Arg Gln Leu Leu Ser
    530                 535                 540

Gly Ile Val Gln Gln Gln Asn Asn Leu Leu Arg Ala Ile Glu Ala Gln
545                 550                 555                 560

Gln His Leu Leu Gln Leu Thr Val Trp Gly Ile Lys Gln Leu Gln Ala
                565                 570                 575

Arg Leu Leu Ala Val Glu Arg His Leu Lys Asp Gln Gln Leu Leu Gly
            580                 585                 590

Ile Trp Gly Cys Ser Gly Lys Leu Ile Cys Thr Thr Ala Val Pro Trp
```

```
                595                 600                 605
Asn Thr Ser Trp Ser Asn Lys Ser Leu Asn Gln Ile Trp Asn Asn Met
    610                 615                 620
Thr Trp Met Glu Trp Glu Arg Glu Ile Asp Asn Tyr Thr Gly Leu Ile
625                 630                 635                 640
Tyr Ser Leu Ile Glu Glu Ser Gln Asn Gln Gln Asp Lys Asn Glu Gln
                645                 650                 655
Glu Leu Leu Ala Leu Asp His Trp Ala Ser Leu Trp Asn Trp Phe Ser
            660                 665                 670
Ile Thr Asn Trp Leu Trp Tyr Ile Lys Ile Phe Ile Ile Ile Val Gly
        675                 680                 685
Gly Leu Ile Gly Leu Arg Ile Val Phe Ala Val Leu Ser Ile Val Asn
    690                 695                 700
Arg Val Arg Gln Gly Tyr Ser Pro Leu Ser Phe Gln Thr Leu Leu Leu
705                 710                 715                 720
Thr Gln Arg Gly Pro Asp Arg Pro Gly Gly Ile Glu Glu Gly Gly
                725                 730                 735
Glu Arg Asp Arg Asp Arg Ser Gly Gln Leu Val Asn Gly Phe Leu Ala
            740                 745                 750
Ile Val Trp Val Asp Leu Arg Ser Leu Cys Leu Phe Leu Tyr Arg His
        755                 760                 765
Leu Arg Asp Leu Leu Leu Ile Val Thr Arg Thr Val Glu Leu Leu Gly
    770                 775                 780
Leu Arg Gly Trp Glu Ala Leu Lys Tyr Leu Trp Asn Leu Leu Gln Tyr
785                 790                 795                 800
Trp Ser Gln Glu Leu Lys Asn Ser Ala Val Ser Leu Leu Asn Ala Ile
                805                 810                 815
Ala Ile Ala Val Ala Glu Gly Thr Asp Arg Val Ile Glu Ala Leu Gln
            820                 825                 830
Arg Ala Cys Arg Ala Ile Leu His Ile Pro Arg Arg Ile Arg Gln Gly
        835                 840                 845
Ile Glu Arg Ala Val Leu Glu Asp Gly Trp
    850                 855

<210> SEQ ID NO 19
<211> LENGTH: 856
<212> TYPE: PRT
<213> ORGANISM: Human immunodeficiency virus type 1

<400> SEQUENCE: 19

Met Arg Val Met Glu Ile Lys Arg Asn Tyr Gln His Leu Trp Arg Gly
1               5                   10                  15
Gly Thr Leu Leu Leu Gly Ile Leu Met Ile Cys Ser Ala Ala Glu Asp
            20                  25                  30
Leu Trp Val Thr Val Tyr Tyr Gly Val Pro Val Trp Lys Glu Ala Thr
        35                  40                  45
Thr Thr Leu Phe Cys Ala Ser Asp Ala Lys Ala Tyr Asp Thr Glu Ala
    50                  55                  60
His Asn Val Trp Ala Thr His Ala Cys Val Pro Thr Asp Pro Asn Pro
65                  70                  75                  80
Gln Glu Val Lys Leu Val Asn Val Thr Glu Asn Phe Asn Met Trp Lys
                85                  90                  95
Asn Asn Met Val Glu Gln Met His Glu Asp Ile Ile Ser Leu Trp Asp
            100                 105                 110
```

-continued

```
Glu Ser Leu Lys Pro Cys Val Lys Leu Thr Pro Leu Cys Val Thr Leu
            115                 120                 125

Asn Cys Thr Asp Trp Lys Gly Asn Thr Thr Thr Pro Thr Thr Thr
130                 135                 140

Leu Ser Ser Lys Gly Lys Met Met Glu Gly Glu Met Lys Asn Cys
145                 150                 155                 160

Ser Phe Asn Val Thr Ser Gly Ile Arg Asp Lys Val Gln Lys Asp Tyr
                165                 170                 175

Ala Phe Phe Tyr Lys Leu Asp Leu Val Gln Ile Asp Ser Asp Asn
                180                 185                 190

Thr Ser Tyr Arg Leu Ile Ser Cys Ser Thr Ser Val Ile Thr Gln Ala
                195                 200                 205

Cys Pro Lys Thr Ser Phe Glu Pro Ile Pro Ile His Tyr Cys Ala Pro
    210                 215                 220

Ala Gly Phe Ala Ile Leu Lys Cys Lys Asp Lys Lys Phe Asn Gly Thr
225                 230                 235                 240

Gly Pro Cys Lys Asn Val Ser Thr Val Gln Cys Thr His Gly Ile Arg
                245                 250                 255

Pro Val Val Ser Thr Gln Leu Leu Asn Gly Ser Leu Ala Glu Glu
            260                 265                 270

Glu Ile Val Ile Arg Ser Glu Asn Ile Ser Asp Asn Val Lys Thr Ile
            275                 280                 285

Ile Val Gln Leu Asn Glu Thr Val Glu Ile Asn Cys Thr Arg Pro Asn
    290                 295                 300

Asn Asn Thr Arg Arg Ser Ile His Ile Gly Pro Gly Arg Ala Phe Tyr
305                 310                 315                 320

Gly Thr Asp Val Ile Gly Asp Ile Arg Gln Ala His Cys Asn Ile Ser
                325                 330                 335

Arg Thr Gln Trp Asn Asn Thr Leu Gln Arg Val Val Lys Lys Leu Arg
                340                 345                 350

Glu Ile Lys Gln Phe Lys Asn Lys Thr Ile Val Phe Lys Gln Ser Ser
            355                 360                 365

Gly Gly Asp Pro Glu Ile Val Met His Thr Phe Asn Cys Gly Gly Glu
    370                 375                 380

Phe Phe Tyr Cys Asn Ser Ser Gly Leu Phe Asn Ser Thr Trp Pro Ser
385                 390                 395                 400

Asn Ser Thr Gln Asn Ser Thr Glu Gly Ser Asn Asn Thr Ile Thr Leu
                405                 410                 415

Pro Cys Arg Ile Arg Gln Ile Ile Asn Met Trp Gln Glu Val Gly Lys
            420                 425                 430

Ala Met Tyr Ala Pro Pro Ile Gln Gly Gln Ile Arg Cys Ser Ser Asn
            435                 440                 445

Ile Thr Gly Ile Leu Leu Thr Arg Asp Gly Gly Asn Val Asn Val Thr
    450                 455                 460

Asp Glu Ile Phe Arg Pro Gly Gly Gly Asn Met Lys Asp Asn Trp Arg
465                 470                 475                 480

Ser Glu Leu Tyr Lys Tyr Lys Val Val Gln Ile Glu Pro Leu Gly Leu
                485                 490                 495

Ala Pro Thr Arg Ala Arg Arg Val Val Gln Arg Glu Lys Arg Ala
            500                 505                 510

Val Gly Met Gly Ala Leu Phe Leu Gly Phe Leu Gly Ala Ala Gly Ser
            515                 520                 525

Thr Met Gly Ala Ala Ser Met Thr Leu Thr Val Gln Ala Arg Thr Leu
```

```
                530               535                540
Leu Ser Gly Ile Val Gln Gln Ser Asn Leu Leu Arg Ala Ile Glu
545                 550                 555                 560

Ala Gln Gln His Leu Leu Gln Leu Thr Val Trp Gly Ile Lys Gln Leu
                565                 570                 575

Gln Ala Arg Val Leu Ala Val Glu Arg Tyr Leu Arg Asp Gln Gln Leu
                580                 585                 590

Leu Gly Ile Trp Gly Cys Ser Gly Lys Leu Ile Cys Thr Thr Asn Val
                595                 600                 605

Pro Trp Asn Ala Ser Trp Ser Asn Lys Ser Met Asp Glu Ile Trp Glu
610                 615                 620

Asn Met Thr Trp Met Gln Trp Glu Arg Glu Ile Asp Asn Tyr Thr Asp
625                 630                 635                 640

Leu Ile Tyr Asn Leu Ile Glu Lys Ser Gln Asn Gln Glu Lys Asn
                645                 650                 655

Glu Gln Glu Leu Leu Ala Leu Asp Lys Trp Ala Ser Leu Trp Asn Trp
                660                 665                 670

Phe Asn Ile Ser His Trp Leu Trp Tyr Ile Lys Ile Phe Ile Met Ile
                675                 680                 685

Val Gly Gly Leu Ile Gly Leu Arg Ile Val Phe Thr Val Phe Ser Ile
                690                 695                 700

Val Asn Arg Val Arg Gln Gly Tyr Ser Pro Leu Ser Phe Gln Thr Arg
705                 710                 715                 720

Phe Pro Ala Gln Arg Gly Pro Asp Arg Pro Glu Gly Ile Glu Glu Glu
                725                 730                 735

Gly Gly Asp Arg Asp Arg Asp Arg Ser Gly His Leu Val Asp Gly Phe
                740                 745                 750

Leu Ala Ile Phe Trp Val Asp Leu Arg Ser Leu Phe Leu Phe Ser Tyr
                755                 760                 765

His Arg Leu Arg Asp Leu Leu Leu Ile Ala Ala Arg Ile Val Glu Leu
                770                 775                 780

Leu Gly Arg Arg Gly Trp Glu Leu Leu Lys Tyr Trp Trp Asn Leu Leu
785                 790                 795                 800

Gln Tyr Trp Ser Gln Glu Leu Lys Asn Ser Ala Val Ser Leu Leu Asn
                805                 810                 815

Thr Thr Ala Ile Ala Val Ala Glu Gly Thr Asp Arg Val Ile Glu Ile
                820                 825                 830

Leu Gln Gly Ala Phe Arg Ala Ile Ile His Ile Pro Thr Arg Ile Arg
                835                 840                 845

Gln Gly Leu Glu Arg Ala Leu Leu
850                 855
```